US012548360B2

(12) United States Patent
Yebes Torres et al.

(10) Patent No.: US 12,548,360 B2
(45) Date of Patent: Feb. 10, 2026

(54) METHODS, SYSTEMS, ARTICLES OF MANUFACTURE, AND APPARATUS TO TAG SEGMENTS IN A DOCUMENT

(71) Applicant: Nielsen Consumer LLC, Chicago, IL (US)

(72) Inventors: Jose Javier Yebes Torres, Valladolid (ES); David Montero, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 195 days.

(21) Appl. No.: 18/176,273

(22) Filed: Feb. 28, 2023

(65) Prior Publication Data

US 2024/0096125 A1  Mar. 21, 2024

Related U.S. Application Data

(60) Provisional application No. 63/407,029, filed on Sep. 15, 2022.

(51) Int. Cl.
*G06F 40/284* (2020.01)
*G06V 30/148* (2022.01)
(Continued)

(52) U.S. Cl.
CPC .......... *G06V 30/414* (2022.01); *G06F 40/284* (2020.01); *G06V 30/153* (2022.01); *G06V 30/19113* (2022.01)

(58) Field of Classification Search
CPC ............... G06V 30/414; G06V 30/153; G06V 30/19113; G06V 10/82; G06F 40/284;
(Continued)

(56) References Cited

U.S. PATENT DOCUMENTS 3,323,135 A  6/1967 Miller
5,410,611 A  4/1995 Huttenlocher et al.
(Continued)

FOREIGN PATENT DOCUMENTS

CA  2957433 C  6/2020
CN  100369049 C  2/2008
(Continued)

OTHER PUBLICATIONS

Visich, "Bar Codes and Their Applications," Research Foundation of State University of New York, 1990, 59 pages.
(Continued)

*Primary Examiner* — Huo Long Chen
(74) *Attorney, Agent, or Firm* — Hanley, Flight & Zimmerman, LLC

(57) ABSTRACT

Methods, apparatus, systems, and articles of manufacture are disclosed to tag segments in a document. An example apparatus includes processor circuitry to execute machine readable instructions to generate node embeddings for nodes of a graph, the node embeddings based on features extracted from text segments detected in a document, the text segments to be represented by the nodes of the graph; sample edges corresponding to the nodes to generate the graph; generate first updated node embeddings by passing the node embeddings and the graph through layers of a graph neural network, the first updated embeddings corresponding to the node embeddings augmented with neighbor information; generate second updated node embeddings by passing the first updated embeddings through layers of a recurrent neural network, the second updated embeddings corresponding to the first updated node embeddings augmented with sequential information; and classify the text segments based on the second updated node embeddings.

20 Claims, 16 Drawing Sheets

(51) Int. Cl.
*G06V 30/19* (2022.01)
*G06V 30/414* (2022.01)
(58) Field of Classification Search
CPC .......... G06F 40/30; G06N 3/08; G06N 3/042;
G06N 3/0442; G06N 3/0455
See application file for complete search history.

(56) References Cited

U.S. PATENT DOCUMENTS

| | | | |
|---|---|---|---|
| 5,606,690 | A | 2/1997 | Hunter et al. |
| 7,454,063 | B1 | 11/2008 | Kneisl et al. |
| 7,792,709 | B1 | 9/2010 | Trandal et al. |
| 8,285,047 | B2 | 10/2012 | Nagarajan et al. |
| 8,494,281 | B2 | 7/2013 | Nagarajan |
| 8,787,695 | B2 | 7/2014 | Wu |
| 8,792,141 | B2 | 7/2014 | Moore et al. |
| 8,983,170 | B2 | 3/2015 | Nepomniachtchi et al. |
| 9,014,432 | B2 | 4/2015 | Fan et al. |
| 9,158,744 | B2 | 10/2015 | Rao |
| 9,239,952 | B2 | 1/2016 | Hsu |
| 9,262,686 | B1 | 2/2016 | Singer |
| 9,290,022 | B2 | 3/2016 | Makabe |
| 9,298,685 | B2 | 3/2016 | Barrus |
| 9,298,979 | B2 | 3/2016 | Nepomniachtchi et al. |
| 9,323,135 | B1 | 4/2016 | Veloso |
| 9,324,073 | B2 | 4/2016 | Nepomniachtchi et al. |
| 9,384,389 | B1 | 7/2016 | Sankaranarayanan |
| 9,384,839 | B2 | 7/2016 | Avila et al. |
| 9,396,540 | B1 | 7/2016 | Sampson |
| 9,684,842 | B2 | 6/2017 | Deng |
| 9,710,702 | B2 | 7/2017 | Nepomniachtchi et al. |
| 9,747,504 | B2 | 8/2017 | Ma et al. |
| 9,760,786 | B2 | 9/2017 | Sahagun et al. |
| 9,824,270 | B1 | 11/2017 | Mao |
| 9,875,385 | B1 | 1/2018 | Humphreys |
| 10,026,061 | B2 | 7/2018 | Cheek et al. |
| 10,032,072 | B1 | 7/2018 | Tran et al. |
| 10,157,425 | B2 | 12/2018 | Chelst et al. |
| 10,235,585 | B2 | 3/2019 | Deng |
| 10,242,285 | B2 | 3/2019 | Thrasher et al. |
| 10,395,772 | B1 | 8/2019 | Lucas et al. |
| 10,679,283 | B1 | 6/2020 | Pesce |
| 11,256,760 | B1* | 2/2022 | Corcoran ............... G06F 16/51 |
| 11,257,049 | B1 | 2/2022 | Durazo Almeida |
| 11,321,956 | B1 | 5/2022 | Geng |
| 11,410,446 | B2 | 8/2022 | Shanmuganathan et al. |
| 11,414,053 | B2 | 8/2022 | Tanaami et al. |
| 11,468,491 | B2 | 10/2022 | Dalal |
| 11,476,981 | B2 | 10/2022 | Wei et al. |
| 11,562,557 | B2 | 1/2023 | Miginnis et al. |
| 11,587,148 | B2 | 2/2023 | Elder |
| 11,593,552 | B2 | 2/2023 | Sarkar |
| 11,609,956 | B2 | 3/2023 | Jain |
| 11,625,930 | B2 | 4/2023 | Rodriguez et al. |
| 11,809,985 | B2* | 11/2023 | Polanía Cabrera ........................ G06Q 30/0631 |
| 11,810,383 | B2 | 11/2023 | Patel et al. |
| 11,842,035 | B2 | 12/2023 | Jahjah et al. |
| 2002/0037097 | A1 | 3/2002 | Hoyos et al. |
| 2003/0185448 | A1 | 10/2003 | Seeger et al. |
| 2006/0232619 | A1 | 10/2006 | Otsuka et al. |
| 2006/0245650 | A1 | 11/2006 | Jun |
| 2007/0033533 | A1 | 2/2007 | Sull |
| 2007/0041642 | A1 | 2/2007 | Romanoff et al. |
| 2008/0205759 | A1 | 8/2008 | Zandifar et al. |
| 2009/0164422 | A1 | 6/2009 | Pacella |
| 2010/0306080 | A1 | 12/2010 | Trandal et al. |
| 2011/0122443 | A1 | 5/2011 | Otsuka et al. |
| 2011/0243445 | A1 | 10/2011 | Uzelac et al. |
| 2011/0289395 | A1 | 11/2011 | Breuel et al. |
| 2011/0311145 | A1 | 12/2011 | Bern et al. |
| 2012/0183211 | A1 | 7/2012 | Hsu et al. |
| 2012/0274953 | A1 | 11/2012 | Makabe |
| 2012/0330971 | A1 | 12/2012 | Thomas et al. |
| 2013/0058575 | A1 | 3/2013 | Koo et al. |
| 2013/0170741 | A9 | 7/2013 | Hsu et al. |
| 2014/0002868 | A1 | 1/2014 | Landa et al. |
| 2014/0064618 | A1 | 3/2014 | Janssen, Jr. |
| 2014/0188647 | A1 | 7/2014 | Argue |
| 2014/0195891 | A1 | 7/2014 | Venkata Radha Krishna Rao |
| 2015/0039479 | A1 | 2/2015 | Gotanda |
| 2015/0127428 | A1 | 5/2015 | Gharachorloo |
| 2015/0169951 | A1 | 6/2015 | Khintsitskiy et al. |
| 2015/0254778 | A1 | 9/2015 | Kmak et al. |
| 2015/0317642 | A1 | 11/2015 | Argue |
| 2015/0363792 | A1 | 12/2015 | Arini |
| 2015/0363822 | A1 | 12/2015 | Rowe |
| 2016/0005189 | A1 | 1/2016 | Gray |
| 2016/0034863 | A1 | 2/2016 | Ross |
| 2016/0063469 | A1 | 3/2016 | Etzion |
| 2016/0125383 | A1 | 5/2016 | Chan |
| 2016/0171585 | A1 | 6/2016 | Singh |
| 2016/0203625 | A1 | 7/2016 | Khan et al. |
| 2016/0210507 | A1 | 7/2016 | Abdollahian |
| 2016/0234431 | A1 | 8/2016 | Kraft et al. |
| 2016/0307059 | A1 | 10/2016 | Chaudhury et al. |
| 2016/0342863 | A1 | 11/2016 | Kwon et al. |
| 2016/0350954 | A1 | 12/2016 | Agarwala |
| 2017/0206536 | A1 | 7/2017 | Brelig et al. |
| 2017/0293819 | A1 | 10/2017 | Deng |
| 2017/0329749 | A1 | 11/2017 | Milward |
| 2017/0364450 | A1* | 12/2017 | Struttmann ........... H04L 9/3297 |
| 2018/0005345 | A1 | 1/2018 | Apodaca et al. |
| 2018/0053045 | A1 | 2/2018 | Lorenzini et al. |
| 2018/0060302 | A1 | 3/2018 | Liang et al. |
| 2018/0317116 | A1 | 11/2018 | Komissarov et al. |
| 2018/0336509 | A1 | 11/2018 | Guttman |
| 2019/0026803 | A1 | 1/2019 | De Guzman |
| 2019/0050639 | A1 | 2/2019 | Ast |
| 2019/0080207 | A1 | 3/2019 | Chang |
| 2019/0130622 | A1 | 5/2019 | Hoover |
| 2019/0171900 | A1 | 6/2019 | Thrasher et al. |
| 2019/0244020 | A1 | 8/2019 | Yoshino et al. |
| 2019/0272360 | A1 | 9/2019 | Kursun et al. |
| 2019/0325211 | A1 | 10/2019 | Ordonez et al. |
| 2019/0332662 | A1 | 10/2019 | Middendorf et al. |
| 2019/0354818 | A1 | 11/2019 | Reisswig et al. |
| 2020/0097718 | A1 | 3/2020 | Schäfer |
| 2020/0097759 | A1 | 3/2020 | Nadim |
| 2020/0142856 | A1 | 5/2020 | Neelamana |
| 2020/0151444 | A1 | 5/2020 | Price et al. |
| 2020/0151902 | A1 | 5/2020 | Almazán |
| 2020/0175267 | A1 | 6/2020 | Schäfer et al. |
| 2020/0190963 | A1 | 6/2020 | Gooneratne |
| 2020/0249803 | A1 | 8/2020 | Sobel et al. |
| 2020/0279107 | A1* | 9/2020 | Staar ................... G06V 30/413 |
| 2020/0364451 | A1 | 11/2020 | Ammar et al. |
| 2020/0401876 | A1 | 12/2020 | Foncubierta Rodriguez et al. |
| 2020/0410231 | A1 | 12/2020 | Chua et al. |
| 2021/0004880 | A1 | 1/2021 | Benkreira et al. |
| 2021/0009163 | A1* | 1/2021 | Urtasun ............... G08G 1/0133 |
| 2021/0019287 | A1 | 1/2021 | Prasad et al. |
| 2021/0034856 | A1 | 2/2021 | Torres et al. |
| 2021/0090694 | A1 | 3/2021 | Colley et al. |
| 2021/0117665 | A1 | 4/2021 | Simantov et al. |
| 2021/0117668 | A1 | 4/2021 | Zhong et al. |
| 2021/0142092 | A1 | 5/2021 | Zhao et al. |
| 2021/0149926 | A1 | 5/2021 | Komninos et al. |
| 2021/0158038 | A1 | 5/2021 | Shanmuganathan et al. |
| 2021/0216765 | A1 | 7/2021 | Xu |
| 2021/0248420 | A1 | 8/2021 | Zhong et al. |
| 2021/0295101 | A1 | 9/2021 | Tang et al. |
| 2021/0319217 | A1 | 10/2021 | Wang et al. |
| 2021/0334737 | A1 | 10/2021 | Balaji |
| 2021/0343030 | A1 | 11/2021 | Sagonas et al. |
| 2021/0357710 | A1 | 11/2021 | Zhang et al. |
| 2021/0406533 | A1 | 12/2021 | Arroyo et al. |
| 2022/0004756 | A1 | 1/2022 | Jennings |
| 2022/0114821 | A1 | 4/2022 | Arroyo et al. |
| 2022/0156489 | A1 | 5/2022 | Agarwal |
| 2022/0180113 | A1 | 6/2022 | Patel |
| 2022/0189190 | A1 | 6/2022 | Arroyo et al. |
| 2022/0198185 | A1 | 6/2022 | Prebble |
| 2022/0350946 | A1 | 11/2022 | Hjerrild et al. |

(56) References Cited

U.S. PATENT DOCUMENTS

| | | |
|---|---|---|
| 2022/0383651 A1 | 12/2022 | Shanmuganathan et al. |
| 2022/0397809 A1 | 12/2022 | Talpade et al. |
| 2022/0414630 A1 | 12/2022 | Yebes Torres et al. |
| 2023/0004748 A1 | 1/2023 | Rodriguez et al. |
| 2023/0005286 A1 | 1/2023 | Yebes Torres et al. |
| 2023/0008198 A1 | 1/2023 | Gadde et al. |
| 2023/0057687 A1 | 2/2023 | Mantri |
| 2023/0065915 A1 | 3/2023 | Berestovsky |
| 2023/0196806 A1 | 6/2023 | Ramalingam et al. |
| 2023/0214899 A1 | 7/2023 | Martínez Cebrián et al. |
| 2023/0230408 A1 | 7/2023 | Arroyo et al. |
| 2023/0306203 A1 | 9/2023 | Hoang |
| 2023/0394859 A1 | 12/2023 | Montero et al. |
| 2024/0013562 A1 | 1/2024 | Montero et al. |

FOREIGN PATENT DOCUMENTS

| | | | | |
|---|---|---|---|---|
| CN | 103123685 A | | 5/2013 | |
| CN | 104866849 A | | 8/2015 | |
| CN | 108229397 A | | 6/2018 | |
| CN | 108829397 A | | 11/2018 | |
| CN | 109389124 A | | 2/2019 | |
| CN | 108229397 B | | 8/2020 | |
| CN | 112380835 A | * | 2/2021 | ............ G06N 3/044 |
| CN | 112446351 A | | 3/2021 | |
| CN | 112560862 A | | 3/2021 | |
| CN | 112907973 A | | 6/2021 | |
| CN | 113282726 A | * | 8/2021 | ............... G06N 3/08 |
| CN | 112699662 B | * | 8/2022 | ............ G06N 3/047 |
| CN | 115017144 A | * | 9/2022 | ........... G06F 16/215 |
| CN | 112907973 B | | 4/2023 | |
| DE | 202013005144 U1 | | 10/2013 | |
| GB | 2595412 A | | 11/2021 | |
| JP | H0749529 A | | 2/1995 | |
| JP | 2008210850 A | | 9/2008 | |
| JP | 2008211850 A | | 9/2008 | |
| JP | 2019139737 A | | 8/2019 | |
| KR | 101831204 B1 | | 2/2018 | |
| WO | 2013044145 A1 | | 3/2013 | |
| WO | 2018054326 A1 | | 3/2018 | |
| WO | 2018201423 A1 | | 11/2018 | |
| WO | 2020194004 A1 | | 10/2020 | |
| WO | 2022006295 A1 | | 1/2022 | |
| WO | 2022123199 A1 | | 6/2022 | |

OTHER PUBLICATIONS

United States Patent and Trademark Office, "Final Office Action," issued in connection with U.S. Appl. No. 17/566,135, dated Jul. 25, 2024, 17 pages.

United States Patent and Trademark Office, "Final Office Action," issued in connection with U.S. Appl. No. 18/476,978, dated Aug. 14, 2024, 22 pages.

United States Patent and Trademark Office, "Notice of Allowance and Fee(s) Due," issued in connection with U.S. Appl. No. 17/710,538, dated Aug. 14, 2024, 8 pages.

International Searching Authority, "International Preliminary Report on Patentability," issued in connection with International Application No. PCT/US2023/011859, mailed on Aug. 15, 2024, 6 pages.

United States Patent and Trademark Office, "Notice of Allowance and Fee(s) Due," issued in connection with U.S. Appl. No. 17/598,792, dated Aug. 27, 2024, 9 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Supplemental Notice of Allowability," issued in connection with U.S. Appl. No. 17/710,538, dated Sep. 11, 2024, 3 pages.

United States Patent and Trademark Office, "Non-Final Office Action," issued in connection with U.S. Appl. No. 17/710,649, dated Sep. 16, 2024, 12 pages.

United States Patent and Trademark Office, "Second Notice of Allowability," issued in connection with U. S. U.S. Appl. No. 18/191,642, dated Sep. 16, 2024, 2 pages.

United States Patent and Trademark Office, "Notice of Allowance and Fee(s) Due," issued in connection with U.S. Appl. No. 17/710,660, dated Sep. 25, 2024, 9 pages.

United States Patent and Trademark Office, "Advisory Action," issued in connection with U.S. Appl. No. 18/476,978, dated Oct. 7, 2024, 3 pages.

United States Patent and Trademark Office, "Notice of Allowance and Fee(s) Due," issued in connection with U.S. Appl. No. 17/566,135, dated Oct. 11, 2024, 9 pages.

Datasetlist, "Annotation tools for building datasets," Datasetlist.com, Dec. 2021, retrieved from https://www.datasetlist.com/tools/ on Apr. 1, 2022, 14 pages.

Github, "Doccano tool," Github.com, retrieved from https://github.com/doccano/doccano on Apr. 1, 2022, 12 pages.

Nielseniq Brandbank, "Nielsen Brandbank Product Library," retrieved on Apr. 1, 2022 from https://www.brandbank.com/us/product-library, 5 pages.

Github, "FIAT tool—Fast Image Data Annotation Tool," Github.com, retrieved from https://github.com/christopher5106/FastAnnotationTool on Apr. 1, 2022, 30 pages.

United States Patent and Trademark Office, "Notice of Allowance," issued in connection with U.S. Appl. No. 16/692,797, dated Apr. 5, 2022, 10 pages.

United States Patent and Trademark Office, "Corrected Notice of Allowability," issued in connection with U.S. Appl. No. 16/692,797, dated Apr. 22, 2022, 3 pages.

International Searching Authority, "International Preliminary Report on Patentability Chapter I", issued in connection with International Patent Application No. PCT/US2020/061269, dated May 17, 2022, 6 Pages.

Gu et al., "XYLayoutLM: Towards Layout-Aware Multimodal Networks for Visually-Rich Document Understanding," Conference on Computer Vision and Pattern Recognition (CVPR), Jun. 18, 2022, 10 pages.

Villota et al., "Text Classification Models for Form Entity Linking," International Symposium on Distributed Computing and Artificial Intelligence, Jul. 13, 2022, 10 pages.

Datasetlist, "A tool using OpenCV to annotate images for image classification, optical character reading, . . . ," Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 pages.

Crandall et al., "Extraction of special effects caption text events from digital video," IJDAR, Sep. 13, 2022, 20 pages.

United States Patent and Trademark Office, "Non-Final Action," issued in connection with U.S. Appl. No. 17/075,675, on Sep. 22, 2022, 12 pages.

Huang et al., "LayoutLMv3: Pre-training for Document AI with Unified Text and Image Masking," 30th ACM International Conference on Multimedia, Oct. 2022, 10 pages.

Zhang et al., "Multimodal Pre-training Based on Graph Attention Network for Document Understanding," IEEE Transactions on Multimedia, vol. 25, Oct. 22, 2022, 13 pages.

European Patent Office, "Extended European Search Report," issued in connection with European Patent Application No. 19921870, dated Oct. 12, 2022, 11 pages.

International Searching Authority, "International Search Report," issued in connection with International Patent Application No. PCT/US2022/034570, mailed on Oct. 20, 2022, 3 pages.

International Searching Authority, "Written Opinion," issued in connection with International Patent Application No. PCT/US2022/034570, mailed on Oct. 20, 2022, 5 pages.

Kim et al., "Donut: Document Understanding Transformer without OCR," arXiv, dated 2021, 29 pages.

United States Patent and Trademark Office, "Notice of Allowance and Fee(s) Due," issued in connection with U.S. Appl. No. 17/364,419, dated Nov. 4, 2022, 10 pages.

(56) References Cited

OTHER PUBLICATIONS

Canadian Patent Office, "Examiner's Report," issued in connection with Canadian Patent Application No. 3,124,868, mailed on Nov. 10, 2022, 4 pages.

United States Patent and Trademark Office, "Corrected Notice of Allowability," issued in connection with U.S. Appl. No. 17/364,419 on Nov. 15, 2022, 2 pages.

Zhong et al., "Hierarchical Message-Passing Graph Neural Networks," Data Mining and Knowledge Discovery, Nov. 17, 2022, 29 pages.

European Patent Office, "Extended Search Report," in connection with European Patent Application No. 22180113.7, issued Nov. 22, 2022, 2 pages.

Dwivedi et al., "Benchmarking Graph Neural Networks," Journal of Machine Learning Research, Dec. 2022, 49 pages.

United States Patent and Trademark Office, "Non-Final Office Action," issued in connection with U.S. Appl. No. 17/379,280, dated Dec. 2, 2022, 14 Pages.

European Patent Office, "European Search Report," issued in connection with Application No. 22184405.3, dated Dec. 2, 2022, 2 pages.

International Searching Authority, "International Preliminary Report on Patentability," issued in connection with PCT No. PCT/US2022/039931, issued on Dec. 13, 2022, 6 pages.

United States Patent and Trademark Office, "Notice of Allowance," issued in connection with U.S. Appl. No. 17/364,419, mailed on Jan. 4, 2023, 2 pages.

United States Patent and Trademark Office, "Non-Final Office Action," issued in connection with U.S. Appl. No. 17/883,309, dated Jan. 20, 2023, 14 pages.

United States Patent and Trademark Office, "Corrected Notice of Allowability," issued in connection with U.S. Appl. No. 17/364,419, filed Feb. 15, 2023, 2 pages.

United Kingdom Patent Office, "Examination Report under section 18(3)," issued in connection with U.K. Patent Application No. 2112299.9, dated Feb. 17, 2023, 2 pages.

United States Patent and Trademark Office, "Final Action," issued in connection with U.S. Appl. No. 17/075,675, on Mar. 7, 2023, 11 pages.

United States Patent and Trademark Office, "Non-Final Office Action," issued in connection with U.S. Appl. No. 17/345,940, dated Mar. 16, 2023, 13 pages.

United States Patent and Trademark Office, "Final Office Action," issued in connection with U.S. Appl. No. 17/379,280, dated May 5, 2023, 17 pages.

United States Patent and Trademark Office, "Notice of Allowance," issued in connection with U.S. Appl. No. 17/883,309, mailed on May 11, 2023, 9 pages.

European Patent Office, "Extended European Search Report," issued in connection with European Patent Application No. 22214553.4, dated May 17, 2023, 9 pages.

United States Patent and Trademark Office, "Advisory Action," issued in connection with U.S. Appl. No. 17/075,675, issued May 30, 2023, 3 pages.

International Searching Authority, "International Search Report," issued in connection with International Patent Application No. PCT/US2023/011859, mailed on Jun. 1, 2023, 3 pages.

International Searching Authority, "Written Opinion," issued in connection with International Patent Application No. PCT/US2023/011859, mailed on Jun. 1, 2023, 4 pages.

United States Patent and Trademark Office, "Notice of Allowance," issued in connection with U.S. Appl. No. 17/075,675, mailed on Jun. 26, 2023, 8 pages.

United States Patent and Trademark Office, "Notice of Allowance and Fee(s) Due," issued in connection with U.S. Appl. No. 17/345,940, mailed on Jul. 7, 2023, 8 pages.

Intellectual Property Office of United Kingdom, "Intention to Grant under Section 18(4)," issued in connection with British Patent Application GB2112299.9, mailed on Jul. 13, 2023, 2 Pages.

United States Patent and Trademark Office, "Advisory Action," issued in connection with U.S. Appl. No. 17/379,280, mailed on Jul. 18, 2023, 3 pages.

Gopal et al., "What is Intelligent Document Processing?" Nano Net Technologies, Jul. 19, 2023, retrieved from https://nanonets.com/blog/intelligent-document-processing/, 21 pages.

United States Patent and Trademark Office, "Corrected Notice of Allowability," issued in connection with U.S. Appl. No. 17/345,940, dated Jul. 20, 2023, 3 pages.

Canadian Intellectual Property Office, "Examiner's Report," issued in connection with Canadian Patent Application No. 3,124,868, dated Aug. 10, 2023, 5 pages.

United States Patent and Trademark Office, "Corrected Notice of Allowability," issued in connection with U.S. Appl. No. 17/883,309, mailed on Aug. 17, 2023, 2 Pages.

Intellectual Property of United Kingdom, "Notification of Grant," issued in connection with United Kingdom Patent Application No. 2112299.9, mailed on Aug. 29, 2023, 2 pages.

Amazon, "Intelligent Document Processing," Amazon Web Services, https://aws.amazon.com/machine-learning/ml-use-cases/document-processing/fintech/, retrieved on Sep. 8, 2023, 6 pages.

United States Patent and Trademark Office, "Corrected Notice of Allowability," issued in connection with U.S. Appl. No. 17/075,675, mailed on Oct. 10, 2023, 2 pages.

United States Patent and Trademark Office, "Non-Final Office Action," issued in connection with U.S. Appl. No. 17/710,538, dated Oct. 26, 2023, 6 Pages.

European Patent Office, "Extended European Search Report," issued in connection with European Patent Application No. 20891012.5, dated Nov. 17, 2023, 12 pages.

International Searching Authority, "International Preliminary Report on Patentability," issued in connection with International Patent Application No. PCT/US2022/034570, issued on Jan. 4, 2024, 7 pages.

United States Patent and Trademark Office, "Non-Final Office Action," issued in connection with U.S. Appl. No. 17/598,792, dated Dec. 29, 2023, 17 pages.

United States Patent and Trademark Office, "Non-Final Office Action," issued in connection with U.S. Appl. No. 18/191,642, dated Feb. 7, 2024, 18 pages.

United States and Patent and Trademark Office, "Non-Final Office Action," issued in connection with U.S. Appl. No. 17/566,135, dated Mar. 27, 2024, 13 pages.

European Patent Office, "Communication pursuant to Article 94(3) EPC," issued in connection with European Patent Application No. 19 921 870.2-1207, on Apr. 9, 2024, 7 pages.

United States Patent and Trademark Office, "Non-Final Office Action," issued in connection with U.S. Appl. No. 18/476,978, dated Apr. 18, 2024, 20 pages.

United States Patent and Trademark Office, "Notice of Allowance and Fee(s) Due," issued in connection with U.S. Appl. No. 17/710,538, dated Apr. 19, 2024, 8 pages.

Canadian Intellectual Property Office, "Office Action," issued in connection with Canadian Patent Application No. 3,182,471, dated May 28, 2024, 5 pages.

United States Patent and Trademark Office, "Non-Final Office Action," issued in connection with U.S. Appl. No. 17/710,660, on May 28, 2024, 9 pages.

United States Patent and Trademark Office, "Notice of Allowance and Fee(s) Due," issued in connection with U.S. Appl. No. 17/598,792, dated Jun. 17, 2024, 9 pages.

United States Patent and Trademark Office, "Notice of Allowance and Fee(s) Due," issued in connection with U.S. Appl. No. 18/191,642, dated Jun. 17, 2024, 9 pages.

United States Patent and Trademark Office, "Notice of Allowance and Fee(s) Due," issued in connection with U.S. Appl. No. 17/872,801, dated Jan. 30, 2025, 13 pages.

United States Patent and Trademark Office, "Supplemental Notice of Allowability," issued in connection with U.S. Appl. No. 17/710,538, dated May 8, 2024, 3 pages.

United States Patent and Trademark Office, "Corrected Notice of Allowability," issued in connection with U.S. Appl. No. 17/598,792, dated Jul. 3, 2024, 2 pages.

(56) References Cited

OTHER PUBLICATIONS

United States Patent and Trademark Office, "Corrected Notice of Allowability," issued in connection with U.S. Appl. No. 17/710,660, dated Oct. 9, 2024, 2 pages.
United States Patent and Trademark Office, "Corrected Notice of Allowability," issued in connection with U.S. Appl. No. 17/598,792, dated Oct. 10, 2024, 2 pages.
United States Patent and Trademark Office, "Corrected Notice of Allowability," issued in connection with U.S. Appl. No. 18/191,642, dated Oct. 11, 2024, 2 pages.
United States Patent and Trademark Office, "Corrected Notice of Allowability," issued in connection with U.S. Appl. No. 17/566,135, dated Oct. 23, 2024, 3 pages.
United States Patent and Trademark Office, "Corrected Notice of Allowability," issued in connection with U.S. Appl. No. 17/710,660, dated Oct. 30, 2024, 2 pages.
United States Patent and Trademark Office, "Notice of Allowability," issued in connection with U.S. Appl. No. 17/710,538, dated Nov. 20, 2024, 3 pages.
United States Patent and Trademark Office, "Second Corrected Notice of Allowability," issued in connection with U.S. Appl. No. 18/191,642, dated Nov. 22, 2024, 2 pages.
United States Patent and Trademark Office, "Corrected Notice of Allowability," issued in connection with U.S. Appl. No. 17/598,792, dated Dec. 5, 2024, 2 pages.
United States Patent and Trademark Office, "Notice of Allowance and Fee(s) Due," issued in connection with U.S. Appl. No. 18/476,978, dated Dec. 13, 2024, 11 pages.
United States Patent and Trademark Office, "Notice of Allowance and Fee(s) Due," issued in connection with U.S. Appl. No. 17/822,664, dated Dec. 31, 2024, 7 pages.
European Patent Office, "Communication pursuant to Article 94(3) EPC," issued in connection with European Patent Application No. 22180113.7, Jan. 7, 2025, 6 pages.
European Patent Office, "Communication pursuant to Article 94(3) EPC," issued in connection with European Patent Application No. 22214553.4, dated Jan. 7, 2025, 9 pages.
United States Patent and Trademark Office, "Notice of Allowance and Fee(s) Due," issued in connection with U.S. Appl. No. 18/148,947, dated Jan. 8, 2025, 12 pages.
United States Patent and Trademark Office, "Notice of Allowance and Fee(s) Due," issued in connection with U.S. Appl. No. 17/710,649, dated Jan. 16, 2025, 9 pages.
United States Patent and Trademark Office, "Corrected Notice of Allowability," issued in connection with U.S. Appl. No. 17/822,664, dated Jan. 16, 2025, 2 pages.
United States Patent and Trademark Office, "Corrected Notice of Allowability" issued in connection with U.S. Appl. No. 17/566,135, dated Jan. 16, 2025, 3 pages.
Yadati et al., "HyperGCN: Hypergraph Convolutional Networks for Semi-Supervised Classification," Proceedings of the 33rd International Conference on Neural Information Processing Systems, Dec. 2019, 18 pages.
International Searching Authority, "International Search Report," issued in connection with International Patent Application No. PCT/IB2019/000299, dated Dec. 23, 2019, 2 pages.
International Searching Authority, "Written Opinion," issued in connection with PCT No. PCT/IB2019/000299, mailed on Dec. 23, 2019, 4 pages.
GitHub, "Tesseract OCR," Tesseract Repository on GitHub, 2020, retrieved from https://github.com/tesseract-ocr/ on Mar. 17, 2022, 3 pages.
Carbonell et al., "Named Entity Recognition and Relation Extraction with Graph Neural Networks in Semi Structured Documents," 2020 International Conference on Pattern Recognition (ICPR), Jan. 10, 2021, 6 pages.
Zacharias et al., "Image Processing Based Scene-Text Detection and Recognition with Tesseract," arXiv (CoRR), dated Apr. 17, 2020, 6 pages.

Liu et al., "RoBERTa: A Robustly Optimized BERT Pretraining Approach," International Conference on Learning Representations, Apr. 30, 2020, 13 pages.
Xu et al., "LayoutLM: Pre-training of Text and Layout for Document Image Understanding," International Conference on Knowledge Discovery & Data Mining, Jun. 16, 2020, retrieved from https://arxiv.org/pdf/1912.13318.pdf, 9 pages.
Dong et al. "HNHN: Hypergraph Networks with Hyperedge Neurons," ArXiv abs/2006.12278, Jun. 22, 2020, 11 pages.
Yu et al., "PICK: Processing Key Information Extraction from Documents using Improved Graph Learning—Convolutional Networks," International Conference on Pattern Recognition (ICPR), Jul. 18, 2020, retrieved from https://arxiv.org/pdf/2004.07464.pdf, 8 pages.
Chen et al., "HGMF: Heterogeneous Graph-Based Fusion for Multimodal Data with Incompleteness," Proceedings of the 26th ACM SIGKDD International Conference on Knowledge Discovery & Data Mining, dated Aug. 20, 2020, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16, 2020, 11 pages.
Zhu et al., "Heterogeneous Mini-Graph Neural Network and Its Application to Fraud Invitation Detection," 2020 IEEE International Conference on Data Mining (ICDM), Nov. 17, 2020, 9 pages.
Bandyopadhyay et al., "Hypergraph Attention Isomorphism Network by Learning Line Graph Expansion," 2020 IEEE International Conference on Big Data, 2020, 10 pages.
Arroyo et al., "Multi-label classification of promotions in digital leaflets using textual and visual information," Proceedings of the Workshop on Natural Language Processing in E-Commerce, Dec. 12, 2020, 10 pages.
Deepdive, "Distant Supervision," Stanford University, 2021, retrieved from http://deepdive.stanford.edu/distant_supervision on Jul. 12, 2023, 2 pages.
Nguyen et al. "End-to-End Hierarchical Relation Extraction for Generic Form Understanding," International Conference on Pattern Recognition (ICPR), Jun. 2, 2021, 8 pages.
International Searching Authority, "Written Opinion," mailed in connection with International Patent Application No. PCT/US2020/061269, on Mar. 11, 2021, 4 pages.
International Searching Authority, "International Search Report," issued in connection with International Patent Application No. PCT/US2020/061269, Mar. 11, 2021, 2 pages.
United States Patent and Trademark Office, "Non-Final Office Action," issued in connection with U.S. Appl. No. 16/692,797, dated Mar. 16, 2021, 12 pages.
Google, "Detect Text in Images," Mar. 29, 2021, retrieved from http://cloud.google.com/vision/docs/ocr, 16 pages.
Xu et al., "LayoutXLM: Multimodal Pre-training for Multilingual Visually-rich Document Understanding," arXiv, Apr. 2021, 10 pages.
Ma et al., "Graph Attention Networks with Positional Embeddings," Pacific-Asia Conference on Knowledge Discovery and Data Mining, May 11, 2021, 13 pages.
Chen et al., "TextPolar: irregular scene text detection using polar representation," International Journal on Document Analysis and Recognition (IJDAR), May 23, 2021, 9 pages.
Li et al., "SelfDoc: Self-Supervised Document Representation Learning," 2021 IEEE/CVF Conference on Computer Vision and Pattern Recognition (CVPR), Jun. 20, 2021, 10 pages.
Hwang et al., "Spatial Dependency Parsing for Semi-Structured Document Information Extraction," International Joint Conference on Natural Language Processing (IJCNLP), 2021, retrieved from https://arxiv.org/pdf/2005.00642.pdf, 14 pages.
Li et al., "StructuralLM: Structural Pre-training for Form Understanding," 59th Annual Meeting of the Association for Computational Linguistics, Aug. 2021, 10 pages.
Xu et al., "LayoutLMv2: Multi-modal Pre-training for Visually-rich Document Understanding," 59th Annual Meeting of the Association for Computational Linguistics (ACL), arXiv, dated Jan. 10, 2022, 13 pages.

(56) References Cited

OTHER PUBLICATIONS

Huang et al., "UniGNN: a Unified Framework for Graph and Hypergraph Neural Networks," 30th International Joint Conference on Artificial Intelligence (IJCAI), Aug. 19, 2021, 9 pages.
Tang et al., "MatchVIE: Exploiting Match Relevancy between Entities for Visual Information Extraction," International Joint Conference on Artificial Intelligence, Aug. 19, 2021, 7 pages.
Qian et al., "A Region-Based Hypergraph Network for Joint Entity-Relation Extraction," Knowledge-Based Systems. Volume 228, Sep. 2021, 8 pages.
Prabhu et al., "MTL-FoUn: A Multi-Task Learning Approach to Form Understanding," 2021 International Conference on Document Analysis and Recognition (ICDAR), Sep. 5, 2021, 5 pages.
Davis et al., "Visual FUDGE: Form Understanding via Dynamic Graph Editing," International Conference on Document Analysis and Recognition (ICDAR), Sep. 5, 2021, 16 pages.
Powalski et al., "Going Full-TILT Boogie on Document Understanding with Text-Image-Layout Transformer," International Conference on Document Analysis and Recognition, Sep. 5, 2021, 17 pages.
Garncarek et al., "LAMBERT: Layout-Aware Language Modeling for Information Extraction," International Conference on Document Analysis and Recognition (ICDAR), Sep. 5, 2021, 16 pages.
Shen et al., "LayoutParser: A Unified Toolkit for Deep Learning Based Document Image Analysis," International Conference on Document Analysis and Recognition, Sep. 5, 2021, retrieved from https://arxiv.org/pdf/2103.15348.pdf, 16 pages.
Hong et al., "BROS: A Pre-trained Language Model Focusing on Text and Layout for Better Key Information Extraction from Documents," Sep. 10, 2021, retrieved from https://arxiv.org/pdf/2108.04539.pdf, 13 pages.
Appalaraju et al., "DocFormer: End-to-End Transformer for Document Understanding," Sep. 20, 2021, retrieved from https://arxiv.org/pdf/2106.11539.pdf, 22 pages.
International Searching Authority, "International Preliminary Report on Patentability," issued in connection with PCT No. PCT/IB2019/000299, issued on Sep. 28, 2021, 3 pages.
United States Patent and Trademark Office, "Final Office Action," issued in connection with U.S. Appl. No. 16/692,797, dated Oct. 27, 2021, 14 pages.
International Searching Authority, "International Search Report," issued in connection with International Patent Application No. PCT/US2022/039931, mailed on Nov. 4, 2021, 3 pages.
International Searching Authority, "Written Opinion," issued in connection with International Patent Application No. PCT/US2022/039931, mailed on Nov. 4, 2021, 4 pages.
European Patent Office, "Communication pursuant to Rules 161(2) and 162 EPC," issued in connection with European Patent Application No. 19921870.2, issued Nov. 5, 2021, 3 pages.
Zhang et al., "Entity Relation Extraction as Dependency Parsing in Visually Rich Documents," Empirical Methods in Natural Language Processing (EMNLP), Nov. 7, 2021, 10 pages.
Hwang et al., "Cost-Effective End-to-end Information Extraction for Semi-structured Document Images," Empirical Methods in Natural Language Processing (EMNLP), Nov. 7, 2021, 9 pages.
Li et al., "StrucTexT: Structured Text Understanding with Multi-Modal Transformers," ACM International Conference on Multimedia (ACM Multimedia), arXiv, Nov. 8, 2021, 9 pages.
Gu et al., "UniDoc: Unified Pretraining Framework for Document Understanding," 35th Conference on Neural Information Processing Systems (NeurIPS 2021), Dec. 6, 2021, 12 pages.
Park et al. "CORD: A Consolidated Receipt Dataset for Post-OCR Parsing," Workshop on Document Intelligence, 2019, 4 pages.
Wang et al., "LiLT: A Simple yet Effective Language-Independent Layout Transformer for Structured Document Understanding," Annual Meeting of the Association for Computational Linguistics (ACL), 2022, 11 pages.
United States Patent and Trademark Office, "Advisory Action," issued in connection with U.S. Appl. No. 16/692,797, dated Feb. 16, 2022, 4 pages.

Levenshtein, "Binary Codes Capable of Correcting Deletions, Insertions, and Reversals," Soviet Physics—Doklady, Cybernetics and Control Theory, vol. 10, Issue 8, Feb. 1966, 4 pages.
Smith et al., "Identification of Common Molecular Subsequences," Reprinted Journal of Molecular Biology, 1981, 3 pages.
Govindan et al., "Character Recognition—A Review," Pattern Recognition, vol. 23, Issue 7, Jul. 20, 1990, 13 pages.
Poulovassilis et al., "A nested-graph model for the representation and manipulation of complex objects," ACM Transactions on Information Systems, vol. 12, Issue 1, Jan. 2, 1994, 34 pages.
Hochreiter et al., "Long Short-Term Memory," Neural Computation, vol. 9, Nov. 15, 1997, 46 pages.
Ng et al., "On Spectral Clustering: Analysis and an Algorithm," NIPS'01: Proceedings of the 14th International Conference on Neural Information Processing Systems: Natural and Synthetic, Jan. 2001, 8 pages.
Lowe, "Distinctive Image Features from Scale-Invariant Key points," International Journal of Computer Vision (HCV), Jan. 5, 2004, 20 pages.
Marinai, "Introduction to Document Analysis and Recognition," Machine Learning in Document Analysis and Recognition, 2008, 20 pages.
Vogel et al., "Parallel Implementations of Word Alignment Tool," Software Engineering, Testing, and Quality Assurance for Natural Language Processing, Jun. 2008, 10 pages.
O'Gorman et al., "Document Image Analysis," IEEE Computer Society Executive Briefings, 2009, 125 pages.
Leicester et al., "Using Scanner Technology to Collect Expenditure Data," Fiscal Studies, vol. 30, Issue 3-4, 2009, 29 pages.
Oliveira et al., "A New Method for Text-Line Segmentation for Warped Documents," International Conference Image Analysis and Recognition, Jun. 21, 2010, 11 pages.
Krizhevsky et al., "ImageNet Classification with Deep Convolutional Neural Networks," International Conference on Neural Information Processing Systems, 2012, 9 pages.
Chung et al., "Empirical Evaluation of Gated Recurrent Neural Networks on Sequence Modeling," ArXiv abs/1412.3555, 2014, 9 pages.
Nshuti, "Mobile Scanner and OCR (A First Step Towards Receipt to Spreadsheet)," 2015, 3 pages.
Ronneberger et al., "U-Net: Convolutional Networks for Biomedical Image Segmentation," Medical Image Computing and Computer-Assisted Intervention, May 18, 2015, 8 pages.
Lecun et al., "Deep Learning," Nature, vol. 521, May 28, 2015, 9 pages.
Genereux et al., "NLP Challenges in Dealing with OCR-ed Documents of Derogated Quality," Workshop on Replicability and Reproducibility in Natural Language Processing, Jul. 2015, 6 pages.
Ren et al., "Faster R-CNN: Towards Real-Time Object Detection with Region Proposal Networks," International Conference on Neural Information Processing Systems, Dec. 7, 2015, 14 pages.
Kim et al., "Character-Aware Neural Language Models," Proceedings of the Thirtieth AAAI Conference on Artificial Intelligence, 2016, 9 pages.
Redmon et al., "You Only Look Once: Unified, Real-Time Object Detection," Conference on Computer Vision and Pattern Recognition (CVPR), May 9, 2016, 10 pages.
Osindero et al., "Recursive Recurrent Nets with Attention Modeling for OCR in the Wild," Conference on Computer Vision and Pattern Recollection, Jun. 27, 2016, 10 pages.
Joulin et al., "Bag of Tricks for Efficient Text Classification," Proceedings of the 15th Conference of the European Chapter of the Association for Computational Linguistics, Aug. 9, 2016, 5 pages.
Konda et al., "Magellan: Toward Building Entity Matching Management Systems Over Data Science Stacks," Proceedings of the VLDB Endowment, vol. 9, Issue 13, 2016, 4 pages.
Kipf et al., "Semi-Supervised Classification with Graph Convolutional Networks," 5th International Conference on Learning Representations, Apr. 24, 2017, 14 Pages.
Bojanowski et al., "Enriching Word Vectors with Subword Information," Journal Transactions of the Association for Computational Linguistics, vol. 5, Jun. 2017, 12 pages.

(56) References Cited

OTHER PUBLICATIONS

Ozhiganov et al., "Deep Dive Into OCR for Receipt Recognition," DZone, dated Jun. 21, 2017, 18 pages.
Bartz et at, "STN-OCR: A Single Neural Network for Text Detection and Text Recognition," Computer Vision and Pattern Recognition, dated Jul. 27, 2017, 9 pages.
Vaswani et al., "Attention is all you need," Advances in Neural Information Processing Systems, 31st Conference on Neural Information Processing Systems, Dec. 6, 2017, 15 pages.
Hui, "mAP (mean Average Precision) for Object Detection," Medium, Mar. 6, 2018, retrieved from https://medium.com/@jonathan_hui/map-mean-average-precision-for-object-detection-45c121a31173 on May 11, 2020, 2 pages.
Velickovic et al., "Graph Attention Networks," International Conference on Learning Representations, Feb. 4, 2018, 12 pages.
Mudgal et al., "Deep learning for entity matching: A design space exploration," Proceedings of the 2018 International Conference on Management of Data, Jun. 10-15, 2018, 16 pages.
Wick et al., "Calamari—A High-Performance Tensorflow-based Deep Learning Package for Optical Character Recognition," Digital Humanities Quarterly, Jul. 5, 2018, retrieved from https://arxiv.org/ftp/arxiv/papers/1807/1807.02004.pdf, 12 pages.
Akbik et al., "Contextual String Embeddings for Sequence Labeling," In Proceedings of the 27th International Conference on Computational Linguistics, Aug. 2018, 12 pages.
Ray et al., "U-PC: Unsupervised Planogram Compliance," European Conference on Computer Vision, 2018, retrieved from https://openaccess.thecvf.com/content_ECCV_2018/papers/Archan_Ray_U-PC_Unsupervised_Planogram_ECCV_2018_paper.pdf, 15 pages.
Follmann et al., "MVTec D2S: Densely Segmented Supermarket Dataset," European Conference on Computer Vision, Sep. 8, 2018, 17 pages.
Li et al., "Extracting Figures and Captions from Scientific Publications," Short Paper, CIKM18, Oct. 22-26, 2018, 4 pages.
Elfwing et al., "Sigmoid-Weighted Linear Units for Neural Network Function Approximation in Reinforcement Learning," Journal of the International Neural Network Society, vol. 107, Nov. 2018, 18 pages.
Huang et al., "Mask R-CNN with Pyramid Attention Network for Scene Text Detection," Nov. 22, 2018, retrieved from https://arxiv.org/abs/1811.09058, 9 pages.
Wikipedia, "Precision & Recall," retrieved from https://en.wikipedia.org/wiki/Precision_and_recall on Dec. 17, 2018, 12 pages.
Artificial Intelligence & Image Analysis, "Intelligent Automation Eliminates Manual Data Entry From Complex Documents," White Paper, accessed on Jan. 30, 2019, 3 pages.
Artificial Intelligence & Image Analysis, "Historic Document Conversion," Industry Paper, accessed on Jan. 30, 2019, 4 pages.
Loshchilov et al., "Decoupled Weight Decay Regularization," 2019 International Conference on Learning Representations, May 6, 2019, 19 pages.
Nathancy, "How do I make masks to set all of image background, except the text, to white?", stackoverflow.com, https://stackoverflow.com/questions/56465359/how-do-i-make-masks-to-set-all-of-image-background-except-the-text-to-white, Jun. 5, 2019, 5 pages.
Devlin et al., "BERT: Pre-training of Deep Bidirectional Transformers for Language Understanding," In Conference of the North American Chapter of the Association for Computational Linguistics, Jun. 24, 2019, 16 pages.
Qasim et al., "Rethinking Table Recognition using Graph Neural Networks," Inernational Conference on Document Analysis and Recognition, Jul. 3, 2019, 6 pages.
Feng et al., "Computer vision algorithms and hardware implementations: A survey," Integration: the VLSI Journal, vol. 69, Jul. 27, 2019, 12 pages.
Hu et al., "Semi-supervised Node Classification via Hierarchical Graph Convolutional Networks," 2019 International Joint Conference on Artificial Intelligence, Aug. 10, 2019, 8 pages.
Zhong et al., "PubLayNet: largest document dataset ever for document layout analysis," International Conference on Document Analysis and Recognition, Aug. 16, 2019, 8 pages.
Jaume et al., "FUNSD: A Dataset for Form Understanding in Noisy Scanned Documents," International Conference on Document Analysis and Recognition, Sep. 20, 2019, 6 pages.
European Patent Office, "Communication pursuant to Article 94(3) EPC," issued in connection with European Application No. 22184405.3, dated Mar. 19, 2025, 4 pages.
United States Patent and Trademark Office, "Non-Final Office Action," issued in connection with U.S. Appl. No. 18/148,928, dated Aug. 4, 2025, 14 pages.
United States Patent and Trademark Office, "Non-Final Office Action", issued in connection with U.S. Appl. No. 17/941,547, filed Aug. 27, 2025, 7 pages.
European Patent Office, "Communication pursuant to Article 94(3) EPC," issued in connection with European Patent Application No. 19921870.2, dated Sep. 8, 2025, 4 pages.

* cited by examiner

METHODS, SYSTEMS, ARTICLES OF MANUFACTURE, AND APPARATUS TO TAG SEGMENTS IN A DOCUMENT

RELATED APPLICATION

This patent claims the benefit of U.S. Provisional Patent Application No. 63/407,029, which was filed on Sep. 15, 2022. U.S. Provisional Patent Application No. 63/407,029 is hereby incorporated herein by reference in its entirety. Priority to U.S. Provisional Patent Application No. 63/407,029 is hereby claimed.

FIELD OF THE DISCLOSURE

This disclosure relates generally to computer-based image analysis and, more particularly, to methods, systems, articles of manufacture, and apparatus to tag segments in a document.

BACKGROUND

Artificial intelligence (AI) leverages computers and machines to mimic problem solving and decision making challenges that typically require human intelligence. Machine learning (ML), deep learning (DL), computer Vision (CV), and Natural Language Processing (NLP) are powerful AI techniques that can be combined to process an image. For example, these AI techniques can be applied to an image of a purchase document to extract information.

Figure 1:
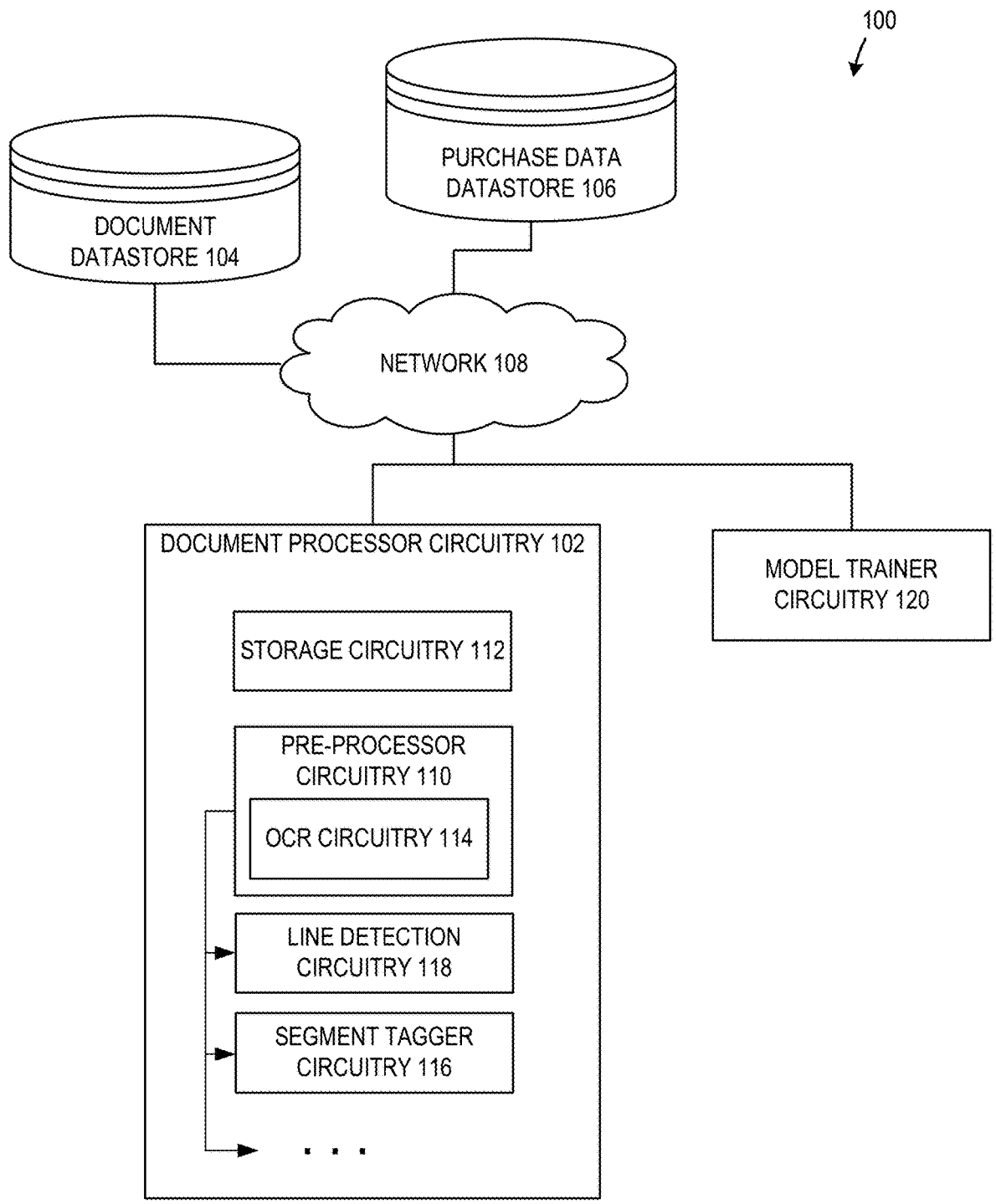
FIG. 1 is a block diagram of an example data collection system constructed in accordance with teachings of this disclosure to extract data from a document.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Market dynamics (e.g., forces that affect a market) have been evolving for several years, but it was dramatically accelerated by of the novel coronavirus (COVID-19) and its impact on shopping behaviors and channel composition (e.g., online and offline shopping habits, etc.). To help market participants (e.g., manufacturers, retailers, etc.) understand these forces, a market research entity (e.g., a market research company, etc.) collects and analyzes market data from which to extract actionable insights. A common source of such market data includes purchase data provided by, for example, consumer panels, which are groups of individuals (e.g., panelists, panel members, etc.) who agree to provide their purchase data and/or other types of data (e.g., demographic data) to the market research entity. A panelist(s) typically represents at least one demographic (e.g., geographic location, household income, presence of children, etc.), enabling the marketing research entity to extract insights about consumer purchase behavior beyond just a sale of a product. Consequently, this data source can be particularly important for the market research entity.

A current technique for obtaining purchase data from panelists incudes the manual input of purchase information (e.g., to an application executing on an electronic device) for each product purchased during a transaction. Purchase information can include, for example, purchase date, store name, store city, product code, product price, product quantity, etc. However, such a collection method is time-consuming and often burdensome for the panelists. These burdens often diminish the panelists' willingness to collaborate with the market research entity long term, resulting in reduced data capture by the market research entity. In some examples, such a collection method can result in lower-quality data due to panelist error during input of the purchase information and/or due to fraud. To reduce these burdens and prevent fraud, the market research entity may allow the panelists to capture and/or transmit an image of a purchase document (e.g., a receipt, an invoice, a cash slip, etc.) to the market research entity for purchase data extraction. A purchase document, as disclosed herein, refers to a document (e.g., physical, digital, etc.) that memorializes a transaction between a consumer and a retailer and, thus, can be used to extract the purchase data.

Traditional approaches to extract purchase data from a purchase document include maintaining a (e.g., human) workforce to manually transcribe, digitize, and store extracted purchase data in a database. However, the manual extraction of information from purchase documents is resource intensive, time consuming, prone to error, and costly. Further, the volume of purchase documents that need to be processed is often too great to be practically processed on a manual basis, especially in a fast and efficient manner to enable meaningful intelligence with actionable insights. Moreover, uploaded images of the purchase documents often include issues with image quality, document defects (e.g., wrinkles, ripples, etc.), image perspective and/or viewpoint issues (e.g., rotations, etc.), etc. resulting in difficult or otherwise non-readable purchase documents. These challenges decrease an effectiveness, an efficiency, and/or an accuracy of the traditional, manual decoding process.

Modernization of consumer panels is needed for market research entities to grow and stay relevant in data analysis markets. In particular, there is a need to automate the transcription and extraction of information from images of unstructured purchase documents. Receipts, for example, are highly unstructured documents that differ in layout (e.g., based on store, location, etc.), size (e.g., based on an amount of items purchase, a store, etc.), language (e.g., based on a country, etc.), etc. Advances in the Artificial Intelligence (AI) fields of Machine Learning (ML), Deep Learning (DL), Computer Vision (CV), and Natural Language Processing (NLP) are making it possible to develop technological systems capable of outperforming humans at information extraction tasks. These AI techniques are important facilitators of hyperautomation, which includes the orchestrated use of multiple technologies, tools, and/or platforms.

Improving data collection techniques and/or improving the technical field of market research/analysis is crucial for market researches entities to provide the granular and accurate data that market participants need to make essential business decisions. Indeed, there is a growing need across industries to automate tasks related to the extraction and storage of information from documents, especially from unstructured documents. An example key stage of the information extraction (IE) process includes entity tagging (e.g., information tagging, segment tagging, word tagging, etc.). Entity tagging is a technique that includes identifying information (e.g., key information, specific data, etc.) in unstructured text and classifying the information into a set of predefined categories. In examples disclosed herein, entity tagging and segment tagging are used interchangeably, and refer to the tagging (e.g., labeling) of specific data in unstructured text according to the predefined categories. As used herein, a segment (e.g., a text segment) is a string of characters detected by an Optical Character Recognition (OCR) engine, usually at the word level. As disclosed herein, an entity refers to a word or phrase that represents a noun, such as a proper name, a description, a numerical expression of time or quantity, etc. Thus, an entity can include one or more text segments. For example, an entity may include a product description in a receipt, and the product description may include one or more text segments.

Example methods, systems, articles of manufacture, and apparatus are disclosed herein to tag and/or otherwise label text segments detected in a document according to their meaning (e.g., semantic meaning, lexical meaning, etc.) (e.g., store address, phone, item description, item price, etc.). A text segment is a lowest-level region(s) of text information output by an OCR engine. A type or level of segment (e.g., at word level, paragraph level, etc.) can depend on a specific use case and/or the OCR engine utilized during an IE process. Examples disclosed herein are described in relation to the processing of purchase documents and, thus, utilize word-level text segments. However, it is understood that other use cases can utilize text segments having other levels of granularity, such as character-level segments, sentence-level segments, paragraph-level segments, etc.

Segment tagging is an important IE task that allows a system to understand different parts of a document and to focus on information deemed most relevant. Traditional techniques to tag text segments in a document include the use of publicly available Deep Learning (DL) models, which are highly complex models that include a huge number of parameters (e.g., hundreds of millions). The large amount of parameters included in these models makes them tremendously slow, computationally expensive and intensive, and hinders periodical re-training and/or other improvements of the DL models. Additionally, many of these DL models are purely or mostly based on Transformer architectures, resulting in other limitations. For example, Transformer architectures are fully connected architectures in which each segment interacts with the rest. Thus, a number of parameters in Transformer-based models increases rapidly with the number of segments. Further, Transformer architectures need a defined sequence limit (e.g., a predefined maximum sequence length) and, therefore, suffer from sequence truncation problems for relatively large sequences.

To address the foregoing issues, examples disclosed herein generate and/or otherwise implement technological improvements to enable an example segment tagging model(s) to tag text segments on documents. Given a list of text segments extracted from a document by an OCR engine, at least one goal of the example segment tagging model(s) disclosed herein is to tag (e.g., associate, label, mark, code, etc.) each text segment with its corresponding semantic category from a closed list. Examples disclosed herein are described in relation to the processing of purchase documents and, thus, example semantic categories discussed herein correspond to purchase data of interest (e.g., store name, receipt date, receipt total, item quantity, item total, etc.). However, it is understood that other sematic categories can be used in additional or alternative examples, such as in other use cases.

Examples disclosed herein apply different AI techniques to facilitate the technological (e.g., automatic) tagging of text segments in a document. In particular, examples disclosed herein utilize an example Transformer encoder architecture for text feature extraction and graph and recurrent neural networks for text segment interaction. A graph neural network (e.g., GNN, GraphNN, etc.) is a type of artificial neural network that can efficiently process data represented as a graph. Graph-based representations are flexible and capable of adapting to complex layouts, which makes them suitable for working with highly unstructured documents. Example segment tagging models disclosed herein operate on a graph-based representation(s) of a given document (e.g., receipt) in which the text segments are represented as nodes of a graph. Examples disclosed herein model the segment tagging task as a node classification task, where the semantic category of a node is dependent on the features of its neighbor nodes and on the global context. GNNs are highly effective and efficient in learning relationships between nodes locally and globally.

Further, GNNs are effective and efficient for memory and processing time at least partially because a GNN is not a fully-connected method. A number of text segments in a purchase document can highly vary (e.g., from a couple to hundreds) depending on a retailer from which the document originated, a number of products purchased, etc. Purchase documents can easily be unfeasible to process for methods based on fully connected networks or on Transformers, where each node needs to interact with the rest. Rather, GNNs are suitable for this type of highly sparse data structure. By utilizing a GNN, a number of interactions that need to be evaluated in purchase documents can be limited based on bounding box coordinates generated by the OCR engine to accelerate the inference and reduce an amount of resources needed to perform the task. Accordingly, examples disclosed herein improve the operation and/or efficiency of a computing device by reducing a number of node interactions to evaluate, which reduces computational resource usage.

Certain example segment tagging models disclosed herein generate a structure for a graph representing a purchase document by generating nodes (e.g., segment nodes) and sampling edges among the nodes. As noted above, the nodes are to represent respective text segments detected in a purchase document. Disclosed examples generate embeddings for the nodes (e.g., node embeddings) by concatenating respective text and region (e.g., position, geometric, etc.) features extracted from the text segments. For each text segment, information available for generating the node embeddings includes at least a text string and a rotated bounding box generated by the OCR engine. Example segment tagging models disclosed herein extract the text features from the text string and the region features from coordinates of the rotated bounding boxes (discussed in further detail below).

Extracting text features from text segments can be accomplished using different techniques, which can be generally grouped into two categories or types of approaches. A first approach includes extracting the text features from the text segments attending to their semantic meaning. The first approach typically includes assigning a feature vector to each text string (e.g., at word level) using an embedding layer and a predefined dictionary. The embedding layer can be pretrained on another dataset or it can be trained directly from scratch, using the training set for generating the dictionary. This first approach has some important drawbacks. For example, the first approach is very prone to overfitting, especially for the words that are used less frequently. Further, words that are not in the dictionary get assigned a useless embedding, meaning the model will not perform well on unseen data or on noisy data (for instance, due to parsing errors in the OCR engine). Additionally, a size of the dictionary must be huge to include as many words as possible, as does a size of a dataset for generating the dictionary. This size problem is exacerbated when working with multilingual data.

Moreover, the first approach is problematic when dealing with wide ranges of numbers. When working with prices, for example, a model based on the first approach cannot extract general rules for the prices and, instead, needs to treat each number as an independent word. However, it is not feasible to include all possible numbers in the dictionary. While the foregoing issues can be at least partially mitigated by decomposing the text in known character grams and extracting the features therefrom, such a strategy can further increase size of the dictionary. Further, such models are still overly sensitive to noise and unseen data.

A second approach for extracting text features from text segments includes extracting the text features from the text segments attending to (e.g., focusing on) their composition (e.g., characters in a text string). The second approach includes inspecting a text segment's characters as well as their position within the text segment, and finding relevant relationships between the characters. For example, the second approach may include tokenizing each character in a text segment and assigning embeddings to the tokenized characters. In some such examples, a corresponding sequence of embeddings for a text segment may be padded to a fixed length, enriched with a positional encoding, and fed to a Transformer encoder to cause the characters to interact with each other. A mean embedding for each text segment output by the Transformer encoder can be determined by removing the padding embeddings and averaging the remaining embeddings for the text segment.

Example segment tagging models disclosed herein employ the second approach to improve an efficiency and an accuracy of the model. For example, employing the second approach drastically reduces a size of a dictionary because the second approach operates at the character level. In some examples, characters in text segments are tokenized based on American Standard Code for Information Interchange (ASCII), which is a character encoding standard for electronic communication. ASCII is used to represent control characters (e.g., "space," "delete," etc.) and printable characters (e.g., symbols, letters, integers, etc.) in electronic devices. In such examples, a size of the dictionary is 128 characters. However, the tokens can be defined using other rules in additional or alternative examples. For example, other encoding standards can be used in additional or alternative examples.

The second approach is more robust to unseen or noisy data. For example, when characters are missing or are different, example segment tagging models disclosed herein can still find relationships between the rest of the characters. Furthermore, the second approach reduces or otherwise eliminates the numbers range problem. For example, example segment tagging models disclosed herein can learn general rules to group the text segments of the same type under the same meaning. For example, an example segment tagging model(s) may learn that when a digit is followed by a dot and then by other digits, the text segment is a price without having to analyze all the possible numbers. Moreover, example segment tagging models disclosed herein analyze words at a lower level, without attending wastefully to the semantic meaning and finding more general rules, which reduces overfitting. These foregoing advantages of the second approach also reduce an amount of data needed to pretrain an embedding layer for text feature extraction.

Example segment tagging models disclosed herein pass the node embeddings and the graph structure through an example GNN to update features of the nodes with information from their neighbors. In particular, example segment tagging models disclosed herein apply an example graph attention network (GAN)-based model in which the nodes iteratively update their representations by exchanging information with their neighbors. A GAN is a GNN that includes Graph Attention (GAT) Layers for pairwise message passing, enabling the weights for the message passing to be computed directly inside the attention layer using input node features. In some examples, the example GAN-based model enables the node embeddings to be enriched (e.g., supplemented, augmented, modified, etc.) with information from their neighbors. The example GAN-based model generates example first (e.g., GNN) enriched embeddings corresponding to the text segments.

While GNNs provide a flexible architecture in which each segment need only interact with a reduced number of neighbor segments, GNNs do not consider positions of segments in an input sequence. As disclosed herein, a sequence refers to ordered data. For example, a document sequence is an ordered list of text segments detected in a purchase document. Considering the sequential order of the text segments is important for a segment tagging task because a proper understanding of a document involves not only a layout of the words, but also their sequential order. Different approaches can be used to overcome this GNN limitation, such as injecting the sequential information into the node embeddings, using the sequential information within an attention mechanism of the GAT layers, combining the GNN with recurrent layers of a recurrent neural network, etc. Injecting the sequential information into the nodes embeddings includes defining how to extract and combine the sequential information with the rest of the features, which can be tedious and lead to a more unstable model. In addition, this approach requires increasing the number of GNN layers and/or a number of parameters of the GNN to learn from this new source of information.

Example segment tagging models disclosed herein incorporate sequential information corresponding to an order of the text segments by passing the GNN enriched embeddings output by the example GAN-based model through an example recurrent neural network (RNN). In particular, example segment tagging models disclosed herein pass the GNN enriched embeddings through example recurrent layers of the RNN to generate second (e.g., RNN) enriched embeddings. In some examples, the RNN includes Long Short Term Memory (LSTM) layers. In some examples, the RNN includes bidirectional Gated Recurrent Unit (GRU) layers. For example, relative to the LSTM layers, the GRU layers may include fewer parameters and execute faster with a similar level of accuracy. Example RNNs disclosed herein enable the nodes to learn the sequential information directly from the order of the segments with a reduced number of parameters and without altering the GNN architecture.

In some examples, segment tagging models disclosed herein obtain sequential information for a sequence of text segments from an example line detection model. For example, prior to processing a purchase document with the example segment tagging model, the example line detection model can be applied to the purchase document to cluster the text segments by line. In some examples, the example line detection model obtains the list of text segments generated by the OCR engine and groups text segments into line clusters representing lines of the receipt. In some examples, the line detection model provides an ordered listing of the text segments by line (e.g., top to bottom and left to right). However, the example segment tagging model can obtain the sequential information using another technique(s) in additional or alternative examples, such as through the bounding box coordinates, another model, etc.

Example segment tagging models disclosed herein apply an example classification head to the RNN enriched embeddings (e.g., the node embeddings from a last layer of the example RNN). The example classification head is structured to transform the RNN enriched embeddings into class probabilities. Example segment tagging models disclosed herein classify the text segments by selecting, for each text segment, a category having a relatively highest class probability.

Disclosed examples outperform previous technological approaches used within the industry for entity or segment tagging in terms of accuracy, processing time, and resource consumption. Example segment tagging models disclosed herein are efficient, accurate, and lightweight. Certain previous DL models include more than 100 million parameters. In some examples, an example segment tagging model disclosed herein can include approximately 4 million parameters, but can include more or less parameters in other examples. Because examples disclosed herein utilize the bounding box and text features, example segment tagging models disclosed herein do not operate over an image. As such, disclosed examples avoid a need to load and preprocess the image, and avoid the use of an image backbone for extracting a feature map. In other words, examples disclosed herein eliminate the unnecessary consumption of computing resources by not utilizing an image. Example segment tagging models disclosed herein are capable of outperforming current entity tagging models in terms of processing time (e.g., 30 times faster in training) while achieving similar or better results in prediction accuracy.

While examples disclosed herein are described in relation to tagging text segments in a document, disclosed examples can be applied to other levels of information in additional or alternative examples. For example, techniques disclosed herein can be applied to an entity level, which refers to one or more text segments that have some type of relation (e.g., semantic, spatial, etc.). Further, techniques disclosed herein can be applied to higher levels, such as groups entities.

While examples disclosed herein are described in relation to processing receipts, disclosed examples can be applied to other use cases additionally or alternatively. There are vast amounts of data in the form of documents. A myriad of businesses and use cases involve the automatic processing and understanding of documents and their contents to convert unstructured data into their semantically structured components. Market research entities, for example, typically collect data from different sources and in different formats. For instance, examples disclosed herein can be applied to other types of purchase documents (e.g., invoices, purchase orders, cash slips, etc.), other types of documents, tagging of different types of information, etc. Further, segment tagging models enabled by examples disclosed herein can be combined with other (e.g., more complex) tasks to force the model to have a better understanding of the document layout and improve results for all tasks.

Referring now to the figures, FIG. 1 is a block diagram of an example data collection system 100 constructed in accordance with teachings of this disclosure to extract information from documents. In some examples, the data collection system 100 implements an example data collection pipeline to collect purchase data. In some examples, the data collection system 100 is associated with a market research entity that collects data from which to generate actionable insights. In some examples, the data collection system 100 and/or portions thereof cause one or more actions on behalf of businesses regarding data driven decisions. For example, the data collection system 100 may cause an adjustment(s) to a supply chain(s), a price/promotion campaign(s), a product offer to conform to consumer needs (e.g., more sustainable and/or eco-friendly products, etc.). In some examples, the data collection system 100 and/or portions thereof may be used by a business, agency, organization, etc. to monitor effects of consumer buying behaviors on society and economies. The market research entity can use the data collection system 100 to process purchase document images provided by consumers to extract purchase data and remove the burdens of manually providing information for each product purchased in a basket (e.g., one or more items purchased in a single transaction).

In some examples, the data collection system 100 is implemented by one or more servers. For example, the data collection system 100 can correspond to a physical processing center including servers. In some examples, at least some functionality of the data collection system 100 is implemented via an example cloud and/or Edge network (e.g., AWS®, Microsoft® Azure™, etc.). In some examples, at least some functionality of the data collection system 100 is implemented by different amounts and/or types of electronic devices.

The data collection system 100 of FIG. 1 includes example document processor circuitry 102, which is communicatively coupled to an example document datastore 104 and an example purchase data datastore 106 via an example network 108. The document processor circuitry 102 of FIG. 1 is structured to obtain an image of a purchase document stored in the document datastore 104, extract information from the purchase document, and to store the extracted information in the purchase data datastore 106. However, the document processor circuitry 102 can be structured in any manner that enables the data collection system 100 to collect purchase data from documents and/or images thereof from panelists.

The document datastore 104 is structured to store purchase documents such as (but not limited to) invoices, receipts, purchase orders, cash slips, etc. and/or images thereof. In some examples, the document datastore 104 stores images of purchase documents (e.g., receipts) uploaded by panelists (e.g., via an electronic device(s) and/or an application installed thereon). For example, a panelist may use an electronic device such as (but not limited to) a laptop, a smartphone, an electronic tablet, etc. to scan, capture, or otherwise obtain an image of a receipt and transmit the image to the document datastore 104 (e.g., via the network 108). In some examples, the document datastore 104 can include purchase document images from other sources, such as retailers, vendors, receipt collection entities, etc.

The purchase data datastore 106 is structured to store data generated by the document processor circuitry 102. In some examples, the purchase data datastore 106 is implemented as a platform that provides for agile cloud computing. For example, the purchase data datastore 106 can be used for storing datasets associated with the collected receipts and for serving models jointly with microservices. In some examples, the purchase data datastore 106 implements an example data system (e.g., a database management system, a reference data system, etc.).

In the illustrated example of FIG. 1, the document processor circuitry 102 includes or otherwise implements an example Intelligent Document Processing (IDP) system (e.g., an information extraction pipeline, extraction system, an information extraction framework, etc.). For example, the document processor circuitry 102 can obtain (e.g., retrieve, receive, etc.) purchase document images from the document datastore 104 and pass the purchase document images through one or more stages or components of the IDP system to identify product- and/or purchase-related data in the document. At least one such stage is a layout extraction stage includes a segment tagging stage, during which text segments are tagged according to their semantic meaning.

In the illustrated example of FIG. 1, the document processor circuitry 102 includes example pre-processor circuitry 110, example storage circuitry 112, example OCR circuitry 114, and example segment tagger circuitry 116. The example pre-processor circuitry 110 is structured to pre-process an input purchase document (e.g., a receipt) image. For example, the pre-processor circuitry 110 may remove background clutter from a receipt image to extract a receipt region from the (e.g., by cropping the background clutter). In some examples, detecting the receipt region can improve the extraction process by focusing on a specific region of the receipt image. The pre-processor circuitry 110 of FIG. 1 is structured to generate a list (e.g., array, sequence, etc.) of text segments to be used during the segment tagging task.

The pre-processor circuitry 110 of FIG. 1 includes example OCR circuitry 114, which is structured to extract machine-readable text from the receipt. In some examples, each text segment output by the OCR circuitry 114 is represented as or otherwise includes a text string (e.g., a string of characters, transcribed characters, etc.) and a bounding box (e.g., text box) that defines a location of the text segment within the document. As used herein, a "bounding box" represents characteristics (e.g., a group of coordinates, etc.) of a shape (e.g., a rectangle) enclosing a text string. In examples disclosed herein, the text segments are at the word level and can include (but are not limited to) a word, a partial word, an abbreviation, a name, a number, a symbol, etc. For example, a text segment can correspond to a price of a purchased product, a word in a product description, a number representing a quantity, etc. Example implementations of the pre-processor circuitry 110 and the OCR circuitry 114 are discussed in further detail in relation to FIG. 7.

In some examples, the document processor circuitry 102 includes example line detection circuitry 118. In some such examples, the example line detection circuitry 118 obtains the list of text segments and outputs clusters of the text segments that are grouped by line. In some examples, the line detection circuitry 118 generates sequential information for the text segments, such as information about an order of the text segments. For example, the line detection circuitry 118 can connect text segments by line such that each segment can only be connected to one segment on each lateral side of the segment. However, the other techniques can be used to generate sequential information for the text segments in additional or alternative examples.

In some examples, each text segment may include a line indication (e.g., a line number) and a position indicator (e.g., a position in the line) that can identify a position of the text segment relative to other text segments in the purchase document and/or the purchase document itself. However, it is understood that the sequential information may be indicated in other manners in additional or alternative examples.

The example segment tagger circuitry 116 is structured to obtain the list of text segments (e.g., generated by the OCR circuitry 114) and their position in the purchase document (e.g., generated by the line detection circuitry 118) and to tag (e.g., label) the text segments according to their semantic meaning. As discussed above, this task can be modeled as a segment or node tagging task, where at least one goal is to tag the text segments with their corresponding semantic category from a closed list. For instance, the semantic categories in the case of a purchase receipt can include (but are not limited to) store address, phone number, date, time, item description, item value, etc.

To execute the segment tagging task, the segment tagger circuitry 116 is structured to generate a graph (e.g., a graph structure) to represent a purchase document. For example, the segment tagger circuitry 116 samples edges (e.g., candidate edges) among the text segments, which are to be represented by nodes of the graph. The segment tagger circuitry 116 also extracts features from the text segments to generate embeddings for the nodes. For example, the segment tagger circuitry 116 generates text embeddings using a Transformer encoder at a character level, generates region embeddings from coordinates of bounding box of the text segments, and adds the text and region embeddings.

The segment tagger circuitry 116 passes the graph and corresponding node embeddings through example GAT layers to enrich the node embeddings with information from their neighbors (e.g., neighbor nodes). To add sequential information to the nodes, which is not provided by the GAT layer, the segment tagger circuitry 116 processes enriched node embeddings using RNN layers. In other words, the segment tagger circuitry 116 passes enriched embeddings generated by the GAT layers sequentially through layers of an RNN to add sequence information.

The segment tagger circuitry 116 processes node embeddings output by the RNN layers based on an example linear layer and an example softmax layer to generate output probabilities for each text segment. The output probabilities correspond to respective predefined categories. For example, if a segment tagging model includes 30 predefined categories, the segment tagger circuitry 116 generates 30 class probabilities for each text segment. The segment tagger circuitry 116 classifies the text segments by assigning a text segment with a respective category (e.g., a store address, a phone number, a date, a time, an item description, an item value, etc.) having the highest probability. In doing so, the segment tagger circuitry 116 generates example semantic text segments (e.g., tagged text segments). The example segment tagger circuitry 116 is discussed in further detail in relation to FIG. 2. An example implementation of the segment tagger circuitry 116 is discussed in relation to FIG. 4.

In some examples, the example document processor circuitry 102 implements at least a portion of a document decode service (DDS). For example, the segment tagger circuitry 116 and/or the document processor circuitry 102 can provide the semantic text segments to one or more downstream components that perform additional operations of the receipt image and/or information extracted therefrom. As disclosed herein, the terms upstream and downstream refer to relative positions in a pipeline. For example, components upstream of the segment tagger circuitry 116 refer to components of the document processor circuitry 102 that operate on a document and/or data extracted therefrom prior to the segment tagger circuitry 116, while components downstream of the segment tagger circuitry 116 refer to components of the document processor circuitry 102 that operate on the document and/or data extracted therefrom after to the segment tagger circuitry 116. In some examples, the segment tagger circuitry 116 utilized information generated by upstream components of the document processor circuitry 102. In some examples, the semantic text segments generated by the segment tagger circuitry 116 may be used in downstream tasks, such as entity mapping, receipt field extraction, and/or database cross-coding. In other words, the segment tagger circuitry 116 can be part of a larger end-to-end system for unstructured document understanding.

The document processor circuitry 102 of FIG. 1 is communicatively coupled to the example model trainer circuitry 120, which is structured to train example models that can be utilized by the document processor circuitry 102 and/or components thereof. For example, the model trainer circuitry 120 of FIG. 1 is used to train the example segment tagger model as implemented by the example segment tagger circuitry 116.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, neural network models are used. Using neural networks enable modeling of complex patterns and prediction problems. In general, machine learning models/architectures that are suitable to use in the example approaches disclosed herein will be Transformers, Graph Neural Networks, and/or Recurrent Neural Networks. For example, certain example Graph Neural Networks disclosed herein utilize Graph Attention Layers and certain example graph neural networks disclosed herein bidirectional gated recurrent layers. However, other machine learning models/architectures can be used in additional or alternative examples, such as long short-term memory layers, linear layers, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In some examples, training is performed from scratch for 30 epochs using a batch of 4 documents on each iteration. In some examples, training is performed using the model trainer circuitry 120, but can be trained elsewhere in additional or alternative examples. Training is performed using hyperparameters that control how the learning is performed (e.g., a learning rate, a number of layers to be used in the machine learning model, etc.). In some examples, the selected optimizer is Adam, with an initial learning rate of 3e-4 and a reduction factor of 0.1 in epochs 20 and 25. To reduce overfitting, the model trainer circuitry 120 of FIG. 1 applies a dropout of 0.1 for the Transformer encoder and before each GAT layer, and a dropout of 0.2 for the GRU layers and before the final linear layer.

Training is performed using training data. In some examples, the training data originates from an example public (e.g., publicly available) dataset(s) of purchase receipts and/or an example private dataset(s) of purchase receipts. However, other datasets can be used in additional or alternative examples. Because supervised training is used, the training data is labeled. The public dataset includes images and bounding box and text annotations for OCR. In some examples, the private dataset(s) includes multi-level semantic labels for sematic parsing and relation extraction tasks. The public dataset(s) includes ground truth (GT) annotations (e.g., labels) for the segment tagging task. In ground truth, each text segment in the public dataset(s) is associated with a "category" field. In some examples, the public dataset includes 30 different categories. In some examples, each text segment is associated with a "group_id" field for joining the text segments at entity level (e.g., for another task, such as entity level tagging). In some examples, the public dataset is sub-divided into training, validation, and test sets using a ratio of 80/10/10.

Labeling of the private dataset(s) can be applied by the market research entity. In some examples, the private dataset is more challenging than the public dataset(s). For example, the training receipts in the private dataset may include varying height, densities, and image qualities. In some examples, the training receipts may include rotation and all kinds of wrinkles. In some examples, the training receipts can include a large amount of different receipt layouts and/or the layouts of the receipts can vary greatly from one receipt to another. In some examples, a quality of the training receipts related to paper and printing defects and image capture may be worse than in the public dataset(s), which means injecting more noise and variability into the input training data.

The training receipts in the private dataset include receipt region annotations. Thus, the training receipts may be pre-processed by cropping the images, filtering text segments that are outside a given training receipt, and shifting coordinates of the remaining text segments to the cropped pixel space. Each training receipts includes annotated text segments. The available annotated GT information for each text segment is a rotated bounding box, a text string, a category, and a product ID (in case the text segment belongs to a product cluster). In some examples, the private dataset is sub-divided into training, validation, and test sets using a ratio of 70/10/20. It is understood, however, that training can be applied using any one dataset or a combination of datasets. The dataset(s) can be a dataset discussed herein and/or additional or alternative datasets.

The characters of the text segments for all datasets are converted into ASCII characters (discussed in further detail below). For each dataset, the text segments of each document are sorted from top to bottom and from left to right to have a consistent ordering for the RNN layers. In some examples, the maximum character length for an example Transformer encoder (e.g., Transformer encoder 308 of FIG. 3) is 30, meaning that longer text segments are truncated. In some examples, the model trainer circuitry 120 uses binary cross entropy as the loss function for the public dataset(s) and focal loss for the private dataset to deal with high class imbalance. In some such examples, the segment tagging model is finetuned for 1000 steps with batch size of 64, an initial learning rate of 1e-4, and a reduction factor 0.1 in step 900.

While an example training implementation has been disclosed herein, training can be implemented in other manners in additional or alternative examples. In some examples, a manner of training an example segment tagging model as disclosed herein can be based on a specific use case and/or tailored to a specific use case. For example, a market research entity may utilize an internal dataset to enable the example segment tagging model to learn from training data that reflects data the model will applied to in an inference phase.

Once training is complete, the model is deployed for use as an executable construct that processes an input and provides an output based on the network of nodes and connections defined in the model. The model is stored at example storage circuitry 112 and/or in respective components. The model may then be executed by the segment tagger circuitry 116 and/or components thereof.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 2:
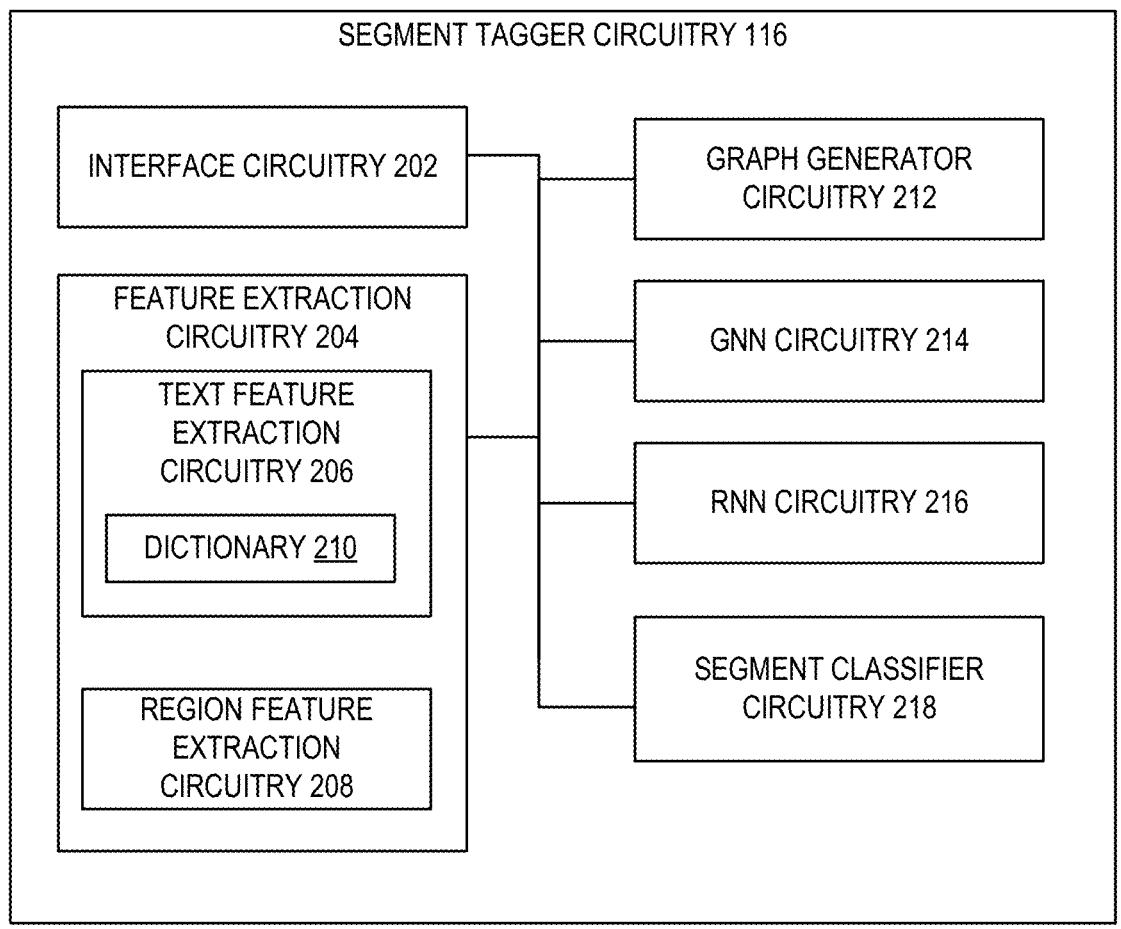
FIG. 2 is a block diagram of example segment tagger constructed in accordance with teachings of this disclosure for tagging text segments detected in a document.

FIG. 2 is a block diagram of the example segment tagger circuitry 116 of FIG. 1 constructed in accordance with teachings of this disclosure to tag text segments detected in a document. The segment tagger circuitry 116 of FIG. 2 may be instantiated (e.g., creating an instance of, bring into being for any length of time, materialize, implement, etc.) by processor circuitry such as a central processing unit executing instructions. Additionally or alternatively, the segment tagger circuitry 116 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In some examples, the segment tagger circuitry 116 implements an example segment tagging model. In some such examples, the components of the segment tagger circuitry 116 (discussed below) define an architecture or otherwise implement a framework of the segment tagging model. In some examples, the segment tagger circuitry 116 implements an example segment tagging pipeline. The segment tagger circuitry 116 includes example interface circuitry 202, which is structured to retrieve, receive, and/or otherwise obtain data from other components of the document processor circuitry 102. For example, the interface circuitry 202 of FIG. 2 obtains an example list of text segments (e.g., from the pre-processor circuitry 110 and/or the OCR circuitry 114) and sequential information for the text segments (e.g., from the line detection circuitry 118). In other words, the text segments (e.g., segments) and their sequential order are an input to the segment tagger circuitry 116. In some examples, the segment tagger circuitry 116 operates on the text segments in their sequential order.

The segment tagger circuitry 116 includes example feature extraction circuitry 204, which is structured to extract features from the text segments and to generate embeddings (e.g., feature embeddings, node embeddings, etc.) for nodes representing the text segments based on the extracted features. The embeddings are dense numerical feature representations of the text segments, which correspond to nodes of a graph representing the purchase document. The embeddings include a series of floating point values, a number of which specify a length of an embedding. In some examples, the feature extraction circuitry 204 implements or otherwise includes a first stage of a segment tagging pipeline by extracting features from any number of text segments. In some examples, the feature extraction circuitry 204 is instantiated by processor circuitry executing feature extraction instructions and/or configured to perform operations such as those represented by the flowcharts of FIGS. 10-12.

As of a purchase document includes three sources of discussed above, an example text segment available information for feature extraction: a text string, a rotated bounding box, and a sequential position (e.g., a position in a sequence of text segments). For a given text segment, the feature extraction circuitry 204 of FIG. 2 extracts text (e.g., textual) features from the text string and region (e.g., regional) features from the rotated bounding box. The feature extraction circuitry 204 generates text embeddings from the extracted text features and region embeddings from the extracted region features. The feature extraction circuitry 204 concatenates the text embeddings and the region embeddings to generate example node embeddings for the text segments.

The sequential positions of the text segments of a purchase document are implicit in the order of the text segments, which is used by example RNN layers (discussed in further detail below). While it is possible to inject the sequential position into the node features by using, for example, a positional embedding, such an approach would require selecting a maximum position and truncating sequences that exceed this length. Such a technique would yield a drop of accuracy. In addition, positional embeddings do not work well with relatively long sequences. Purchase documents can include sequences with lengths of hundreds, which is a relatively large sequence. Thus, the feature extraction circuitry 204 does not explicitly inject the sequential position into the node features. In some examples, the feature extraction circuitry 204 prevents the explicit injection of sequential position features into the node embeddings. For example, the feature extraction circuitry 204 may detect an attempt to inject the sequential position features into the node embeddings, and prevent or block the injection.

Figure 3:
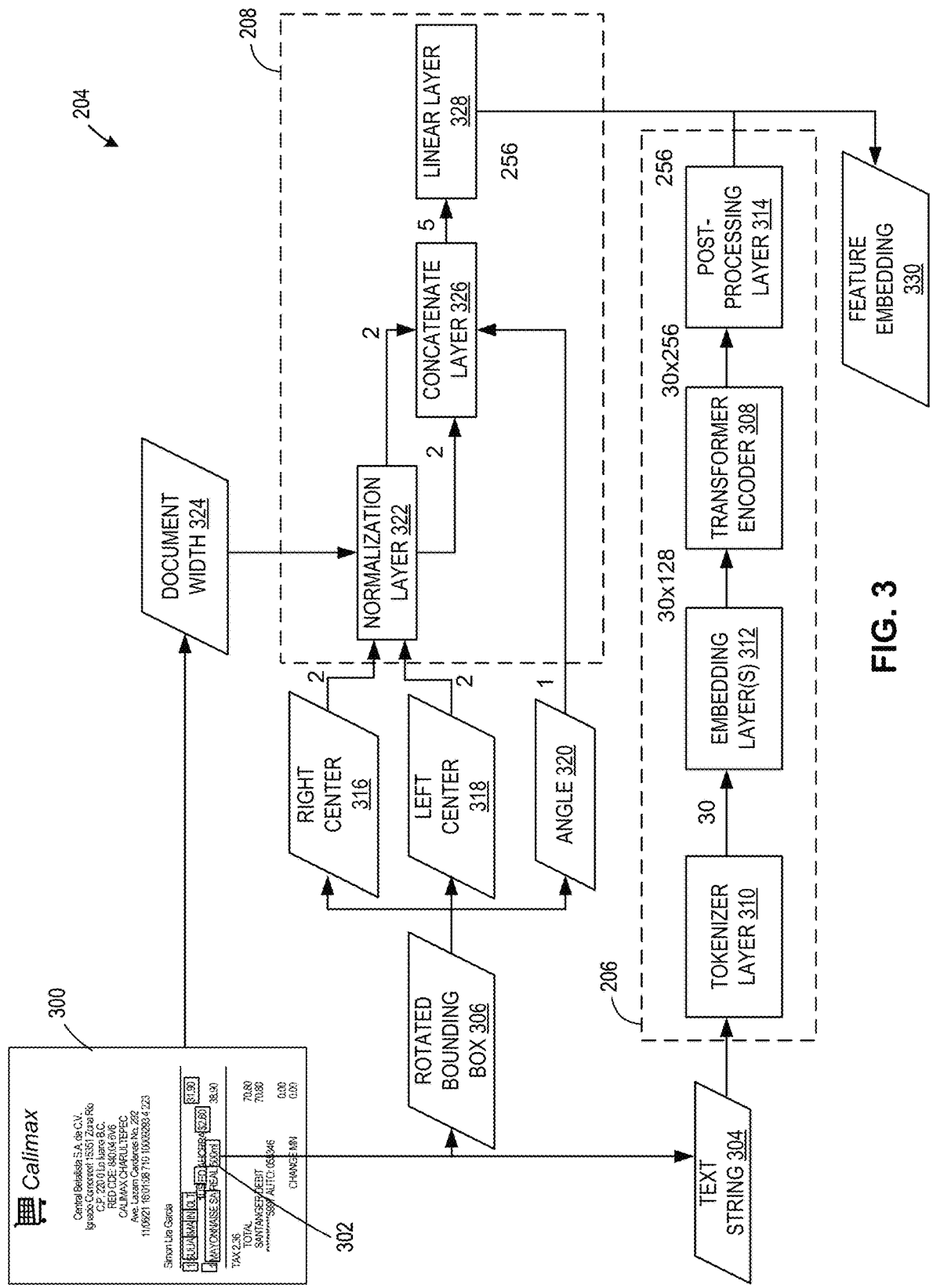
FIG. 3 illustrates an example implementation of example feature extraction circuitry of the example segment tagger circuitry of FIGS. 1-2 in accordance with teachings of this disclosure.

FIG. 3 illustrates an example implementation of the example feature extraction circuitry 204 of FIG. 2 to extract features from text segments and generate node embeddings based on the features. As illustrated in FIG. 3, an example text segment 302 of an example receipt 300 includes an example text string 304 and an example rotated bounding box 306. The feature extraction circuitry 204 passes the text string 304 to example text feature extraction circuitry 206. Further, the feature extraction circuitry 204 passes the rotated bounding box 306 to example region feature extraction circuitry 208.

The text feature extraction circuitry 206 is structured to extract text features from the text string 304 of the text segment 302. The text feature extraction circuitry 206 encodes text of the text string 304 using an example Transformer encoder 308. A transformer is a type of DL model that utilizes a self-attention mechanism to process sequential input data. The Transformer encoder 308 differentially weights each part of an input data stream (e.g., characters in the text string 304), providing context information for positions in the input sequence. Previous techniques for segment tagging encode text using a transformer that considers all words in an input document sequence. In other words, previous techniques pass the text segments through a Transformer encoder in batches (e.g., sentence batches, document batches, etc.) at the word level, rather than at the character level. The Transformer encoder 308 of the segment tagger circuitry 116 passes the text segments 302 through the Transformer encoder 308 at the character level (e.g., in word batches). That is, the text feature extraction circuitry 206 applies the Transformer encoder 308 to process each text segment 302 in the receipt 300 separately, which results in a faster model and removes the need to truncate a sequence if the receipt 300 is too long.

The Transformer encoder 308 operates on numerical data. Thus, the text feature extraction circuitry 206 converts the text string 304 into a word embedding, which is a vector of real numbers that is to represent the text segment 302. In particular, the text feature extraction circuitry 206 passes the text string 304 through an example tokenizer layer 310 and an example embedding layer(s) 312. The tokenization layer 310 is structured to obtain the text string 304 and to tokenize the text string 304 at the character level. Tokenization refers to the process of parsing input text data into a sequence of meaningful parts that can be embedded into a vector space and is a key aspect of working with text data. The embedding layer(s) 312 is structured to generate the word embedding using the tokenized text string.

The text string 304 includes a string of characters. As disclosed herein, a character refers to a minimum unit of text that has semantic value. The text feature extraction circuitry 206 tokenizes the text segment 302 by splitting the text string 304 (e.g., raw input) into character (e.g., character-level) tokens, which are identified based on specific rules of the tokenizer layer 310. For example, the tokenizer layer 310 of FIG. 3 applies a definition for the tokens using an example dictionary 210 (FIG. 2). That is, the text feature extraction circuitry 206 splits the text string 304 of the text segment 302 into character-level chunks called tokens using characters and/or other entries in the dictionary 210. However, the tokenizer layer 310 can apply other rules in additional or alternative examples, such as use-case specific rules, regular expressions, delimiters, etc.

The tokens output by the tokenizer layer 310 may be represented as integers. For example, the text feature extraction circuitry 206 of FIGS. 2-3 utilizes ASCII, which is a character encoding standard for electronic communication that can be used to represent text in electronic devices. As disclosed herein, a character set is a collection of characters and a coded character set is a character set in which each character corresponds to a code point (e.g., a unique identifier, a unique number, etc.) within a code space. ASCII is used for representing 128. English characters in the form of numbers, with each letter being assigned to a specific number in the range 0 to 127. Thus, ASCII includes 128 code points, including 95 printable characters, meaning the length of the dictionary 210 is 128. For example, the ASCII code for uppercase "A" is 65, lowercase "a" is 97, uppercase "B" is 66, character "$" is 36, etc. The code points can be identified using an ASCII table in the dictionary 210. Certain examples may use a variant and/or extension of ASCII, such as for use with languages other than English, and/or another encoding standard.

The text feature extraction circuitry 206 passes the text string 304 through the tokenizer layer 310, which may output tokens for one or more characters in the text string 304. In some examples, the text feature extraction circuitry 206 converts the characters in the text string 304 from another character encoding standard to ASCII. For example, the characters may initially be encoded using Unicode, which is an information technology standard for the handling of text expressed in most writing systems. For example, the OCR circuitry 114 outputs may output the text string 304 using Unicode characters. In some such examples, the text feature extraction circuitry 206 converts the Unicode data to ASCII data using, for example, an example mapping function (e.g., a Unidecode Python package having a unidecode( ) function structured to convert Unicode characters to ASCII characters). That is, the text feature extraction circuitry 206 may apply the unidecode( ) function to take Unicode data and try to represent it in ASCII characters (e.g., using transliteration tables). ASCII is incorporated into the Unicode character set as the first 128 symbols. The text feature extraction circuitry 206 is structured to remove characters that cannot be converted. The ASCII characters can then be used by the tokenizer layer 310 to generate the tokens for the text string 304.

In some examples, the tokenizer layer 310 applies a maximum character length (e.g., a sequence limit) for the text segment 302. For example, the maximum character length for the text segment 302 may be 30 characters. In some such examples, text segments 302 having more than 30 characters are truncated. However, the maximum character length can be larger or smaller in other examples (e.g., depending on a specific use case, etc.).

The text feature extraction circuitry 206 applies an example embedding layer(s) 312 to the tokens in the text string 304 to generate character embeddings for the text string 304. The embedding layer(s) 312 converts the tokens to dense vectors. In particular, the text feature extraction circuitry 206 applies the embeddings layer 312 to the tokenized ASCII characters of the text string 304 to generate a sequence of character embeddings (e.g., vectors) for the text segment 302. The character embeddings are associated with a dimension of 128 float values.

In some examples, the embeddings layer(s) 312 pads the sequence of character embeddings to a fixed length corresponding to the sequence limit. The embedding layer(s) 312 of FIG. 3 also enriches (e.g., augments) the sequence of character embeddings with a positional encoding. That is, the embeddings layer(s) 312 supplements the sequence of character embeddings with a positional encoding. A positional encoding is a fixed-size vector representation that encapsulates the relative positions of tokens within a target sequence. The positional encoding provides the Transformer encoder 308 with information about where the characters are in the input sequence of character embeddings. For example, for the Transformer encoder 308 to make use of the order of the sequence, the text feature extraction circuitry 206 injects information about the relative or absolute position of the tokens in the segment sequence. The text feature extraction circuitry 206 applies the embedding layer(s) 312 to add positional encodings to the character embeddings prior to execution of the Transformer encoder 308. The positional encodings have the same dimension (e.g., 128) as the character embeddings, so that the two can be summed. In some examples, a size of the embedding layer(s) 312 of FIG. 3 is 256.

The position encoded sequence of character embeddings for the text segment 302 is fed (e.g., passed to) the Transformer encoder 308 to cause the characters in the text string 304 to interact with each other. The text segments 302 for the receipt 300 are batched for the Transformer encoder 308, so each character only interacts with the rest of the characters of its text segment 302 and not with all the characters in the receipt 300. In some examples, the Transformer encoder 308 includes 3 layers with 4 heads and an internal dimension of 512. However, the Transformer encoder 308 can have a different architecture in additional or alternative examples. The Transformer encoder 308 outputs an updated position encoded sequence of character embeddings for the text segment 302 in which the character embeddings include sequential information.

The text feature extraction circuitry 206 applies an example post-processing layer 314 to the output of the Transformer encoder 308 to generate a text embedding for the text segment 302. In some examples, the text embedding for the text segment 302 is based on a mean of the updated position encoded sequence of character embeddings for the text segment 302. The post-processing layer 314 removes padding from the updated position encoded sequence of character embeddings for the text segment 302. Further, the post-processing layer 314 averages remaining ones of the updated position encoded sequence of character embeddings. The text feature extraction circuitry 206 outputs the example text embedding for the text segment 302.

The feature extraction circuitry 204 extracts particular geometric features from the bounding box 306. Specifically, the feature extraction circuitry 204 extracts an example right center coordinate 316 (e.g., a middle point between top-right and bottom-right vertices of the rotated bounding box 306), an example left center coordinate 318 (e.g., a middle point between top-left and bottom-left vertices of the rotated bounding box 306), and an example angle 320 (e.g., bounding box rotation, rotation angle, etc.). By utilizing the right and left center coordinates 316, 318, the feature extraction circuitry 204 ignores information related to a height of the bounding box. This omission is performed by design because instances of overfitting may otherwise occur. Further, the height of the text segment 302 is not a crucial feature for this task, as it might vary across text segments of the same text line, and it does not contain reliable information about the distance between different lines. The rotation angle 320 is an angle of the bounding box 306 (in radians, between $-\pi/2$ and $\pi/2$).

The example region feature extraction circuitry 208 applies an example normalization layer 322, which is structured to normalize the right and left center coordinates 316, 318. In particular, the normalization layer 322 normalizes the right and left center coordinates 316, 318 using an example width 324 of the receipt 300, as it is the most stable dimension. Purchase documents, especially receipts, may be unstructured, meaning that the number of lines and the height of the document can highly vary. Thus, normalizing right and left center coordinates 316, 318 relative to the width provides stability.

The region feature extraction circuitry 208 concatenates the normalized right center coordinate 316 (2 floats), the normalized left center coordinate 318 (2 floats), and the rotation angle 320 (1 float) from the bounding box 306 (e.g., via an example concatenate layer 326) to generate the example region embedding. The concatenated features for the text segment 302 include 5 float values. The region feature extraction circuitry 208 applies an example linear layer 328 to the concatenated features 316, 318, 320 to increase a dimension of the region embedding. In particular, the region feature extraction circuitry 208 increases the region embedding from an embedding size of 5 float values to an embedding size of 256. In other words, the linear layer 328 scales the dimension of the region embedding to match the dimension of the text embedding. The region feature extraction circuitry 208 outputs the example region embedding for the text segment 302.

The feature extraction circuitry 204 adds the text embedding and the region embedding to generate an example feature embedding 330 for the text segment 302. In doing so, the feature extraction circuitry 204 converts the text segment 302 into an array of numbers that represent the text segment. The feature embedding 330 is to be associated with a node representing the text segment 302. In some examples, the segment tagger circuitry 116 transmits the embeddings for the text segments to example GNN circuitry 214 to be passed through a GAN-based model with a graph representing the receipt 300.

Referring again to FIG. 2, the segment tagger circuitry 116 includes example graph generator circuitry 212, which is structured to generate a graph representing the receipt. The graph generator circuitry 212 does not utilize the features extracted by the feature extraction circuitry 204 and, thus, can operate in parallel (e.g., concurrently) with the feature extraction circuitry 204. However, the graph generator circuitry 212 and the feature extraction circuitry 204 can additionally or alternatively operate irrelative of one another. In some examples, the graph generator circuitry 212 is instantiated by processor circuitry executing graph generator instructions and/or configured to perform operations such as those represented by the flowchart of FIG. 10.

The graph generator circuitry 212 generates an example node for each text segment detected in the purchase document. In other words, ones of the nodes represent respective ones of the text segments detected in the document. Further, the graph generator circuitry 212 samples edges among the nodes. For example, the graph generator circuitry 212 obtains the rotated bounding boxes of the text segments detected by the OCR circuitry 114 and determines which neighbor text segment(s) can interact with a given text segment (e.g., during message passing) based on a proximity of the neighbors text segment(s) to the given text segment. As discussed in further detail below, the edges sampled by the graph generator circuitry 212 are used by the GNN circuitry 214 to perform message passing. In unstructured documents having an unknown variability in layouts, assumptions concerning constraints related to distances between the text segments cannot be used. Hence, examples disclosed herein utilize a novel edge sampling strategy (e.g., technique or function, which is represented as an example equation (1) below) that covers possible true positive (e.g., connects possible segments within the same line).

$$\text{Edge}_{A-B} = (|C_A^y - C_B^y| < H_A \times K) \quad \text{Equation (1)}$$

As indicated in equation (1), an edge from a first text segment (e.g., segment A) to a second text segment (e.g., segment B) is created if a vertical distance between their centers (C) is less than a height (H) of segment A (or segment B) multiplied by a constant (K). In other words, when equation (1) is true, segment A and segment B are linked by an edge. In some examples, the constant is set to two because the constant of two enables the graph generator circuitry 212 to generate connections between the segments and also between the segments of adjacent (e.g., previous and next) lines, and to consider the possible rotation of the document. However, the constant can be higher (which may increase resource consumption, but raise accuracy) or lower (which may lower accuracy, but reduce resource consumption). While other edge sampling techniques can be used additionally or alternatively, such as k-nearest neighbor or beta-skeleton, these techniques are prone to miss important connections, especially in highly unstructured document in which two segments that should be connected are at opposite ends of a line, which can reduce an accuracy of the model. The graph generator circuitry 212 transmits the sampled edges, which define the structure of the graph, to example GNN circuitry 214.

The segment tagger circuitry 116 includes the example GNN circuitry 214, which is structured to enrich the node embeddings of the text segments with information from their neighbor text segments. In some examples, the GNN circuitry 214 is instantiated by processor circuitry executing GNN instructions and/or configured to perform operations such as those represented by the flowchart of FIGS. 8 and 11. The GNN circuitry 214 obtains the graph structure with the nodes connected by the sampled edges from the graph generator circuitry 212 and the embeddings extracted from the text segments from the feature extraction circuitry 204. The GNN circuitry 214 applies a message passing stage in which the graph nodes iteratively update their representations by exchanging information with their neighbors.

Information needed for computing the message passing weights (e.g., textual and regional information) is already embedded in the node features. Taking advantage of this, the GNN circuitry 214 applies an example graph attention network (GAN) based model having Graph Attention Layers (GAT). In the GAT layers, the weights for the message passing are computed directly inside the layer using the input node features. The GAT layers are efficient in document understanding tasks. To avoid 0-in-degree errors (disconnected nodes) while using the GAT layers, a self-loop is added for each node, which means adding an edge that connects the node with itself.

The GNN circuitry 214 applies the example GAN-based model/architecture that includes three GAT layers, each of which is followed by a sigmoid linear unit function (SiLU activation) except for the last GAT layer. In some examples, the SiLU activations are used because they tend to work better for this use case than a rectified linear unit function (ReLU activation) and/or variants thereof. In some examples, residual connections are added in all the layers to accelerate the convergence of the model(s). However, it is noted that the GNN architecture can be structured differently in additional or alternative examples. For example, the GNN architecture can include more or less layers, additional or alternative types of layers, etc.

The GNN circuitry 214 of FIG. 2 also applies a global document node enhancement. The global node is connected bidirectionally to the rest of the nodes. The example GNN circuitry 214 computes global node's feature embedding by averaging all the input node embeddings, which accomplishes at least two tasks. First, it provides some context information to the nodes by gathering information from the whole graph. That is, the global node assists each node to capture the global information of the receipt. Second, it acts as a regularization term for the GAT layer weights, as it is not a real neighbor node. These global nodes are only considered during the message passing and they are discarded once the GNN stage is finished.

The GNN circuitry 214 passes the node features through the layers and activations to be enriched with the information from the neighbor nodes. Thus, the graph structure extracted from the receipt is injected to an attention mechanism to help each input node fully understand the receipt from both a local and a global perspective. The global node is attended to by each input node to assist the model to understand documents in a global aspect. The global nodes are only considered during the message passing and are discarded once the GNN stage is finished. The GNN circuitry 214 outputs first enriched node embeddings, which are transmitted to example RNN circuitry 216.

The segment tagger circuitry 116 includes the example RNN circuitry 216, which is structured to apply an example recurrent neural network (RNN) based model. An RNN is a type of artificial neural network that uses sequential data, enabling the RNN to take information from prior inputs to influence a current input and output. In particular, the RNN circuitry 216 applies an example bidirectional RNN based model. The bidirectional RNN-based model can pull previous inputs to make predictions about the current state as well as future data to improve the accuracy of it. In some examples, the RNN circuitry 216 is instantiated by processor circuitry executing RNN instructions and/or configured to perform operations such as those represented by the flowchart of FIG. 8.

The RNN circuitry 216 applies an example RNN-based model/architecture that includes two recurrent layers. The recurrent layers gather the information about the sequence order that the GAT layers are missing and inject it into the node embeddings. In some examples, the RNN-based model includes bidirectional Gated Recurrent Units (GRUs) with 256 hidden features size. However, the RNN-based model can include a different architecture in additional or alternative examples. For example, the RNN-based model may include LSTM layers. However, the GRU layers can results in a similar accuracy to the LSTM layers with less parameters and faster performance. The RNN circuitry 216 outputs second enriched (e.g., final) node embeddings, which are transmitted to example segment classifier circuitry 218. An example implementation of the RNN circuitry 216 is discussed in further detail below in relation to FIGS. 4 and 6.

The segment tagger circuitry 116 includes the example segment classifier circuitry 218, which is structured to classify the text segments. In some examples, the segment classifier circuitry 218 applies or otherwise implements an example classification head of the segment tagging model. In some examples, the segment classifier circuitry 218 is instantiated by processor circuitry executing segment classifier instructions and/or configured to perform operations such as those represented by the flowcharts of FIGS. 8 and 12.

The segment classifier circuitry 218 takes the final output embeddings for each node from the RNN-based model and transforms the final output embeddings into the class probabilities. The segment classifier circuitry 218 applies an example linear layer to the embeddings to generate example logistic units (logits). Further, the segment classifier circuitry 218 applies an example softmax layer (e.g., a softmax activation) to the logits to generate example normalized class probabilities. That is, the segment classifier circuitry 218 assigns an example decimal probability for each class of an exhaustive list of classes (e.g., each class in a multi-class problem) based on the softmax layer. For example, the segment classifier circuitry 218 may be structured to classify the text segments into one of 30 possible categories. In some such examples, the segment classifier circuitry 218 generates 30 class probabilities (e.g., one class probability for each class) for each text segment to be classified. The segment classifier circuitry 218 assigns a category to a text segment by selecting a category having the highest class probability value. The segment classifier circuitry 218 tags the text segments by associating each text segment with a selected category in a data structure, such as a data structure of a database.

In some examples, the segment tagger circuitry 116 includes means for generating feature embedding. For example, the means for generating feature embedding may be implemented by example feature extraction circuitry 204. In some examples, the segment tagger circuitry 116 includes means for generating a graph structure. For example, the means for generating a graph structure may be implemented by example graph generator circuitry 212. In some examples, the segment tagger circuitry 116 includes means for performing message weight passing. For example, the means for performing message weight passing may be implemented by example GNN circuitry 214. In some examples, the segment tagger circuitry 116 includes means for applying sequential information to a node. For example, the means for applying sequential information to a node may be implemented by example RNN circuitry 216. In some examples, the segment tagger circuitry 116 includes means for classifying text. For example, the means for classifying text may be implemented by example segment classifier circuitry 218.

Figure 13:
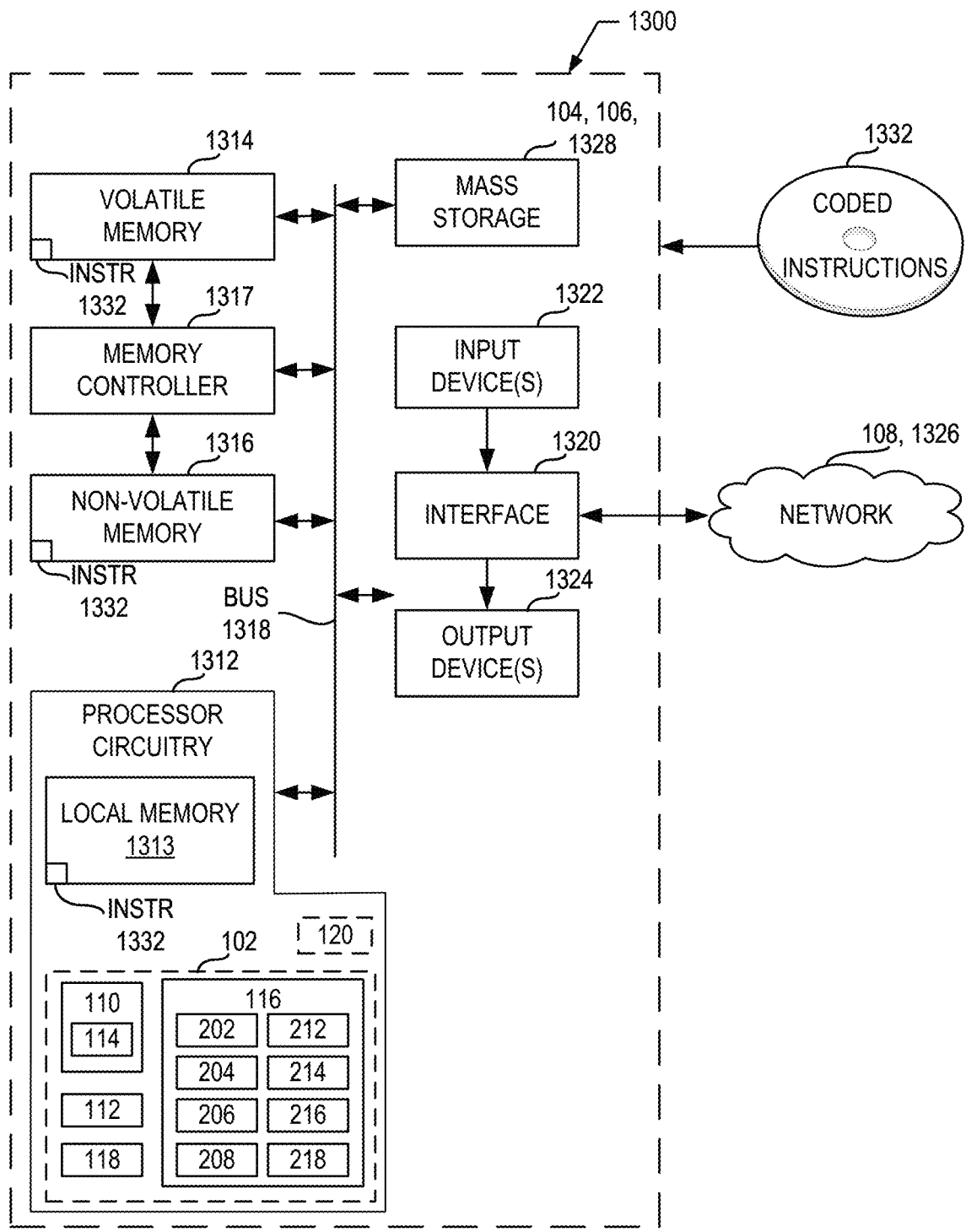
FIG. 13 is a block diagram of an example processing platform including processor circuitry structured to execute the example machine readable instructions and/or the example operations of FIGS. 8-12 to implement the document processor circuitry 102 and/or, more generally, the segment tagger circuitry of FIGS. 1-7.

In some examples, the example feature extraction circuitry 204, the example graph generator circuitry 212, the example GNN circuitry 214, the example RNN circuitry 216, and/or the example segment classifier circuitry 218 may be instantiated by processor circuitry such as the example processor circuitry 1312 of FIG. 13. For instance, the example feature extraction circuitry 204, the example graph generator circuitry 212, the example GNN circuitry 214, the example RNN circuitry 216, and/or the example segment classifier circuitry 218 may be instantiated by the example microprocessor 1400 of FIG. 14 executing machine executable instructions such as those implemented by at least blocks 800 of FIG. 8. In some examples, the example feature extraction circuitry 204, the example graph generator circuitry 212, the example GNN circuitry 214, the example RNN circuitry 216, and/or the example segment classifier circuitry 218 may be instantiated by hardware logic circuitry, which may be implemented by an ASIC, XPU, or the FPGA circuitry 1500 of FIG. 15 structured to perform operations corresponding to the machine readable instructions. Additionally or alternatively, the example feature extraction circuitry 204, the example graph generator circuitry 212, the example GNN circuitry 214, the example RNN circuitry 216, and/or the example segment classifier circuitry 218 may be instantiated by any other combination of hardware, software, and/or firmware. For example, the example feature extraction circuitry 204, the example graph generator circuitry 212, the example GNN circuitry 214, the example RNN circuitry 216, and/or the example segment classifier circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
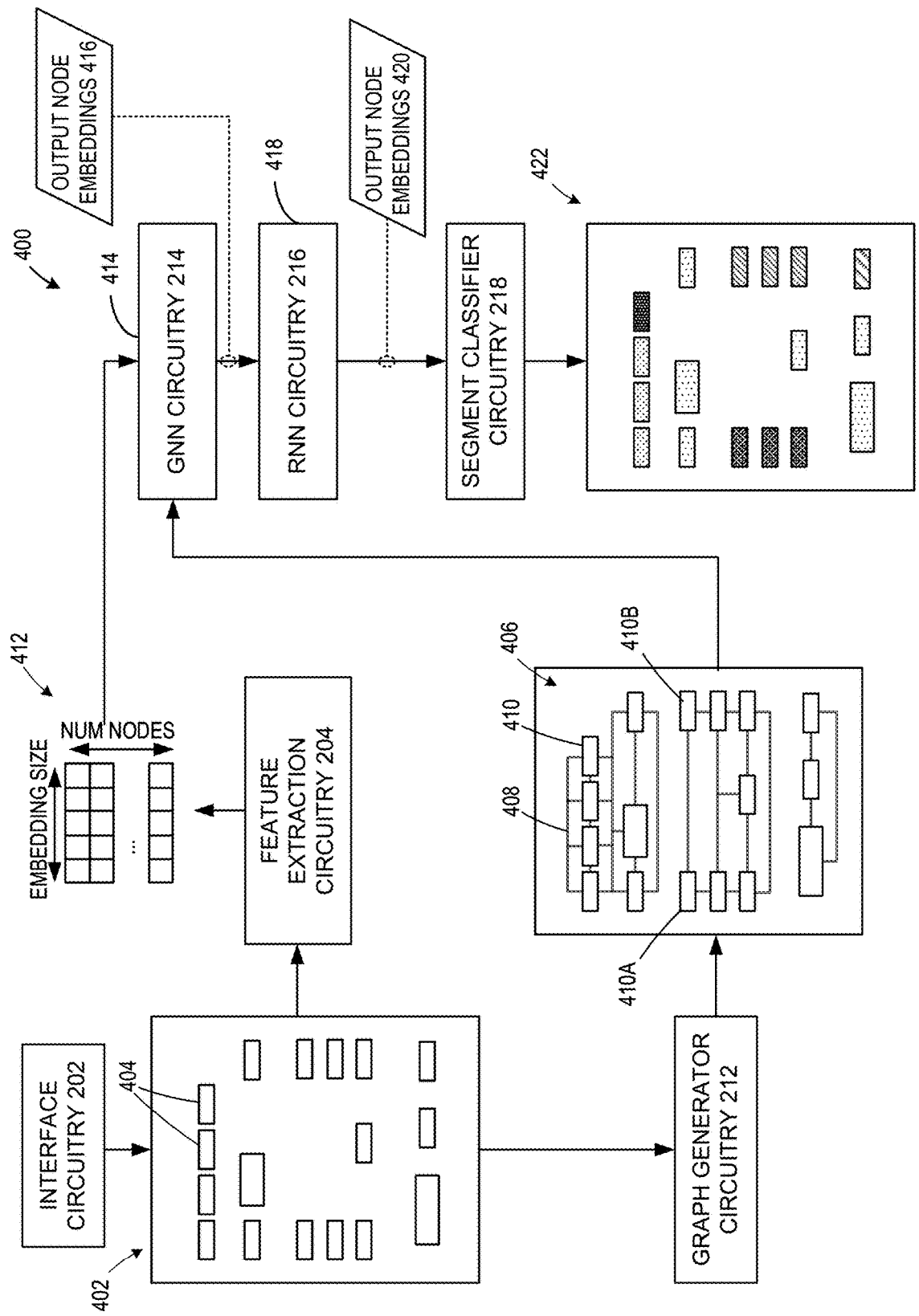
FIG. 4 illustrates an example implementation of the example segment tagger circuitry of FIGS. 1-2.

FIG. 4 illustrates an example implementation 400 of the example segment tagger circuitry 116 of FIGS. 1 and 2 in accordance with teachings of this disclosure. The segment tagger circuitry 116 obtains (via the interface circuitry 202) an example receipt 402 that includes example text segments 404 detected by an OCR engine (e.g., the OCR circuitry 114 of FIG. 1). Each of the text segments 404 is represented by a bounding box that represents a group of coordinates defining a text string, the text string, and a position in a document sequence.

As illustrated in FIG. 4, the graph generator circuitry 212 obtains the text segments 404 of the receipt 402 and generates an example graph (e.g., graph structure) 406 for the receipt 402. For example, the graph generator circuitry 212 generates the graph 406 by sampling example edges 408 among the text segments 404, which are represented by example nodes 410 of the graph 406. In some examples, the graph generator circuitry 212 samples the edges 408 by applying equation (1), above, to each pair of text segments 404 in the receipt 402. For example, for a pair of segments (e.g., Segment A and Segment B), the graph generator circuitry 212 determines whether to create an edge 408 from segment A (represented by a first example node 410A) to segment B (represented by a second example node 410B) if a vertical distance between their centers (C) is less than a height (H) of segment A 410A multiplied by a constant (K) (2 in this use case). The edges 408 are utilized by and/or provided to the GNN circuitry 214 to perform the message passing among the nodes 410, 410A, 410B. The graph generator circuitry 212 transmits the graph 406, including the edges 408 and the nodes 410, 410A, 410B to the GNN circuitry 214.

The example feature extraction circuitry 204 obtains the text segments 404 and generates example input node embeddings 412 for the nodes 410, 410A, 410B representing the text segments 404. For example, the feature extraction circuitry 204 can obtain a list of the text segments 404 based on a top to bottom and then left to right order of the bounding boxes. In some examples, the feature extraction circuitry 204 iterates sequentially through the text segments 404 in the list to generate an ordered array of the input node embeddings 412. For example, the feature extraction circuitry 204 passes the text strings of the text segments 404 to the example text feature extraction circuitry 206 (FIGS. 2-3). Likewise, the feature extraction circuitry 204 passes the bounding boxes of the text segments 404 to the example region feature extraction circuitry 208 (FIGS. 2-3).

The text feature extraction circuitry 206 iteratively extracts text embeddings from the text strings using an example tokenizer layer 310, an example embedding layer 312, an example Transformer encoder 308, and an example post-processing layer 314. For example, the text feature extraction circuitry 206 of FIG. 4 converts characters in the text strings to ASCII, and utilizes an example dictionary 210 of ASCII characters to demarcate the text string into tokens. The text feature extraction circuitry 206 applies the embedding layer(s) 312 to the tokenized characters to generate, for each text string, an example sequence of character embeddings. In some examples, the text feature extraction circuitry 206 pads the sequence of character embeddings to a fixed length (e.g., 30) and truncates characters in text strings having more than 30 characters. However, the sequences of character embeddings can be limited to other lengths in additional or alternative examples.

For ones of the text strings, the text feature extraction circuitry 206 adds a positional encoding to the sequence of character embeddings to generate an example position encoded sequence of character embeddings. Each word, represented by a respective position encoded sequence of character embeddings, is separately fed to the Transformer encoder 308, which operates at a character level. The Transformer encoder 308 extracts enriched character embeddings for each character and outputs an example updated sequence of character embeddings for the text string. Further, the text feature extraction circuitry 206 applies the post-processing layer 314 to remove padding and average remaining updated character embeddings for the characters of the text string to extract an example text embedding for the respective text segment 404.

For ones of the bounding boxes corresponding to respective ones of the text segments 404, the region feature extraction circuitry 208 extracts a left center coordinate, a right center coordinate, and a bounding box rotation (e.g., angle of the bounding box in radians). The region feature extraction circuitry 208 normalizes the left and right center coordinates using a width of the receipt 402. The region feature extraction circuitry 208 concatenates, for the ones of the bounding boxes, the normalized features (e.g., the normalized left and right center coordinates) with the rotation angle to generate first (e.g., initial) region embeddings for the text segments 404. However, to match a dimension of the text embeddings for the text segments 404, the region feature extraction circuitry 208 increases am embeddings size of the region embeddings. For examples, the region feature extraction circuitry 208 passes the first region embeddings through an example linear layer 328 to increase a dimension of the first region embeddings (e.g., vectors having a length of 5) to match that of the text embeddings. Thus, the region feature extraction circuitry 208 generates example region embeddings (e.g., vectors having a length of 256).

The feature extraction circuitry 204 adds, for the ones of the text segments 404, respective ones of the text and regions embeddings to generate the input node embeddings 412. In some examples, an amount of the input node embeddings 412 corresponds to a number of the nodes 410 of the graph 406 representing the receipt 402. In some examples, the number of nodes corresponds to a number of the text segments 404 in the array. In some such examples, each input node embeddings 412 corresponds to a respective text segment 404 (e.g., a node). However, in additional or alternative examples, the feature extraction circuitry 204 may be structured to generate additional or alternative input embeddings, such as a global node embedding. The input node embeddings 412 are provided as an input to the example GNN circuitry 214.

The GNN circuitry 214 obtains the input node embeddings 412 and the graph 406 with the nodes 410 and the sampled edges 408. In some examples, the GNN circuitry 214 generates another feature embedding for a global node by averaging all the input node embeddings 412. The global node is connected bidirectionally to the rest of the nodes 410. The GNN circuitry 214 includes or otherwise implements an example GAN-based model 414, which is applied to the input node embeddings 412, the edges 408, and the global node. The GAN-based model 414 is used to compute hidden representations of each node 410 in the graph 406 by attending over its neighbors nodes 410 (e.g., a local aspect) and the global node, which causes the GAN-based model 414 to learn contextualized information in the document from both local and global aspects. The GNN circuitry 214 outputs example first (e.g., GNN) output node embeddings 416.

Figure 5:
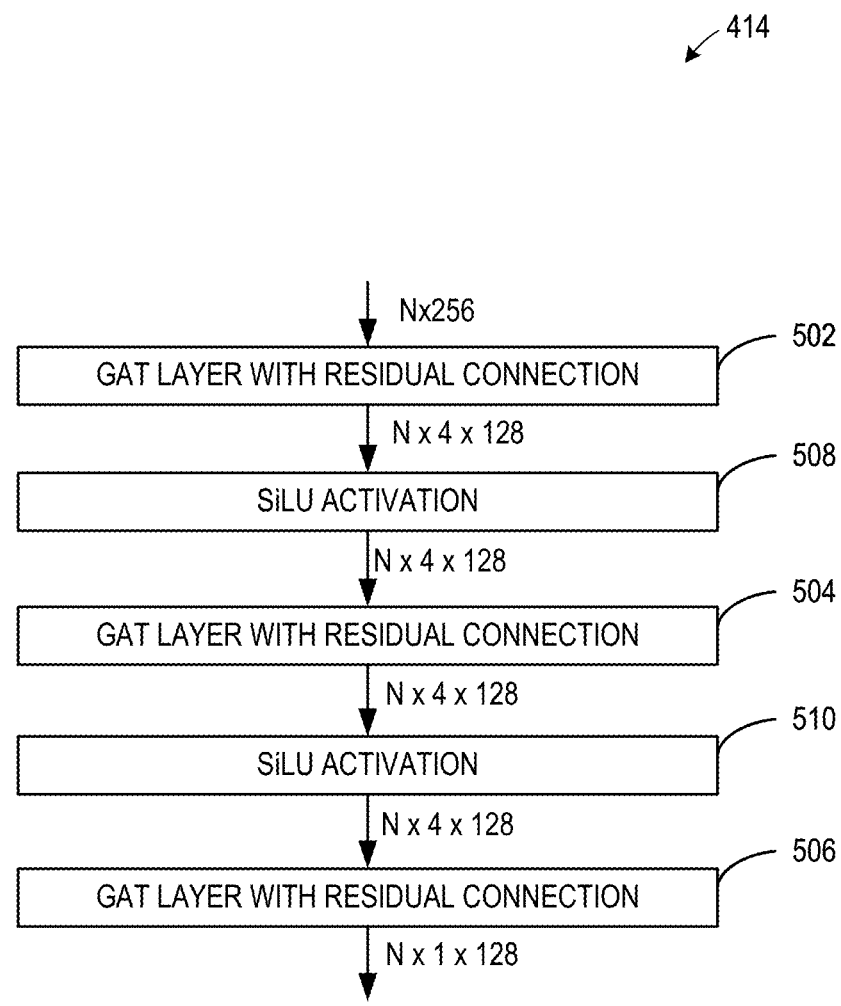
FIG. 5 illustrates an example architecture of an example graph attention network based model.

FIG. 5 illustrates an architecture of an example GAN-based model 414 that may be applied by the example GNN circuitry 214. As illustrated in FIG. 5, the GAN-based model 414 includes series of stacked layers. In particular, the GAN-based model 414 includes three example graph attention (GAT) layers, including an example first GAT layer 502, an example second GAT layer 504, and an example third GAT layer 506. The first and second GAT layers 502, 504 are each followed by a respective example SiLu activation layer 508, 510. The GAT layers 502, 504, 506 compute weights for message passing directly inside each layer 502, 504, 506. For example, the GAT layers 502, 504, 506 cause the nodes 410 to determine contributions of each neighbor affecting features of the nodes 410 (e.g., determine weights). That is, the graph 406 is input into a masked attention mechanism that determines weights (e.g., $e_{ij}^{(l)}$) for nodes j∈$\mathcal{N}$ (i), where $\mathcal{N}$ (i) is some neighborhood of node i in the graph 406. Once obtained, the normalized attention coefficients are used to compute a linear combination of the features corresponding to them, to serve as the final output features for every node. The SiLu activation layers 508, 510 update the nodes 410 based on the modified feature embeddings. The last GAT layer 506 generates the example first (e.g., GNN) output node embeddings 416, which are augmented (e.g., enriched, modified, etc.) versions of the input node embeddings 412. The first output node embeddings 416 represent updated features of the nodes 410. However, the GAN-based model 414 does not use the sequential order of the nodes as a source of information, which is important for the considered task.

Referring again to FIG. 4, the segment tagger circuitry 116 passes the first output node embeddings 416 to the example RNN circuitry 216, which is structured to inject sequential information into the first output node embeddings 416. In some examples, the RNN circuitry 216 includes or otherwise implements an example bidirectional GRU-based model 418. A bidirectional GRU is a type of bidirectional RNN having only input and forget gates. That is, the bidirectional GRU is a sequence processing model that includes of two GRU layers. The RNN circuitry 216 input the first output node embeddings 416 to the bidirectional GRU-based model 418 in sequential order (e.g., relative to the receipt 402). The bidirectional GRU-based model 418 injects the sequential information into the first output node embeddings 416, and outputs example second (e.g., RNN) output node embeddings 420. The first bidirectional GRU layer (e.g., the forward layer) obtains input in a forward direction, and the second bidirectional GRU layer (e.g., the backward layer) obtains input in a backwards direction.

The segment tagger circuitry 116 passes the second output node embeddings 420 to the example segment classifier circuitry 218, which is structured to classify the text segments 404. The segment classifier circuitry 218 processes the second output node embeddings 420 to generate an example class probability distribution. The segment classifier circuitry 218 estimates a probability that for each class of a closed list of categories. The segment classifier circuitry 218 includes an example linear layer and an example softmax layer. It consists of one linear layer that generates the logits, followed by a Softmax layer that produces the normalized probabilities. The softmax layer is a linear classifier that uses the cross-entropy loss function. The softmax layer is structured to convert a vector of n real numbers into a probability distribution of n possible outcomes. In other words, the softmax layer applies an example activation function at an end of the segment tagger model 116 to normalize the output of a network to a probability distribution over predicted output classes.

Figure 6:
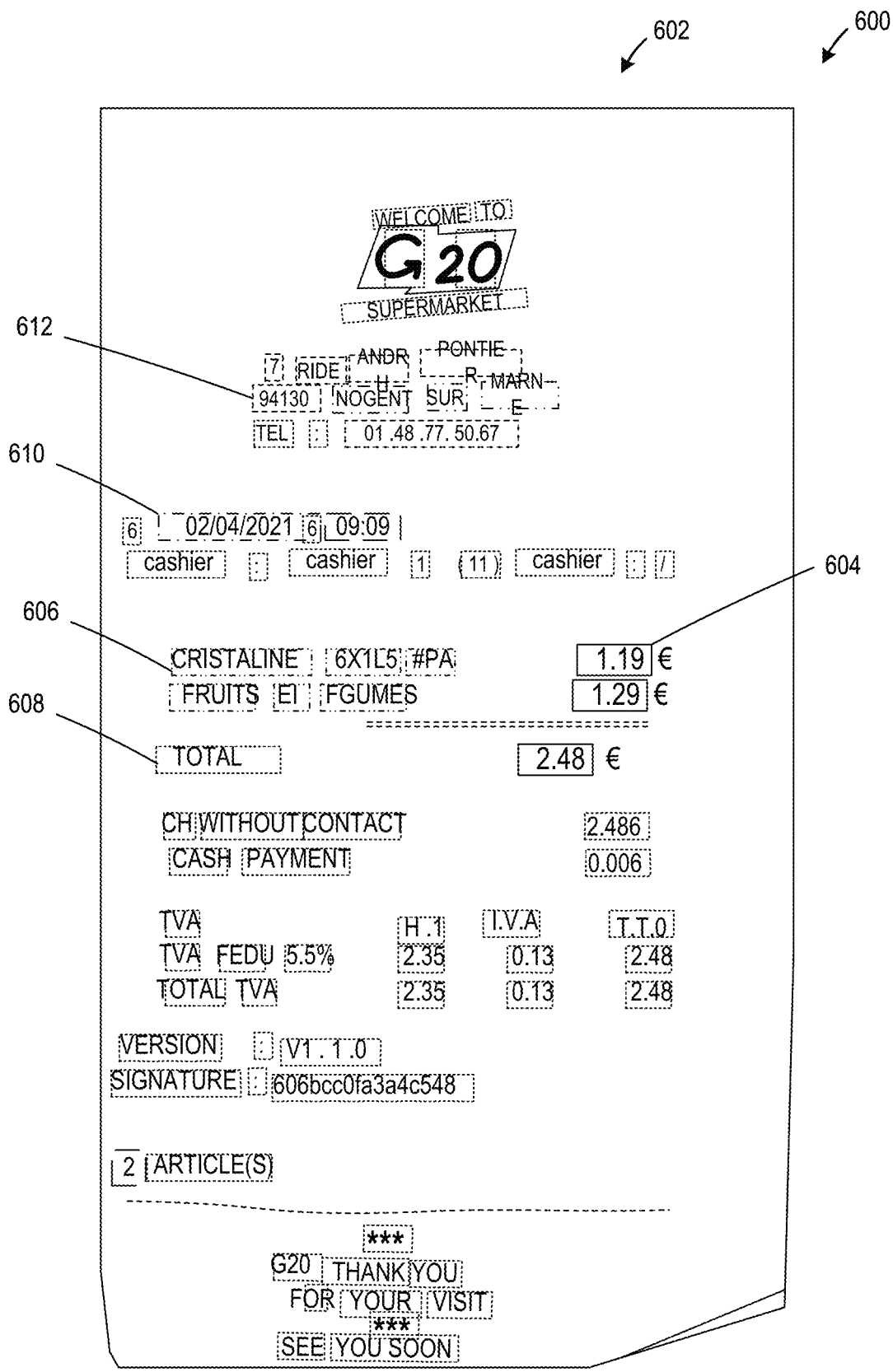
FIG. 6 illustrates an example output of the example segment tagger circuitry of FIGS. 1-2 in accordance with teachings of this disclosure.

FIG. 6 illustrates an example output 600 of the example segment tagger circuitry 116 of FIGS. 1-5 in accordance with teachings of this disclosure. Specifically, FIG. 6 illustrates the output 600 as applied to an example receipt 602 on which an example segment tagging model was applied by the segment tagger circuitry 116. As illustrated in FIG. 6, the segment tagger circuitry 116 tagged example text segments 604-612 according to their semantic meaning. For example, a first text segment 604 may be tagged with a price category, a second text segment 606 may be tagged with a product description category, a third text segment 608 may be tagged with a receipt total category, a fourth text segment 610 may be tagged with a purchase date category, a fifth text segment 612 may be tagged with a store address category, etc.

While an example manner of implementing the segment tagger circuitry 116 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example feature extraction circuitry 204, the example text feature extraction circuitry 206, the example region feature extraction circuitry 208, the example graph generator circuitry 212, the example GNN circuitry 214, the example RNN circuitry 216, the example segment classifier circuitry 218, and/or, more generally, the example segment tagger circuitry 116 of FIG. 1, may be implemented by hardware alone or by hardware in combination with software and/or firmware. Thus, for example, any of the example interface circuitry 202, the example feature extraction circuitry 204, the example text feature extraction circuitry 206, the example region feature extraction circuitry 208, the example graph generator circuitry 212, the example GNN circuitry 214, the example RNN circuitry 216, the example segment classifier circuitry 218, and/or, more generally, the example segment tagger circuitry 116, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example segment tagger circuitry 116 of FIG. 1 may include one or more elements, processes, and/or devices in addition to, or instead of, those illustrated in FIG. 2, and/or may include more than one of any or all of the illustrated elements, processes and devices.

Figure 7:
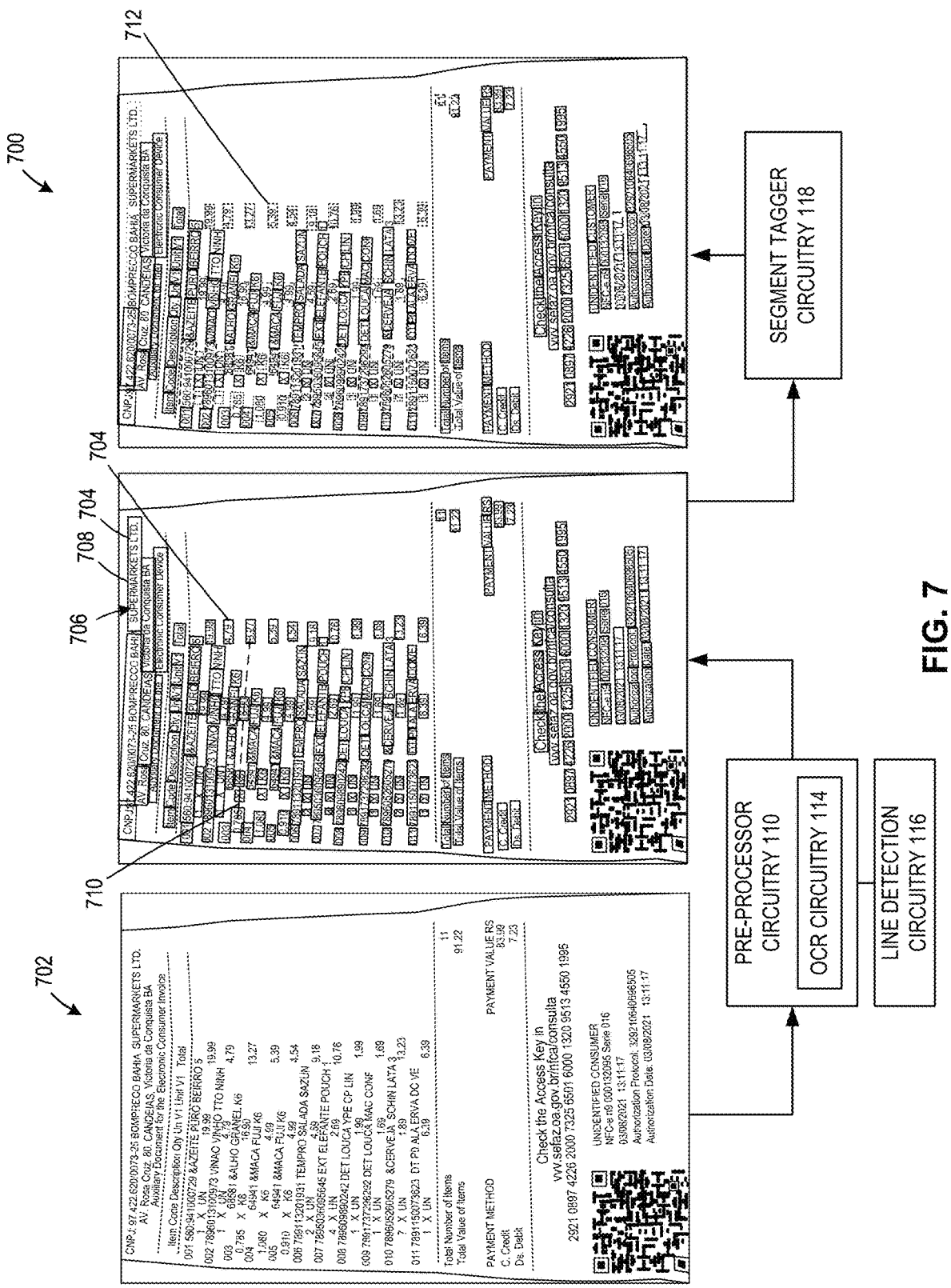
FIG. 7 is a block diagram of an example implementation of the example document processor circuitry of FIG. 1 in accordance with teachings of this disclosure.

FIG. 7 illustrates an example implementation 700 of the document processor circuitry 102 of FIG. 1. The pre-processor circuitry 110 obtains and pre-processes an example receipt image. For example, receipt images uploaded by panelists often include clutter in a background of the image, such as irrelevant and/or unwanted text, visual texture, etc. that can contribute noise and/or undesired text detection during an OCR process. To increase an efficiency and accuracy of the information extraction process, the pre-processor circuitry 110 detects and/or segments out an example receipt region (e.g., receipt) 702 from the input image. The receipt 702 is a raw, unstructured document that includes purchase data representing a transaction between e.g., a consumer and a retailer. In some examples, to segment out the receipt 702, the pre-processor circuitry 110 applies a CV based object detection model to the image to identify and crop the receipt 702 from the image. In some examples, segmenting out the receipt from the background clutter can strengthen (e.g., improve) the extraction process by focusing on a specific region of the image, which improves an accuracy of the extraction process by removing irrelevant information.

The pre-processor circuitry 110 includes or is otherwise communicatively coupled to the example OCR circuitry 114, which is structured to convert the receipt 702 into machine readable text. In some examples, the OCR circuitry 114 is implemented by a third party OCR engine (e.g., a third party web based OCR tool, etc.). In such examples, the OCR circuitry 114 is an application programming interface (API) that interfaces with the third party tool. The OCR circuitry 114 applies an OCR algorithm to the receipt 702 to detect, extract, and localize text. For example, the OCR circuitry 114 applies an OCR-based algorithm over the receipt 702 to extract example text segments 704. The OCR circuitry 114 generates, for each text segments 704, an example text string 706 and an example bounding box 708.

While a standard out-of-the-box OCR engine (such as the OCR circuitry 114) can detect text, generate bounding boxes, and transcribe text, the OCR circuitry 114 cannot guarantee a strict top-to-bottom, left-to-right ordering in the list of words. Further, the output of the OCR circuitry 114 does not typically provide relations between the text segments 704. As a result, the output of the OCR circuitry 114 is not usefully organized for receipt analysis. For example, a bounding box(es) 708 associated with a product may not be correctly ordered next to another bounding box(es) 708 associated with corresponding price information.

As illustrated in FIG. 2, the receipt 702 in the image is wrinkled, resulting in imperfections and rotated text. Further, as can be seen by the human eye, some of the text is faded and/or otherwise difficult to read. These issues affect an output of the OCR circuitry 114. For example, the output of the OCR circuitry 114 often includes errors such as (but not limited to) typos in the detected text strings 706, noisy bounding boxes 708, inaccuracy in detected segment regions (e.g., offset or have the length, width, or angle incorrectly adjusted) and/or may include duplicated detections. For example, the OCR circuitry 114 may detect a single segment twice (e.g., totally, partially, etc.), resulting in a duplicated and overlapped detection that can include some shift. Accordingly, examples disclosed herein post-process the OCR output to extract a layout of the text segments 704 in the receipt 702.

In some examples, the pre-processor circuitry 110 is structured to provide the text segments 704 detected by the OCR circuitry 114 to the example line detection circuitry 118, which is structured to detect example lines 710 in the receipt. For example, the line detection circuitry 118 may utilize the bounding boxes 708 to group (e.g., cluster) the text segments 704 by line. Thus, the line detection circuitry 118 identifies position sequential information for the text segments 704 detected in the receipt 702.

In some examples, the pre-processor circuitry 110 outputs an ordered list of text segments 704 that correspond to products itemized in the receipt 702. In particular, the pre-processor circuitry 110 of FIGS. 1-2 outputs the list of text segments 704 in which each text segment is represented by a bounding box, a text string, and a position in a sequence. The example segment tagger circuitry 116 is structured to obtain the list of ordered text segments 704 detected by the OCR circuitry 114 and ordered by the line detection circuitry 118 and to solve a segment (e.g., node) tagging task.

The receipt 702 can be interpreted as a graph. The segment tagger circuitry 116 generates and operates on the graph to perform the node classification task. For example, the graph can include nodes representing the text segments 704 and edges connecting ones of the nodes. The segment tagger circuitry 116 generates input node embeddings based on features extracted from the text segments. The segment tagger circuitry 116 enriches the input node embeddings by performing pairwise messages passing to cause the nodes to learn (e.g., decide) contributions of each neighbor node. For example, the segment tagger circuitry 116 can pass the input node embeddings through a series of GAT layers to generate first output node embeddings.

A number of text segments in a receipt can highly vary (e.g., from a couple to hundreds) depending on a retailer from which the receipt originated, a number of products purchased, etc. Thus, weight passing methods based on fixed input sizes (e.g., Fully Connected Neural Networks (FCNN)) are not suitable for this use case. Further, a number of connections that need to be evaluated can be limited based on the bounding box coordinates generated by the OCR circuitry 114 to accelerate the inference and reduce an amount of resources needed to perform the task. This rules out using methods based on Convolutional Neural Networks (CNN), because the evaluated connections depend on the order in which the nodes are stacked. Accordingly, example GNN-based model(s) utilized herein are more efficient than methods based on FCNNs to evaluate all possible connections. GNNs are found to be effective and efficient for memory and processing time because the GNN is not a fully-connected method.

The segment tagger circuitry 116 passes the first output node embeddings through layers of an RNN (e.g., an example GRU-based model 418 implemented by the example RNN circuitry 216) to inject sequential information into the first output node embeddings. For example, the layers of the RNN circuitry 216 may include two bi-directional GRU layers. The RNN circuitry 216 outputs second output node embeddings, which are passed through an example linear layer and an example softmax layer. The segment tagger circuitry 116 generates class probabilities based on the softmax layer.

The segment tagger circuitry 116 is structured to tag (e.g., label) the text segments 704 with a category from a closed list of categories. For example, the segment tagger circuitry 116 tags the text segments 704 by selecting a category having the highest class probability. In some examples, the segment tagger circuitry 116 can detect and tag categories, such as (but not limited to) store name, store address, product description, price, quantity, etc. In some examples, the segment tagger circuitry 116 outputs an example list of semantic text segments 712, in which each text segment 704 is tagged (e.g., coded) with a category corresponding to its meaning.

While an example manner of implementing the document processor circuitry 102 of FIG. 1 is illustrated in FIGS. 1-7, one or more of the elements, processes, and/or devices illustrated in FIGS. 1-7 may be combined, divided, re-arranged, omitted, eliminated, and/or implemented in any other way. Further, the example pre-processor circuitry 110, the example storage circuitry 112, the example OCR circuitry 1154, the example feature extraction circuitry 204, the example text feature extraction circuitry 206, the example region feature extraction circuitry 208, the example graph generator circuitry 212, the example GNN circuitry 214, the example RNN circuitry 216, the example segment classifier circuitry 218, and/or, more generally, the example document processor circuitry 102 of FIG. 1, may be implemented by hardware alone or by hardware in combination with software and/or firmware. Thus, for example, any of the example interface circuitry 202, the example feature extraction circuitry 204, the example text feature extraction circuitry 206, the example region feature extraction circuitry 208, the example graph generator circuitry 212, the example GNN circuitry 214, the example RNN circuitry 216, the example segment classifier circuitry 218, and/or, more generally, the example document processor circuitry 102, could be implemented by processor circuitry, analog circuit(s), digital circuit(s), logic circuit(s), programmable processor(s), programmable microcontroller(s), GPU(s), DSP(s), ASIC(s), PLD(s), and/or FPLD(s) such as FPGAs. Further still, the example document processor circuitry 102 of FIG. 1 may include one or more elements, processes, and/or devices in addition to, or instead of, those illustrated in FIGS. 1-7, and/or may include more than one of any or all of the illustrated elements, processes and devices.

Flowcharts representative of example machine readable instructions, which may be executed to configure processor circuitry to implement the document processor circuitry of FIG. 1 and/or, more specifically, the segment tagger circuitry 116 of FIGS. 1-2, are shown in FIGS. 8-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 8-12, many other methods of implementing the example segment tagger circuitry 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
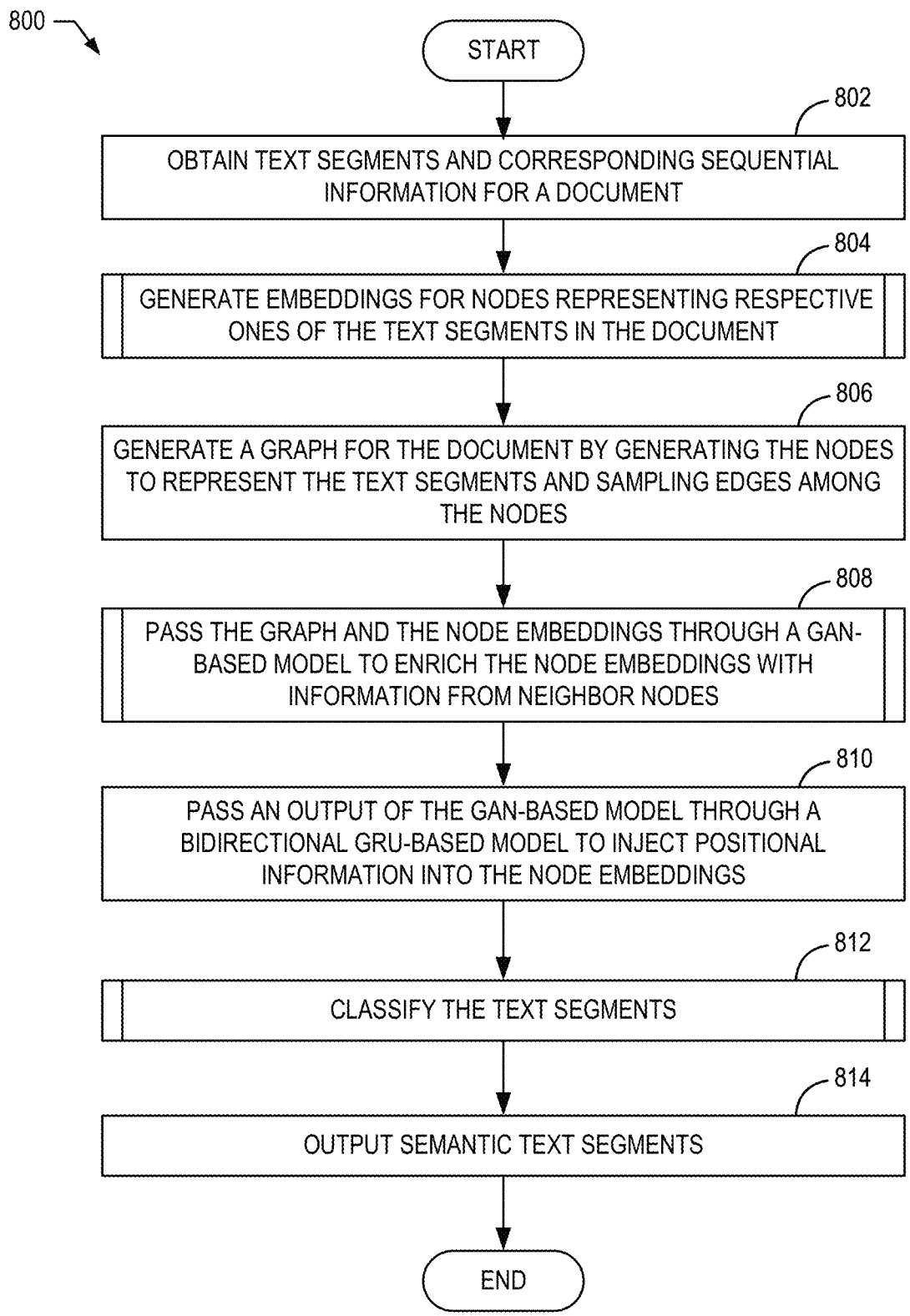
FIGS. 8-12 are flowcharts representative of example machine readable instructions and/or example operations that may be executed by example processor circuitry to implement the document processor circuitry 102 and/or, more generally, the segment tagger circuitry of FIGS. 1-7.

FIG. 8 is a flowchart representative of example machine readable instructions and/or example operations 800 that may be executed and/or instantiated by processor circuitry to tag text segments in a document according to their semantic meaning from a closed list of categories. The machine readable instructions and/or the operations 800 of FIG. 8 begin at block 802, at which example interface circuitry 202 obtains text segments and corresponding sequential information for a document. For example, the interface circuitry 202 obtains an ordered array of text segments, each of which includes a text string (e.g., a string of characters, transcribed characters, etc.) and a bounding box (e.g., text box) that defines a location of the text segment within the document. The text string and the bounding box may be extracted via example OCR circuitry 114 and the sequential order may be extracted via an example line detection model 118.

At block 804, example feature extraction circuitry 204 generates embeddings (e.g., feature embeddings) for nodes representing respective ones of the text segments in the document. For example, the feature extraction circuitry 204 generates text embeddings using the text strings and region embeddings using the bounding boxes. The feature extraction circuitry 204 adds respective ones the text embeddings and the region embeddings to generate the embeddings for the nodes.

At block 806, example graph generator circuitry 212 generates a graph structure for the document by generating the nodes to represent the text segments and sampling edges among the nodes. To sample the edges among the nodes using a novel edge sampling algorithm. For example, the graph generator circuitry 212 may identify a pair of text segments, and identify an edge between the text segments of the pair if a vertical distance between their centers (C) is less than a height (H) of a first text segment of the pair multiplied by a constant (K) (e.g., 2). If the foregoing is not true, no edge is generated. Thus, the graph includes the nodes corresponding to the text segments and the sampled edges among the text segments.

At block 808, example GNN circuitry 214 passes the graph and the node embeddings through an example GAN-based model 414 to enrich the node embeddings with information from neighbor nodes representing neighbor text segments. For example, the GNN circuitry 214 applies the GAN-based model 414 that includes a series of GAT layers to enrich the feature embeddings for the nodes with information from neighbor nodes. The GNN circuitry 214 outputs example first updated node embeddings.

At block 810, example RNN circuitry 216 passes an output of the GAN-based model 414 through an example bidirectional GRU-based model 418 to inject positional information into the node embeddings. For example, the RNN circuitry 216 passes the first updated node embeddings through two bi-directional GRU layers The RNN circuitry 216 outputs second updated node embeddings for the nodes representing the text segments.

At block 812, example segment classifier circuitry 218 classifies the text segments. For example, the segment classifier circuitry 218 obtains the second updated embeddings for the text segments and passes the second update embeddings through an example linear layer and an example softmax layer. At block 814, the example segment classifier circuitry 218 outputs semantic text segments (e.g., tagged text segments). For example, the segment classifier circuitry 218 tags (e.g., associates, labels, marks, etc.) each text segment with its corresponding semantic category.

Figure 9:
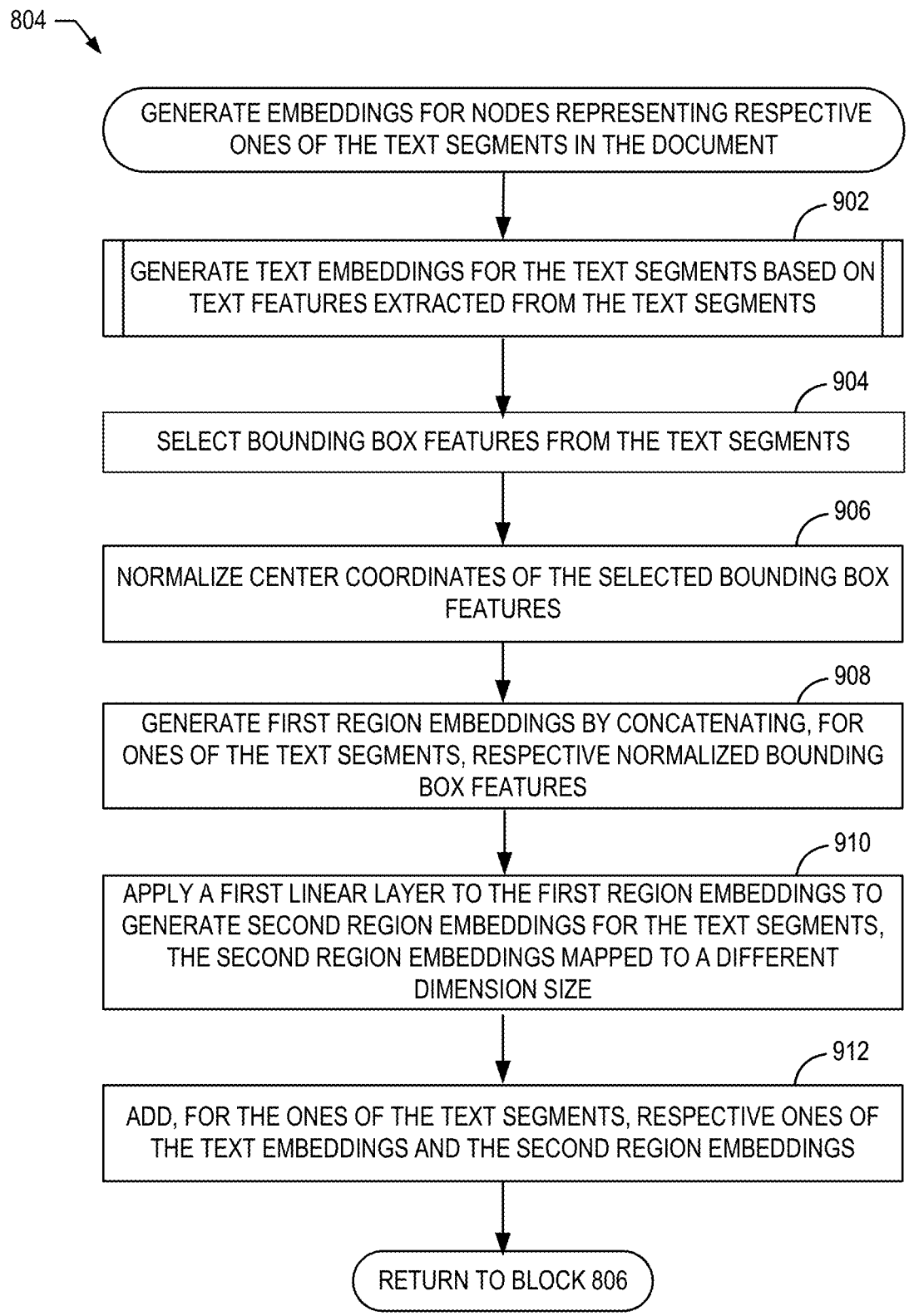

FIG. 9 is a flowchart representative of example machine readable instructions and/or example operations 804 that may be executed and/or instantiated by processor circuitry to generate the feature embeddings for the nodes representing the text segments in the document. The machine readable instructions and/or the operations 804 of FIG. 9 begin at block 902, at which example text feature extraction circuitry 206 generates text embeddings for the text segments based on text features extracted from the text segments.

At block 904, the example region feature extraction circuitry 208 selects bounding box features from the text segments. For example, the region feature extraction circuitry 208 can extract, from each text segment, a left center coordinate, a right center coordinate, and a rotation of the bounding box (e.g., the rotation angle).

At block 906, the region feature extraction circuitry 208 normalizes the center coordinates of the selected bounding box features. For example, the region feature extraction circuitry 208 can normalize the left and right center coordinates extracted from the bounding boxes relative to a width of the document. In some examples, the width is utilized because it is a more stable dimension than a length for unstructured documents such as receipts. However, other dimensions can be used in additional or alternative examples.

At block 908, the region feature extraction circuitry 208 generates first region embeddings by concatenating, for ones of the text segments, respective normalized bounding box features. In particular, the region feature extraction circuitry 208 concatenates, for each of the text segments, a normalized left center coordinate (2 floats), a normalized right center coordinate (2 floats), and a rotation angle (1 float) from a bounding box. In doing so, the region feature extraction circuitry 208 generates the first region embeddings having an embedding dimension of 5.

At block 910, the example region feature extraction circuitry 208 applies an example first linear layer (e.g., linear layer 328 of FIG. 3) to the first region embeddings to generate second region embeddings for the text segments, the second region embeddings being mapped to a different dimension size. For example, the linear layer 328 maps the first region embeddings to an embedding dimension of 256. Thus, the region feature extraction circuitry 208 generates the region embeddings having a total embedding size of 256 floats.

At block 912, the example feature extraction circuitry 204 adds, for ones of the text segments, respective ones of the text embeddings and second region embeddings. In doing so, the feature extraction circuitry 204 generates the input node embeddings for the text segments, which are input to the GNN circuitry 214.

Figure 10:
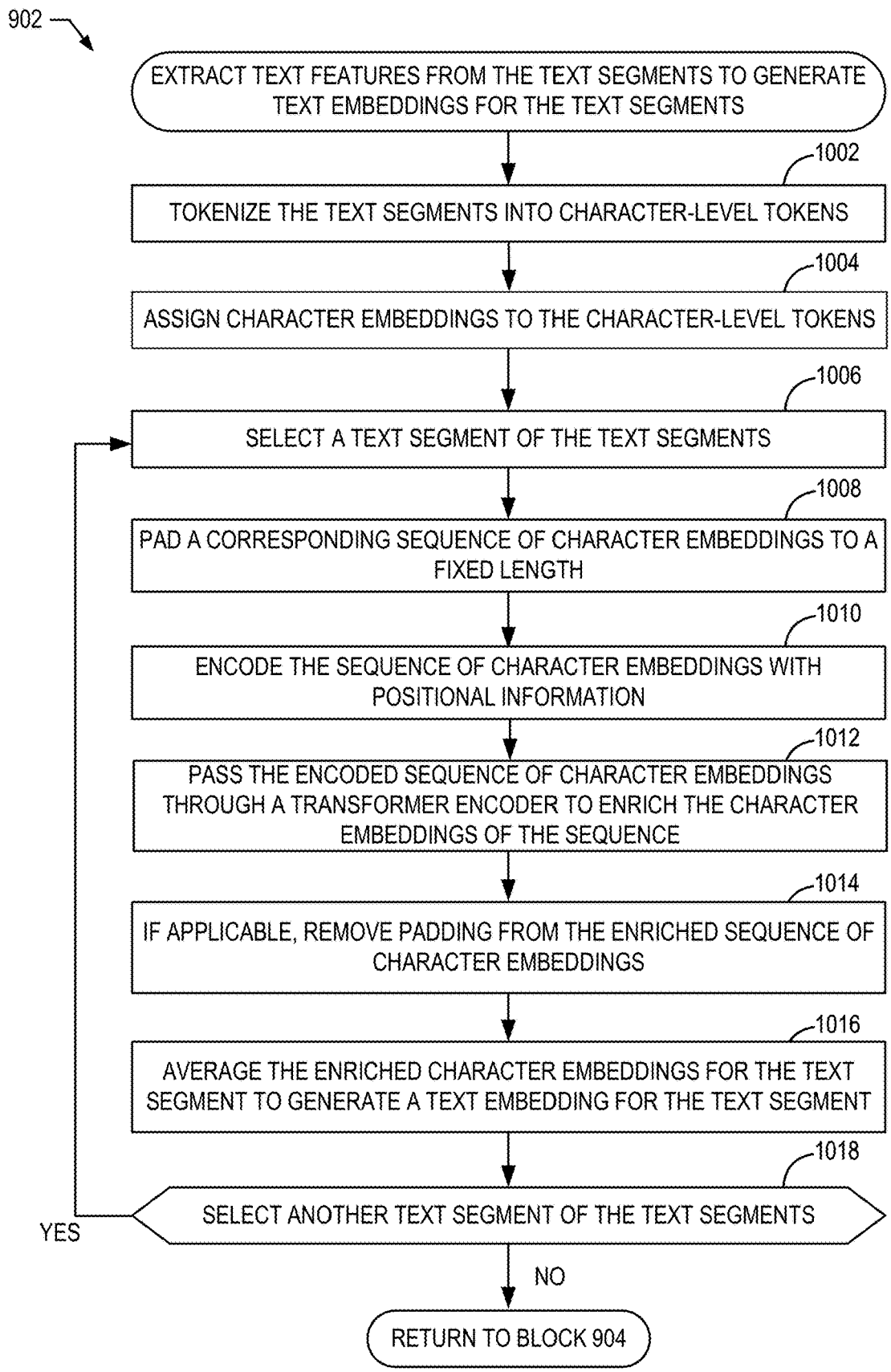

FIG. 10 is a flowchart representative of example machine readable instructions and/or example operations 902 that may be executed and/or instantiated by processor circuitry to extract the text features from the text segments to generate the text embeddings for the text segments. The machine readable instructions and/or the operations 902 of FIG. 10 begin at block 1002, at which the text feature extraction circuitry 206 tokenizes the text segments into character-level tokens. For example, the text feature extraction circuitry 206 may convert characters in the text segments from Unicode to ASCII, and tokenize the characters based on an ASCII character set. In some examples, the text feature extraction circuitry 206 removes characters that cannot be converted. In some examples, the text feature extraction circuitry 206 truncates text segments longer than a predefined sequence limit (e.g., 30 characters, etc.).

At block 1004, the text feature extraction circuitry 206 assigns character embeddings to the character-level tokens. That is, the text feature extraction circuitry 206 converts to tokens to dense vectors. For example, the text feature extraction circuitry 206 applies an example embedding layer 312 to the tokenized ASCII characters of the text strings to generate corresponding sequences of character embeddings (e.g., vectors) for the text segments.

At block 1006, the text feature extraction circuitry 206 selects a text segment of the text segments. For example, the text feature extraction circuitry 206 selects the text segment and identifies a corresponding sequence of character embeddings for the text segment. At block 1008, the text feature extraction circuitry 206 pads the corresponding sequence of character embeddings to a fixed length (e.g., 30).

At block 1010, the text feature extraction circuitry 206 encodes the sequence of character embeddings with positional information. The positional encoding is a fixed-size vector representation that encapsulates the relative positions of the character-level tokens within the text segment. For example, the text feature extraction circuitry 206 encodes with sequence of character embeddings with information about where characters are in the sequence of character embeddings. The positional encoding is of the same size dimension (e.g., 128) as the character embeddings.

At block 1012, the text feature extraction circuitry 206 passes the encoded sequence of character embeddings to an example Transformer encoder 308 to update the character embeddings in the encoded sequence. In doing so, the Transformer encoder 308 extracts features from the text segment. The input to the Transformer encoder 308 is not the characters of the text string, but a sequence of embedding vectors in which each vector represent the semantics and position of a character level token. The Transformer encoder 308 processing the embeddings of the encoded sequence to extract contexts for each character-level token from the entire text segment and enrich the character embeddings with helpful information for the target task (e.g., segment tagging). The Transformer encoder 308 outputs an enriched sequence of character embeddings.

At block 1014, the text feature extraction circuitry 206 removes padding from the enriched sequence of character embeddings (if applicable). For example, the text feature extraction circuitry 206 removes padding from the enriched sequence of character embeddings if the encoded sequence of character embeddings as input to the Transformer encoder 308 was padded. At block 1016, the text feature extraction circuitry 206 averages remaining ones of the enriched character embeddings to generate an example text embedding for the text segment.

At block 1018, the text feature extraction circuitry 206 determines whether to select another text segment of the text segments. That is, the Transformer encoder 308 operates on each text segment separately. The text feature extraction circuitry 206 determines whether any of the text segments detected in the document have not been passed through the Transformer encoder 308. If the answer to block 1018 is YES, control returns to block 1006, at which the text feature extraction circuitry 206 selects another text segment of the text segments. If the answer to block 1018 is NO, control returns to block 904 of FIG. 9.

Figure 11:
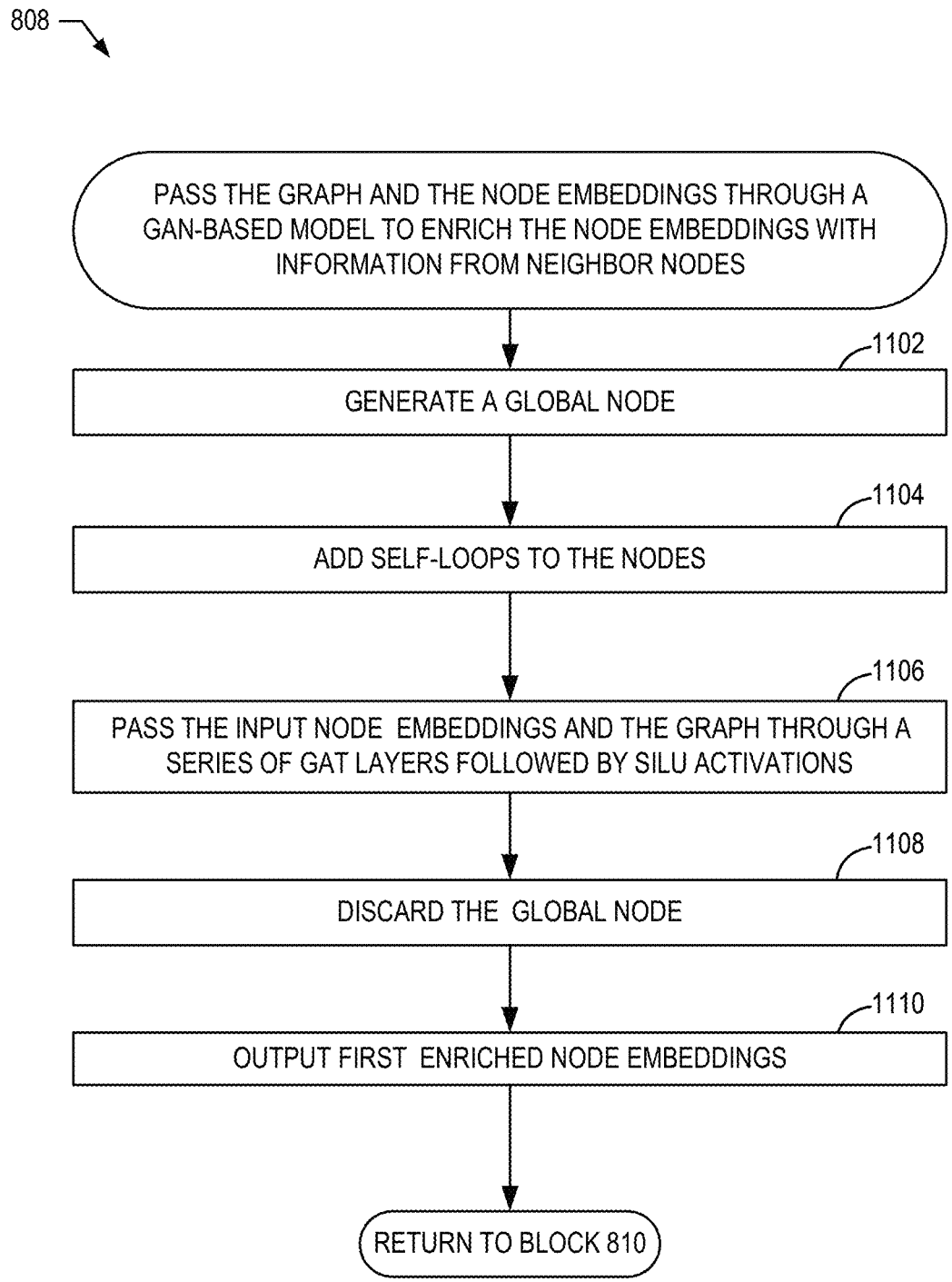

FIG. 11 is a flowchart representative of example machine readable instructions and/or example operations 808 that may be executed and/or instantiated by processor circuitry to pass the graph and the node embeddings through a GAN-based model to enrich the node embeddings with information from neighbor nodes. The machine readable instructions and/or the operations 808 of FIG. 11 begin at block 1102, at which the example GNN circuitry 214 generates an example global node. For example, the GNN circuitry 214 generates another feature embedding for the global node by averaging all the input node embeddings. The global node is connected bidirectionally to the rest of the nodes. The global node accomplishes at least two tasks. First, it provides some context information to the nodes by gathering information from the whole graph. That is, the global node assists each node to capture the global information of the receipt. Second, it acts as a regularization term for the GAT layer weights, as it is not a real neighbor node.

At block 1104, the GNN circuitry 214 adds self-loops to reduce error (e.g., to avoid 0-in-degree errors while using GAT layers). For example, the GNN circuitry 214 can add a self-loop for each node, by adding another edge that connects the node with itself.

At block 1106, the GNN circuitry 214 passes the feature embeddings, including the global node embedding, and the graph, including the self-loops, through a series of GAT layers followed by SiLU activations, which performs message passing of weights. In particular, the GNN circuitry 214 passes the feature embeddings and the graph through an example GAN-based model 414 to enrich (e.g., update) the feature node embeddings with information from their neighbor nodes.

At block 1108, the GNN circuitry 214 discards the global node. During execution of the GAN-based model 414, the global nodes provides a global perspective for the nodes. However, the global node is only considered during the message passing and is discarded once the GNN stage is finished. At block 1110, the GNN circuitry 214 outputs enriched node features. In particular, the GNN circuitry 214 outputs example first output (e.g., enriched) node embeddings 416.

Figure 12:
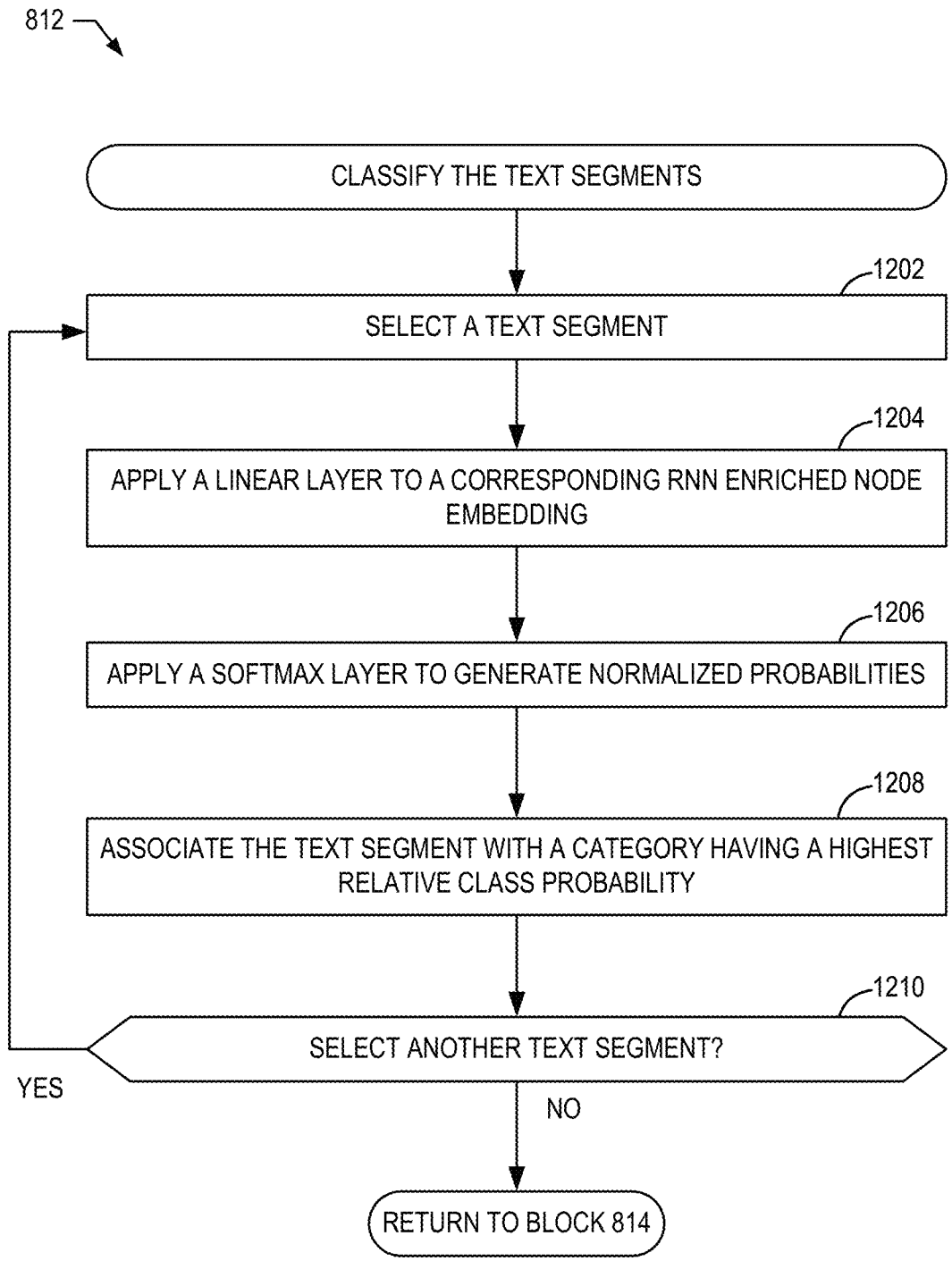

FIG. 12 is a flowchart representative of example machine readable instructions and/or example operations 812 that may be executed and/or instantiated by processor circuitry to classify the text segment. The machine readable instructions and/or the operations 812 of FIG. 12 begin at block 1202, at which the example segment classifier circuitry 218 selects a text segment. The text segment is associated with a node having an RNN enriched node embedding. Thus, by selecting the text segments, the segment classifier circuitry 218 selected a corresponding RNN enriched node embedding.

At block 1204, the segment classifier circuitry 218 applies an example second linear layer to the corresponding enriched node embeddings. For example, the segment classifier circuitry 218 passes the enrich node embeddings through the second linear layer, which applies a linear transformation that changes a dimension of an RNN enriched node embedding 420 from an embedding vector size (512) into a size of a closed list of categories. For example, the linear layer may transform the RNN enriched embeddings 420 to a size of 30. The linear layer outputs an example logistic unit (logit).

At block 1206, the segment classifier circuitry 218 applies an example softmax layer to generate normalized probabilities for a closed list of classes/categories. For example, the softmax layer converts the logits into 30 probabilities. At block 1208, the segment classifier circuitry 218 associates the text segment with a category having the high class probability. For example, the segment classifier circuitry 218 labels the text segment with the category having the highest class probability. The softmax layer outputs normalized class probabilities. The highest probability corresponds to the most probable class for the text segment.

At block 1210, the segment classifier circuitry 218 determines whether another nodes need to be classified. For example, the segment classifier circuitry 218 determines whether any of the text segments detected in the document have not been classified. If the answer to block 1210 is YES, control returns to block 1202, at which the segment classifier circuitry 218 selects another text segment of the text segments. If the answer to block 1210 is NO, control returns to block 814 of FIG. 8.

FIG. 13 is a block diagram of an example processor platform 1300 structured to execute and/or instantiate the machine readable instructions and/or the operations of FIGS. 8-12 to implement the segment tagger circuitry 116 of FIGS. 1-2. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a Blu-ray player, a gaming console, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements at least the example interface circuitry 202, the example feature extraction circuitry 204, the example text feature extraction circuitry 206, the example region feature extraction circuitry 208, the example graph generator circuitry 212, the example GNN circuitry 214, the example RNN circuitry 216, the example segment classifier circuitry 218.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIGS. 8-12, may be stored in the mass storage device 1328, in the volatile memory 1314, in the non-volatile memory 1316, and/or on a removable non-transitory computer readable storage medium such as a CD or DVD.

Figure 14:
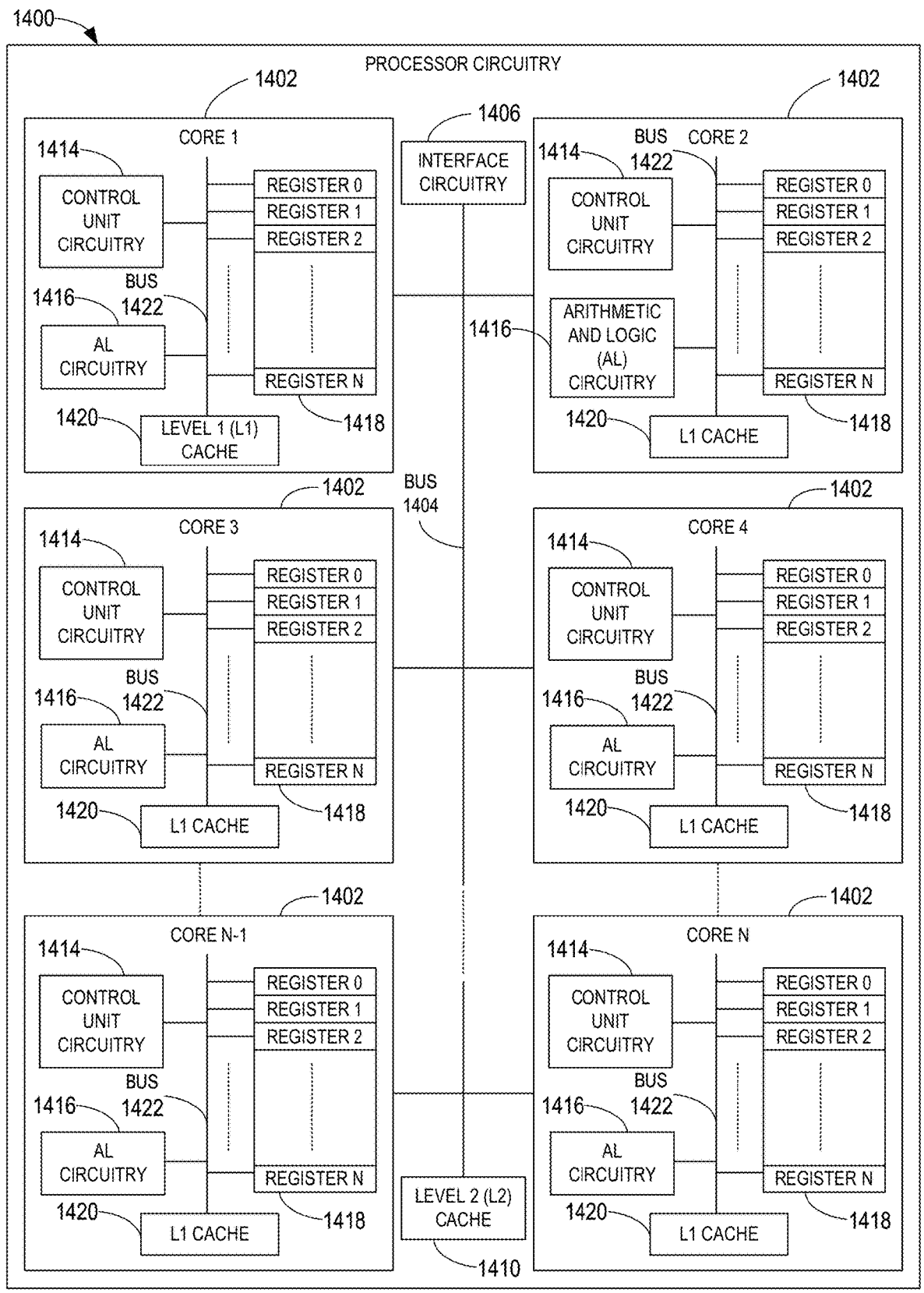
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 8-12 to effectively instantiate the circuitry of FIG. 2 as logic circuits to perform the operations corresponding to those machine readable instructions. In some such examples, the circuitry of FIG. 2 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 8-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
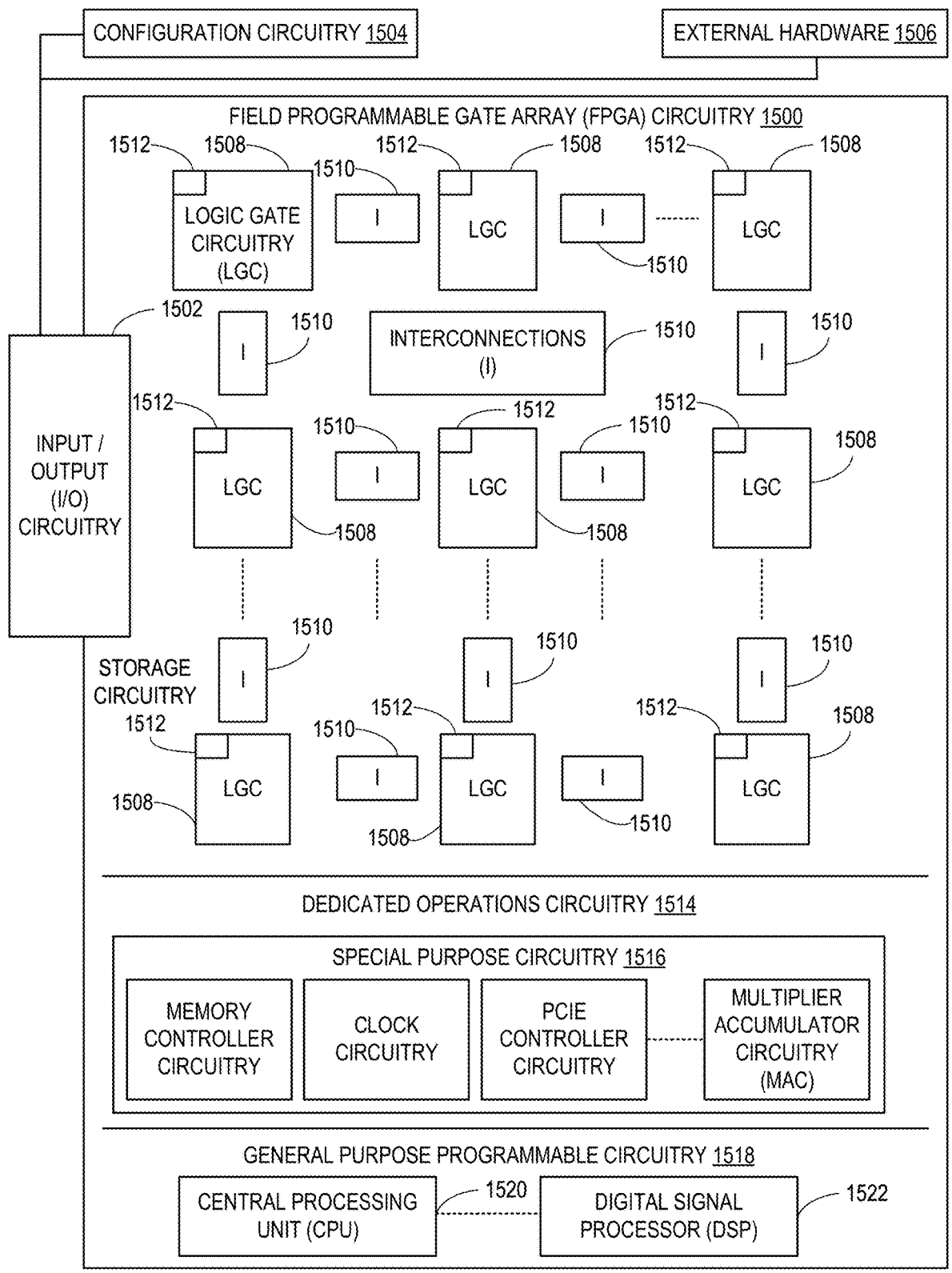
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 8-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 8-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 8-12. As such, the FPGA circuitry 1500 may be structured to effectively instantiate some or all of the machine readable instructions of the flowcharts of FIGS. 8-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 13 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIG. 13 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 8-12 may be executed by one or more of the cores 1402 of FIG. 14, a second portion of the machine readable instructions represented by the flowcharts of FIGS. 8-12 may be executed by the FPGA circuitry 1500 of FIG. 15, and/or a third portion of the machine readable instructions represented by the flowcharts of FIGS. 8-12 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
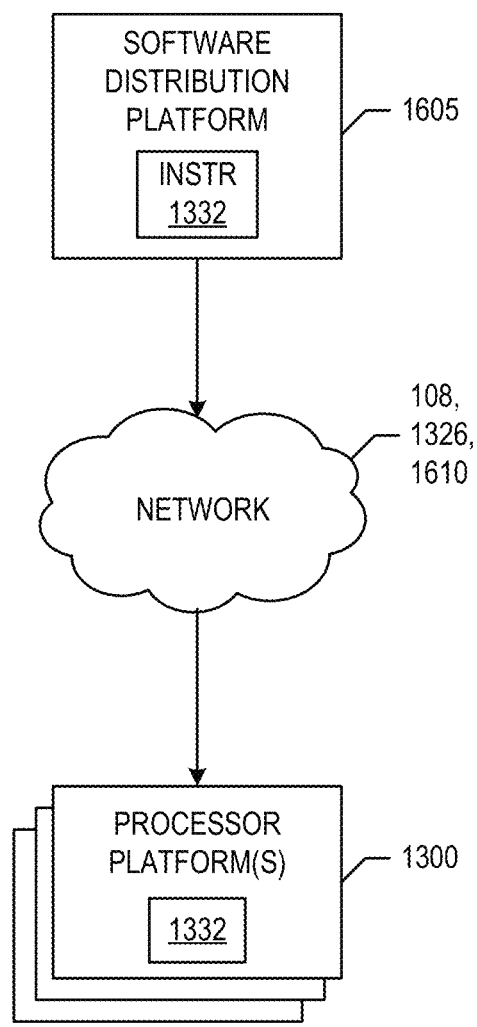
FIG. 16 is a block diagram of an example software distribution platform (e.g., one or more servers) to distribute software (e.g., software corresponding to the example machine readable instructions of FIGS. 8-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions 800 of FIGS. 8-12, as described above. The one or more servers of the example software distribution platform 1605 are in communication with an example network 1610, which may correspond to any one or more of the Internet and/or any of the example networks 108, 1326 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions 800 of FIGS. 8-12, may be downloaded to the example processor platform 1300, which is to execute the machine readable instructions 1332 to implement the segment tagger circuitry 116. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that tag segments in a document. Disclosed example improve a segment tagging process by combining graph and recurrent neural networks for efficient and effective segment tagging on unstructured documents. Disclosed examples can provide a large improvement on the productivity, error reduction, and digitalization of companies by providing for the technological (e.g., automatic) extraction of data from the document image. Disclosed examples can boost document processing to generate more data with increased quality by enabling the removal of manual techniques and providing for efficient processes.

Disclosed examples provide improved accuracy of an information extraction process by utilizing custom node features that are normalized relative to a stable dimension (e.g., a document width). Disclosed examples provide improved accuracy of an information extraction process by utilizing a novel edge sampling algorithm that prevent missing edges between two text segments that belong to an entity. Disclosed examples improve an accuracy of an entity tagging model by utilizing a graph neural network, which does not need a sequence limit (e.g., avoiding a sequence truncation problem for the document).

Disclosed systems, methods, apparatus, and articles of manufacture improve the efficiency of using a computing device by tagging (e.g., coding) text segments detected in a document using bounding box features and text string features. Because examples disclosed herein utilize the bounding box and text string features, example segment tagging models disclosed herein do not operate over an image. As such, disclosed examples avoid a need to load and preprocess the image, and avoid the use of an image backbone for extracting a feature map. In other words, examples disclosed herein eliminate the unnecessary consumption of computing resources by not utilizing an image. Further, to cause node interaction, example segment tagging models disclosed utilize GNNs and RNNs, which are more efficient than methods based on FCNNs to evaluate all possible connections. Thus, disclosed examples limit a number of connections that need to be evaluated among text segments, which accelerates the inference and reduces the amount of required resources. Disclosed systems, methods, apparatus, and articles of manufacture are accordingly directed to one or more improvement(s) in the operation of a machine such as a computer or other electronic and/or mechanical device.

Example methods, systems, articles of manufacture, and apparatus are disclosed herein to tag segments in a document. Other examples include:

Example 1 includes an apparatus comprising at least one memory; machine readable instructions; and processor circuitry to at least one of instantiate or execute the machine readable instructions to generate node embeddings for nodes of a graph, the node embeddings to be based on features extracted from text segments detected in a document, the text segments to be represented by the nodes of the graph; sample edges corresponding to the nodes of the graph to generate the graph; generate first updated node embeddings by passing the node embeddings and the graph through layers of a graph neural network, the first updated embeddings corresponding to the node embeddings augmented with neighbor information; generate second updated node embeddings by passing the first updated embeddings through layers of a recurrent neural network, the second updated embeddings corresponding to the first updated node embeddings augmented with sequential information; and classify the text segments based on the second updated node embeddings.

Example 2 includes the apparatus of example 1, wherein the text segments are extracted from a document by applying an optical character recognition algorithm to the document.

Example 3 includes the apparatus of any one of examples 1-2, wherein ones of the text segments include (a) a text string that includes one or more characters and (b) a bounding box representing coordinates of the ones of the text segments.

Example 4 includes the apparatus of any one of examples 1-3, wherein the node embeddings include text embeddings and region embeddings, the processor circuitry to at least one of instantiate or execute the machine readable instructions to combine respective text and region embeddings for ones of the text segments.

Example 5 includes the apparatus of example 4, wherein the processor circuitry is to generate a first one of the region embeddings for a first text segment by at least one of instantiating or executing the machine readable instructions to extract first features from the first text segment, the first features including a left center coordinate, a right center coordinate, and a rotation angle of a respective bounding box; normalize the left center and right center coordinates using a width of the document; concatenate the first features; and apply a linear layer to the concatenated first features to increase an embedding size of the first features.

Example 6 includes the apparatus of any one of examples 4-5, wherein the processor circuitry is to generate a first one of the text embeddings for a first text segment by at least one of instantiating or executing the machine readable instructions to tokenize the first text segment, wherein the tokens are identified based on a coded character set; generate a sequence of character embeddings for the first text segment based on the tokens; encode the sequence of character embeddings with character position information, the character position information being relative to the first text segment; and iteratively pass ones of the sequence of character embeddings to a Transformer encoder.

Example 7 includes the apparatus of example 6, wherein, prior to tokenizing the first text segment, the processor circuitry is to convert the characters from a first coded character set to a second coded character set.

Example 8 includes the apparatus of any one of examples 1-7, wherein the processor circuitry is to sample a first one of the edges between a first text segment and a second text segment in response to determining that an absolute value of vertical distance between a first center coordinate corresponding to the first text segment and a second center coordinate corresponding to the second text segment is less than a height of the first text segment multiplied by a constant.

Example 9 includes the apparatus of any one of examples 1-8, wherein the sequential information corresponds to an order of the text segments within the document.

Example 10 includes the apparatus of any one of examples 1-9, wherein the graph neural network is a graph attention network including graph attention layers for pairwise message passing, and wherein the graph attention layers update the node embeddings with information from neighbor nodes.

Example 11 includes the apparatus of example 10, wherein the graph attention network includes a first graph attention layer, a second graph attention layer, and a third graph attention layer, and wherein the first, second, and third graph attention layers include residual connections.

Example 12 includes the apparatus of any one of examples 10-11, wherein graph attention network includes sigmoid linear unit (SiLu) activation layers, ones of the SiLu activation layers positioned between ones of the graph attention layers.

Example 13 includes the apparatus of any one of examples 1-12, wherein the processor circuitry is to at least one of instantiate or execute the machine readable instructions to generate a global node by averaging the node embeddings, the global node to be passed through the graph neural network with the node embeddings to provide a global document perspective.

Example 14 includes the apparatus of any one of examples 1-13, wherein the recurrent neural network includes bidirectional gated recurrent unit layers.

Example 15 includes the apparatus of any one of examples 1-14, wherein the processor circuitry is to classify a first text segment of the text segment by at least one of instantiating or executing the machine readable instructions to pass a respective one of the second updated node embeddings through a linear layer to generate logical units (logits); pass the logits through a softmax layer to generate class probability values; and select a first class having a highest probability value.

Example 16 includes the apparatus of example 15, wherein the processor circuitry is to at least one of instantiate or execute the machine readable instructions to label the first text segment with the first class.

Example 17 includes the apparatus of any one of examples 1-16, wherein the document is a receipt, and the text segments correspond to words in the receipt.

Example 18 includes a non-transitory machine readable storage medium comprising instructions that, when executed, cause processor circuitry to at least: generate input embeddings for nodes of a graph, the input embeddings to be based on features extracted from text segments detected in a document, the text segments to be represented by the nodes of the graph; identify candidate edges between ones of the nodes to generate the graph; generate first enriched embeddings by passing the input embeddings and the graph through layers of a graph neural network, the first enriched embeddings including neighbor node information; generate second enriched embeddings by passing the first enriched embeddings through layers of a recurrent neural network, the second enriched embeddings including sequential information; and classify the text segments based on the second enriched embeddings.

Example 19 includes the non-transitory machine readable storage medium of example 18, wherein the text segments are extracted from a document by applying an optical character recognition algorithm to the document.

Example 20 includes the non-transitory machine readable storage medium of any one of examples 18-19, wherein ones of the text segments include (a) a text string that includes one or more characters and (b) a bounding box representing coordinates of the ones of the text segments.

Example 21 includes the non-transitory machine readable storage medium of any one of examples 18-20, wherein the input embeddings include text embeddings and region embeddings, the instructions when executed, cause the processor circuitry to combine respective text and region embeddings for ones of the text segments.

Example 22 non-transitory machine readable storage medium of example 21, wherein the instructions, when executed, cause the processor circuitry to extract first features from a first text segment, the first features including a left center coordinate, a right center coordinate, and a rotation angle of a respective bounding box; normalize the left center and right center coordinates using a width of the document; concatenate the first features; and apply a linear layer to the concatenated first features to increase an embedding size of the first features to generate a first one of the region embeddings for the first text segment.

Example 23 includes the non-transitory machine readable storage medium of any one of examples 21-22, wherein instructions, when executed, cause the processor circuitry to parse a first text segment into tokens based on entries in a dictionary; generate a sequence of character embeddings for the first text segment based on the tokens; encode the sequence of character embeddings with character position information, the character position information being relative to the first text segment; and iteratively pass ones of the sequence of character embeddings to a Transformer encoder to generate a first one of the text embeddings for the first text segment.

Example 24 includes the non-transitory machine readable storage medium of example 23, wherein, prior to parsing the first text segment, the instructions, when executed, cause the processor circuitry to convert the characters from a first coded character set to a second coded character set, the second coded character set corresponding to the entries in the dictionary.

Example 25 includes the non-transitory machine readable storage medium of any one of examples 18-24, wherein instructions, when executed, cause the processor circuitry to identify a first one of the edges between a first text segment and a second text segment in response to determining that an absolute value of vertical distance between a first center coordinate corresponding to the first text segment and a second center coordinate corresponding to the second text segment is less than a height of the first text segment multiplied by a constant.

Example 26 includes the non-transitory machine readable storage medium of any one of examples 18-25 wherein the sequential information is based on an order of the text segments within the document.

Example 27 includes the non-transitory machine readable storage medium of any one of examples 18-26 wherein the graph neural network is a graph attention network including graph attention layers for pairwise message passing, and wherein the graph attention layers update the input embeddings with information from neighbor nodes.

Example 28 includes the non-transitory machine readable storage medium of example 27, wherein the graph attention network includes a first graph attention layer, a second graph attention layer, and a third graph attention layer, and wherein the first, second, and third graph attention layers include residual connections.

Example 29 includes the non-transitory machine readable storage medium of any one of examples 27-28, wherein graph attention network includes sigmoid linear unit (SiLu) activation layers, ones of the SiLu activation layers positioned between ones of the graph attention layers.

Example 30 includes the non-transitory machine readable storage medium of any one of examples 18-29, wherein the instructions, when executed, cause the processor circuitry to generate a global node by averaging the node embeddings, the global node to be passed through the graph neural network with the node embeddings to provide a global document perspective.

Example 31 includes the non-transitory machine readable storage medium of any one of examples 18-30, wherein the recurrent neural network includes bidirectional gated recurrent unit layers.

Example 32 includes the non-transitory machine readable storage medium of any one of examples 18-31, wherein the instructions, when executed, cause the processor circuitry to classify a first text segment of the text segment by passing a respective one of the second enriched embeddings through a linear layer to generate logical units (logits); passing the logits through a softmax layer to generate class probability values; and selecting a first class having a highest relative probability value.

Example 33 includes the non-transitory machine readable storage medium of example 32, wherein the processor circuitry is to at least one of instantiate or execute the machine readable instructions to label the first text segment with the first class.

Example 34 includes the non-transitory machine readable storage medium of any one of examples 18-33, wherein the document is a receipt, and the text segments correspond to words in the receipt.

Example 35 includes a method comprising generating, by executing a machine readable instruction with processor circuitry, node embeddings based on text segments detected in a document, the node embeddings associated with respective nodes of a graph, wherein the nodes are to represent respective text segments; identifying, by executing a machine readable instruction with the processor circuitry, sample edges corresponding to the nodes of the graph to generate the graph; generating, by executing a machine readable instruction with the processor circuitry, first enriched node embeddings by passing the node embeddings and the graph through layers of a graph neural network, the first enriched node embeddings corresponding to the node embeddings injected with neighbor information; generating, by executing a machine readable instruction with the processor circuitry, second enriched node embeddings by passing the first enriched embeddings through layers of a recurrent neural network, the second enriched embeddings corresponding to the first enriched node embeddings injected with sequential information; and classifying, by executing a machine readable instruction with the processor circuitry, the text segments based on the second enriched node embeddings.

Example 36 includes the method of example 35, wherein the text segments are extracted from a document by applying an optical character recognition algorithm to the document.

Example 37 includes the method of any one of examples 35-36, wherein ones of the text segments include (a) a text string that includes one or more characters and (b) a bounding box representing coordinates of the ones of the text segments.

Example 38 includes the method of any one of examples 35-37, wherein the node embeddings include text embeddings and region embeddings, the method further including combining ones of the text and region embeddings corresponding to respective ones of the text segments.

Example 39 includes the method of example 38, further including generating a first one of the region embeddings for a first one of the text segments by extracting first features from the first one of the text segments, the first features including a left center coordinate, a right center coordinate, and a rotation angle of a respective bounding box; normalizing the left center and right center coordinates using a width of the document; concatenating the first features; and applying a linear layer to the concatenated first features to increase an embedding size of the first features.

Example 40 includes the method of any one of examples 38-39, further including generating a first one of the text embedding for a first one of the text segments by tokenizing the first one of the text segments, wherein the tokens are identified based on a coded character set; generating a sequence of character embeddings for the first one of the text segments based on the tokens; encoding the sequence of character embeddings with character position information, the character position information being relative to the first ones of the text segments; and iteratively passing ones of the sequence of character embeddings to a Transformer encoder.

Example 41 includes the method of example 40, further including converting the characters from a first coded character set to a second coded character set prior to the tokenizing of the first text segment.

Example 42 includes the method of any one of examples 35-41, wherein the generating of a first one of the sample edges between a first text segment and a second text segment includes determining that an absolute value of vertical distance between a first center coordinate corresponding to the first text segment and a second center coordinate corresponding to the second text segment is less than a height of the first text segment multiplied by a constant.

Example 43 includes the method of any one of examples 35-42, wherein the sequential information corresponds to an order of the text segments within the document.

Example 44 includes the method of any one of examples 35-43, wherein the graph neural network is a graph attention network including graph attention layers for pairwise message passing, and wherein the graph attention layers enrich the node embeddings with the information from respective neighbor nodes.

Example 45 includes the method of example 44, wherein the graph attention network includes a first graph attention layer, a second graph attention layer, and a third graph attention layer, and wherein the first, second, and third graph attention layers include residual connections.

Example 46 includes the method of any one of examples 44-45, wherein graph attention network includes sigmoid linear unit (SiLu) activation layers, ones of the SiLu activation layers positioned between ones of the graph attention layers.

Example 47 includes the method of any one of examples 35-46, further including generating a global node to be passed through the graph neural network with the node embeddings to provide a global document perspective, the global node generated by averaging the node embeddings.

Example 48 includes the method of any one of examples 35-47, wherein the recurrent neural network includes bidirectional gated recurrent unit layers.

Example 49 includes the method of any one of examples 35-48, wherein the classifying of a first text segment of the text segments includes passing a respective one of the second enriched node embeddings through a linear layer; passing an output of the linear layer through a softmax layer to generate a distribution of class probability values; and selecting a first class having a highest relative probability value of the distribution of class probability values.

Example 50 includes the method of example 49, further including tagging the first text segment with the first class.

Example 51 includes the method of any one of examples 35-50, wherein the document is a receipt, and the text segments correspond to words in the receipt.

Example 52 includes an apparatus comprising means for generating feature embeddings for nodes representing text segments detected in a document; means for generating a graph to connect ones of the nodes via edges to generate a graph structure representing the document; means for updating the feature embeddings based on the graph structure; means for injecting sequence order information into the feature embeddings updated by the means for updating; and means for classifying.

Example 53 includes the apparatus of example 52, wherein ones of the text segments include (a) a text string that includes one or more characters and (b) a bounding box representing coordinates of the ones of the text segments.

Example 54 includes the apparatus of any one of examples 52-53, wherein the means for generating the feature embeddings is to generate text embeddings for ones of the text segments; generate region embeddings for the ones of the text segments; and combine respective ones of the text and region embeddings for the ones of the text segments.

Example 55 includes the apparatus of example 54, wherein the means for generating the feature embeddings is to generate a first one of the region embeddings for a first text segment by extracting first features from the first text segment, the first features including a left center coordinate, a right center coordinate, and a rotation angle of a respective bounding box; normalizing the left center and right center coordinates using a width of the document; concatenating the first features; and applying a linear layer to the concatenated first features to increase an embedding size of the first features.

Example 56 includes the apparatus of any one of examples 54-55, wherein the means for generating the feature embeddings is to generate a first one of the text embeddings for a first text segment by tokenizing the first text segment, wherein the tokens are identified based on a coded character set; generating a sequence of character embeddings for the first text segment based on the tokens; encoding the sequence of character embeddings with character position information, the character position information being relative to the first text segment; and iteratively passing ones of the sequence of character embeddings to a Transformer encoder.

Example 57 includes the apparatus of example 56, wherein, prior to tokenizing the first text segment, the means for generating the feature embeddings is to convert the characters from a first coded character set to a second coded character set.

Example 58 includes the apparatus of any one of examples 52-57, wherein the means for generating the graph is to connect a first one of the edges between a first text segment and a second text segment in response to determining that an absolute value of vertical distance between a first center coordinate corresponding to the first text segment and a second center coordinate corresponding to the second text segment is less than a height of the first text segment multiplied by a constant.

Example 59 includes the apparatus of any one of examples 52-58, wherein the sequence order information corresponds to an order of the text segments within the document.

Example 60 includes the apparatus of any one of examples 52-59, wherein the means for updating the feature embeddings is to perform pairwise message passing based on a graph attention network having graph attention layers, and wherein the graph attention layers update the feature embeddings with information from neighbor nodes.

Example 61 includes the apparatus of example 60, wherein the graph attention network includes a first graph attention layer, a second graph attention layer, and a third graph attention layer, and wherein the first, second, and third graph attention layers include residual connections.

Example 62 includes the apparatus of any one of examples 60-61, wherein graph attention network includes sigmoid linear unit (SiLu) activation layers, ones of the SiLu activation layers positioned between ones of the graph attention layers.

Example 63 includes the apparatus of any one of examples 60-62, wherein the means for updating the feature embeddings is to generate a global node by averaging the feature embeddings generated by the means for generating the feature embeddings, the global node to be passed through the graph attention network with the feature embeddings to provide a global document perspective.

Example 64 includes the apparatus of any one of examples 52-63, wherein the means for injecting is to inject the sequence order information into the updated feature embeddings by via recurrent neural network having bidirectional gated recurrent unit layers.

Example 65 includes the apparatus of example 64, wherein the means for classifying is to pass a first output of the recurrent neural network corresponding to a first text segment through a linear layer to generate first logical units (logits); pass the first logits through a softmax layer to generate class probability values for the first text segment; and select a class for the first text segment based on the class probability values.

Example 66 includes the apparatus of example 65, further including means to labeling to label the first text segment with the class.

Example 67 includes apparatus comprising feature extraction circuitry to generate feature embeddings for text segments in a document, the feature embeddings including region features and text features; graph generator circuitry to generate a graph structure representing the document, the graph structure including nodes representing the text segments and edges connecting ones of the text segments; graph neural network (GNN) circuitry to pass the graph structure and the feature embeddings through graph attention (GAT) layers to update the feature embeddings; recurrent neural network (RNN) circuitry to pass the updated feature embeddings through gated current unit (GRU) layers to inject sequential information into the updated feature embeddings; and segment classifier circuitry to tag the text segments with corresponding ones of a closed list of classes based on an output of the RNN circuitry.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry;
   machine readable instructions; and
   at least one processor circuit to be programmed by the machine readable instructions to:
   generate a graph to represent a document based on text segments extracted from the document, the graph including (a) nodes representative of the text segments, and (b) edges linking respective ones of the nodes;
   extract first features from the text segments, the first features including a first coordinate, a second coordinate, and a rotation angle of a bounding box associated with corresponding ones of the text segments;
   normalize the first coordinate and the second coordinate of the bounding boxes based on a width of the document;
   concatenate the normalized first coordinate, the normalized second coordinate, and the rotation angle of respective ones of the bounding boxes to generate concatenated first features of corresponding ones of the text segments;
   output corresponding region embeddings for the corresponding ones of the text segments after applying a linear layer to the concatenated first features, the linear layer to increase an embedding size of the first features;
   generate node embeddings for the nodes of the graph by combining respective text embeddings of corresponding ones of the text segments with the corresponding region embedding;
   apply a graph neural network (GNN)-based model to the graph having the node embeddings and the edges to generate first updated node embeddings, the GNN-based model including graph attention (GAT) layers, the first updated node embeddings corresponding to the node embeddings augmented with neighbor information;
   apply a recurrent neural network (RNN)-based model to the first updated node embeddings to generate second updated node embeddings, the second updated node embeddings corresponding to the first updated node embeddings augmented with sequential information; and
   classify the text segments based on the second updated node embeddings.

2. The apparatus of claim 1, wherein the node embeddings include a first node embedding for a first text segment of the text segments and one or more of the at least one processor circuit is to:
   tokenize the first text segment;
   identify tokens of the first text segment based on a coded character set;
   generate a sequence of character embeddings for the first text segment based on the tokens;
   generate a position encoded sequence of character embeddings by encoding the sequence of character embeddings with character position information, the character position information relative to the first text segment; and
   cause a transformer encoder to generate the respective text embedding of the first node embedding based on the position encoded sequence of character embeddings by iteratively inputting ones of the position encoded sequence of character embeddings into the transformer encoder.

3. The apparatus of claim 1, wherein one or more of the at least one processor circuit is to convert characters of the text segments from a first coded character set to a second coded character set.

4. The apparatus of claim 1, wherein one or more of the at least one processor circuit is to generate a first one of the edges between a first one of the text segments and a second one of the text segments when an absolute value of vertical distance between a first center coordinate corresponding to the first one of the text segments and a second center coordinate corresponding to the second one of the text segments is less than a height of the first one of the text segments multiplied by a constant.

5. The apparatus of claim 1, wherein the sequential information corresponds to an order of the text segments within the document.

6. The apparatus of claim 1, wherein the GAT layers of the GNN-based model implement pairwise message passing, the pairwise message passing to cause the node embeddings to be updated with the neighbor information, the neighbor information corresponding to information from respective neighbor nodes.

7. The apparatus of claim 1, wherein the first coordinate is a left center coordinate and the second coordinate is a right center coordinate of a respective bounding box.

8. The apparatus of claim 1, wherein one or more of the at least one processor circuit to filter image data from the document prior to generating the graph.

9. The apparatus of claim 1, wherein the linear layer is a first linear layer and one or more of the at least one processor circuit is to:
 pass a respective one of the second updated node embeddings through a second linear layer to generate logical units (logits);
 generate class probability values based on the logits; and
 classify a first text segment of the text segments by selecting a first class having a highest probability value.

10. The apparatus of claim 1, wherein one or more of the at least one processor circuit is to generate a global node by averaging the node embeddings, the global node to be passed through the GNN-based model with the node embeddings.

11. A non-transitory machine readable storage medium comprising instructions to cause at least one processor circuit to at least:
 generate a graph to represent a document based on text segments detected in the document, the graph including (a) nodes representative of the text segments, and (b) edges linking respective ones of the nodes;
 extract first features from the text segments, the first features including a first coordinate, a second coordinate, and a rotation angle of a bounding box associated with corresponding ones of the text segments;
 normalize the first coordinate and the second coordinate of the bounding boxes using a width of the document;
 concatenate the normalized first coordinate, the normalized second coordinate, and the rotation angle of respective ones of the bounding boxes to generate concatenated first features of corresponding ones of the text segments;
 output corresponding region embeddings for the corresponding ones of the text segments after applying a linear layer to the concatenated first features, the linear layer to increase an embedding size of the first features;
 generate input embeddings for the nodes of the graph by combining respective text embeddings of corresponding ones of the text segments with the corresponding region embedding;
 generate first enriched input embeddings by applying a graph neural network (GNN) model to the graph having the input embeddings and the edges, the GNN model including a graph attention (GAT) layer, the first enriched input embeddings including neighbor node information;
 generate second enriched input embeddings by applying a recurrent neural network (RNN) model to the first enriched input embeddings, the second enriched input embeddings including sequential information; and
 classify the text segments based on the second enriched input embeddings.

12. The non-transitory machine readable storage medium of claim 11, wherein the input embeddings include a first input embedding for a first text segment of the text segments and the instructions cause one or more of the at least one processor circuit to:
 parse the first text segment into tokens based on entries in a dictionary;
 generate a sequence of character embeddings for the first text segment based on the tokens;
 generate a position encoded sequence of character embeddings by encoding the sequence of character embeddings with character position information, the character position information relative to the first text segment; and
 cause a transformer encoder to generate the respective text embedding of the first input embedding based on the position encoded sequence of character embeddings by iteratively inputting ones of the position encoded sequence of character embeddings into the transformer encoder.

13. The non-transitory machine readable storage medium of claim 11, wherein the instructions cause one or more of the at least one processor circuit to convert characters of the text segments from a first coded character set to a second coded character set.

14. The non-transitory machine readable storage medium of claim 11, wherein the text segments include a first text segment and a second text segment and the instructions cause one or more of the at least one processor circuit to:
 determine an absolute value of vertical distance between a first center coordinate corresponding to the first text segment and a second center coordinate corresponding to the second text segment is less than a height of the first text segment multiplied by a constant; and
 generate a first one of the edges between the first text segment and the second text segment.

15. The non-transitory machine readable storage medium of claim 11, wherein the sequential information is based on an order of the text segments within the document.

16. The non-transitory machine readable storage medium of claim 11, wherein the GAT layers implement pairwise message passing, the pairwise message passing to cause the input embeddings to be updated with the neighbor node information, the neighbor node information corresponding to information from neighbor nodes.

17. The non-transitory machine readable storage medium of claim 11, wherein the first coordinate is a left center coordinate and the second coordinate is a right center coordinate of a respective bounding box.

18. The non-transitory machine readable storage medium of claim 11, wherein the instructions cause one or more of the at least one processor circuit to filter image data from the document prior to generating the graph.

19. The non-transitory machine readable storage medium of claim 11, wherein the linear layer is a first linear layer and the instructions cause one or more of the at least one processor circuit to:
 pass a respective one of the second enriched input embeddings through a second linear layer to generate logical units (logits);
 generate class probability values based on the logits; and
 classify a first text segment of the text segments by selecting a first class having a highest probability value.

20. The non-transitory machine readable storage medium of claim 11, wherein the instructions cause one or more of the at least one processor circuit to generate a global node by averaging the input embeddings, the global node to be passed through the GNN model with the input embeddings.

* * * * *